United States Patent
Myung et al.

(10) Patent No.: US 12,193,007 B2
(45) Date of Patent: Jan. 7, 2025

(54) METHOD FOR TERMINAL TO ACCESS CHANNEL IN UNLICENSED BAND AND DEVICE USING SAME METHOD

(71) Applicant: LG ELECTRONICS INC., Seoul (KR)

(72) Inventors: Sechang Myung, Seoul (KR); Seonwook Kim, Seoul (KR); Changhwan Park, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 614 days.

(21) Appl. No.: 17/278,254

(22) PCT Filed: Sep. 23, 2019

(86) PCT No.: PCT/KR2019/012344
§ 371 (c)(1),
(2) Date: Mar. 19, 2021

(87) PCT Pub. No.: WO2020/060361
PCT Pub. Date: Mar. 26, 2020

(65) Prior Publication Data
US 2021/0360673 A1   Nov. 18, 2021

(30) Foreign Application Priority Data

Sep. 21, 2018   (KR) .................. 10-2018-0114453
Sep. 27, 2018   (KR) .................. 10-2018-0115393
(Continued)

(51) Int. Cl.
*H04W 72/21*   (2023.01)
*H04L 1/18*   (2023.01)
(Continued)

(52) U.S. Cl.
CPC ............... *H04W 72/21* (2023.01); *H04L 1/18* (2013.01)

(58) Field of Classification Search
CPC ..... H04W 72/20; H04W 72/21; H04W 72/23; H04W 28/16; H04W 28/18; H04L 1/18
See application file for complete search history.

(56) References Cited

U.S. PATENT DOCUMENTS 11,246,117 B2 *   2/2022   Ying .................... H04W 72/04
11,356,988 B2 *   6/2022   Yeo ..................... H04L 1/1861
(Continued)

FOREIGN PATENT DOCUMENTS

WO   WO2016182355   11/2016
WO   WO2018012919   1/2018

OTHER PUBLICATIONS

Huawei, HiSilicon, "Coexistence and channel access for NR unlicensed band operations," R1-1808061, 3GPP TSG RAN WG1 Meeting #94, Gothenburg, Sweden, Aug. 20-24, 2018, 10 pages.
(Continued)

*Primary Examiner* — Jenee Holland
(74) *Attorney, Agent, or Firm* — Fish & Richardson P.C.

(57) ABSTRACT

Provided are a method for accessing a channel in an unlicensed band and a device using same method. The method is configured such that a wireless device transmits data units, receives feedback information about the data units, and adjusts a contention window size used in a determination of whether there is an access to the channel in the unlicensed band on the basis of the feedback information. The wireless device can adjust the contention window size by using feedback information about, from among the data units, data units which at least partially overlap in reference duration.

12 Claims, 49 Drawing Sheets

(30) Foreign Application Priority Data

Mar. 28, 2019 (KR) ........................ 10-2019-0036179
May 2, 2019 (KR) ........................ 10-2019-0051851

(51) Int. Cl.
*H04L 1/1822* (2023.01)
*H04L 1/1829* (2023.01)
*H04L 5/00* (2006.01)
*H04W 72/23* (2023.01)

(56) References Cited

U.S. PATENT DOCUMENTS

| | | | |
|---|---|---|---|
| 2011/0085503 A1* | 4/2011 | Nam | H04L 5/0051 370/329 |
| 2011/0206014 A1* | 8/2011 | Lee | H04L 1/08 370/335 |
| 2014/0341096 A1* | 11/2014 | Ko | H04L 1/1896 370/280 |
| 2017/0163388 A1* | 6/2017 | Wiemann | H04L 1/1851 |
| 2018/0027554 A1* | 1/2018 | Yerramalli | H04L 1/0009 370/329 |
| 2018/0092073 A1* | 3/2018 | Nogami | H04W 52/16 |
| 2018/0123744 A1* | 5/2018 | Nogami | H04W 52/248 |
| 2018/0167932 A1* | 6/2018 | Papasakellariou | H04L 5/0055 |
| 2019/0007959 A1* | 1/2019 | Hwang | H04W 72/0446 |
| 2019/0037601 A1* | 1/2019 | Noh | H04L 1/1887 |
| 2019/0074929 A1* | 3/2019 | Aiba | H04L 1/0025 |
| 2019/0149270 A1* | 5/2019 | Liu | H04L 12/4035 370/329 |
| 2019/0149380 A1* | 5/2019 | Babaei | H04W 72/0446 370/330 |
| 2019/0159256 A1* | 5/2019 | Talarico | H04L 1/187 |
| 2019/0254022 A1* | 8/2019 | Yeo | H04W 72/23 |
| 2019/0268971 A1* | 8/2019 | Talarico | H04W 76/27 |
| 2019/0297642 A1* | 9/2019 | Sun | H04L 1/1887 |
| 2019/0313382 A1* | 10/2019 | Sun | H04W 72/23 |
| 2020/0100284 A1* | 3/2020 | Li | H04W 74/0808 |
| 2020/0287654 A1* | 9/2020 | Xi | H04L 5/0055 |
| 2020/0344819 A1* | 10/2020 | Myung | H04W 72/23 |
| 2021/0044400 A1* | 2/2021 | Jiang | H04L 5/0048 |
| 2021/0266105 A1* | 8/2021 | Lei | H04W 28/04 |
| 2021/0282182 A1* | 9/2021 | Nogami | H04W 74/08 |
| 2021/0297193 A1* | 9/2021 | Noh | H04L 1/1614 |
| 2021/0298045 A1* | 9/2021 | Kim | H04W 72/0453 |
| 2021/0298075 A1* | 9/2021 | Talarico | H04W 72/23 |
| 2021/0344448 A1* | 11/2021 | Nogami | H04L 5/0055 |
| 2021/0360673 A1* | 11/2021 | Myung | H04L 1/1864 |
| 2022/0085924 A1* | 3/2022 | Talarico | H04L 1/1854 |

OTHER PUBLICATIONS

Intel Corporation, "Enhancements to channel access mechanism for NR-unlicensed," R1-1808685, 3GPP TSG RAN WG1 Meeting #94, Gothenburg, Sweden, Aug. 20-24, 2018, 11 pages.

LG Electronics, "Channel access procedure for NR unlicensed operation," R1-1808507, 3GPP TSG RAN WG1 Meeting #94, Gothenburg, Sweden, Aug. 20-24, 2018, 7 pages.

* cited by examiner

FIG. 22
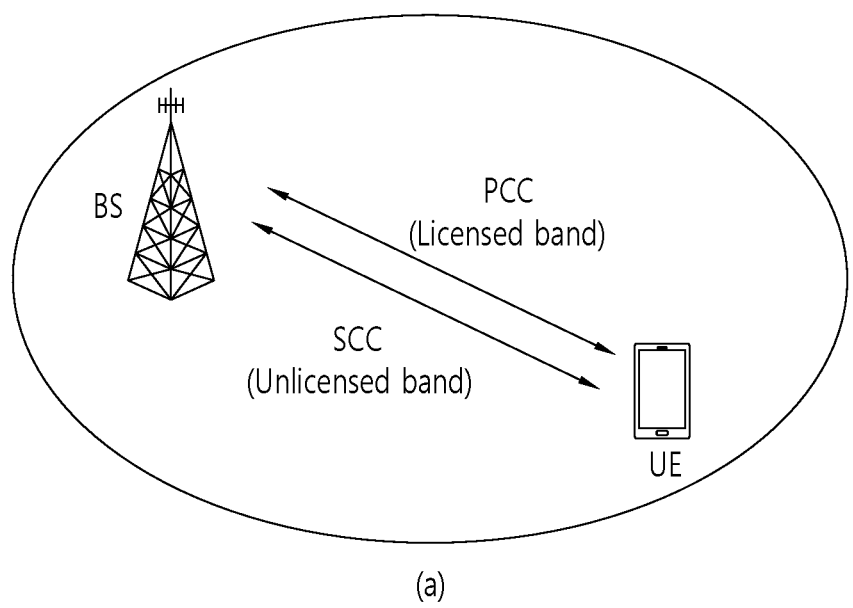
(a)
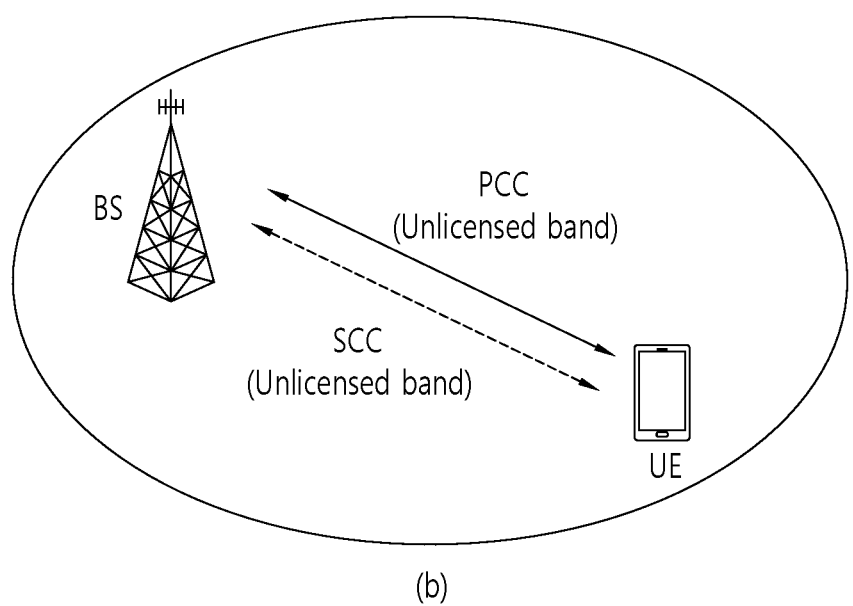
(b)

FIG. 31
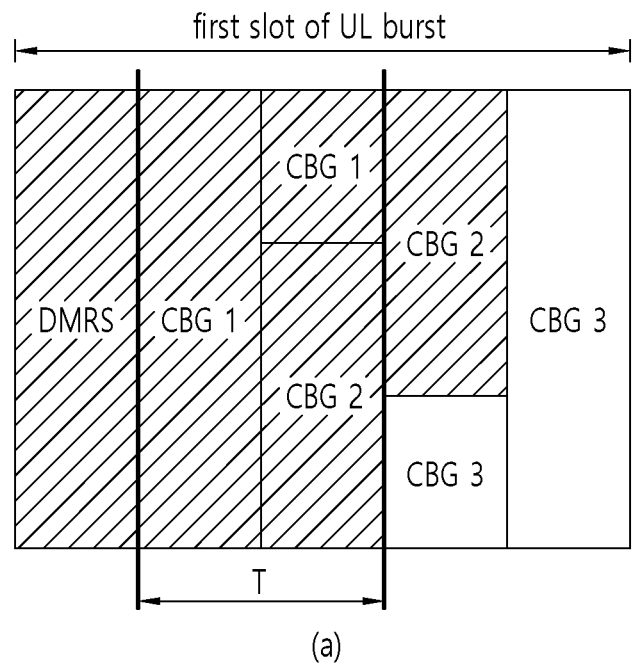
(a)
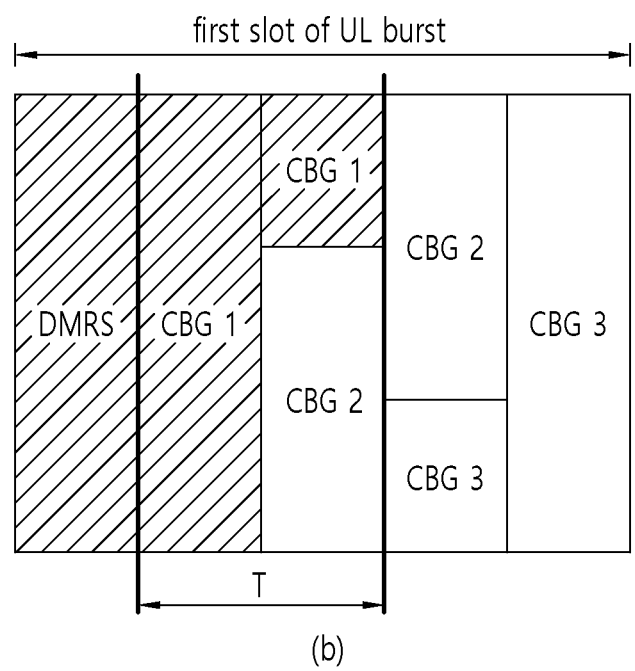
(b)

FIG. 41
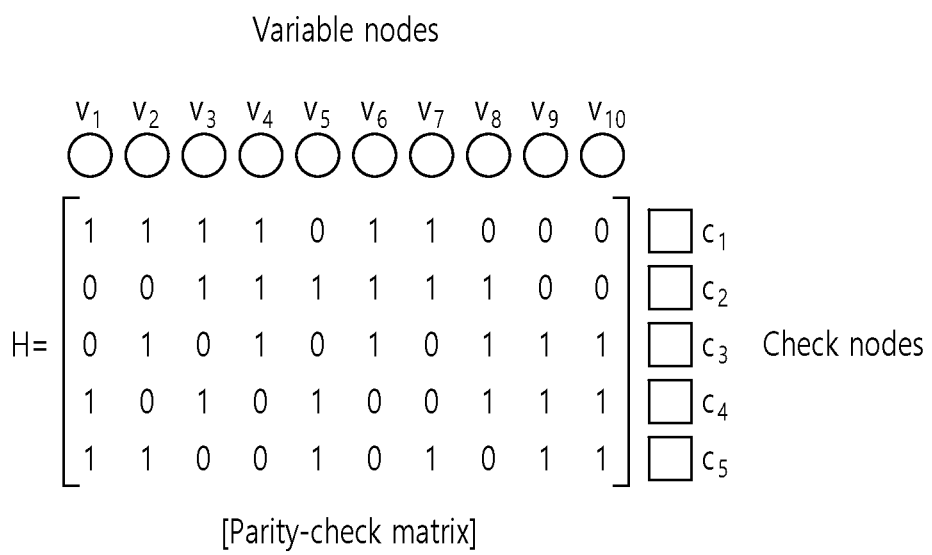
[Parity-check matrix]
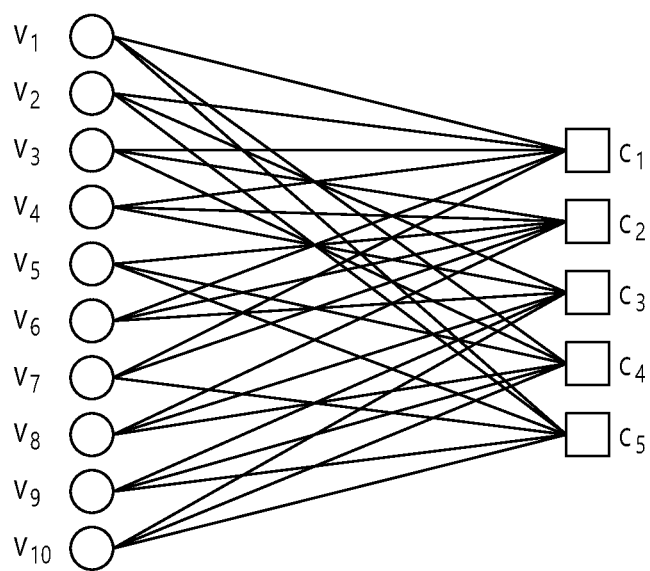
[Protograph]

(a)

$$F = \begin{bmatrix} 1 & 0 \\ 1 & 1 \end{bmatrix}$$

(b)

METHOD FOR TERMINAL TO ACCESS CHANNEL IN UNLICENSED BAND AND DEVICE USING SAME METHOD

CROSS-REFERENCE TO RELATED APPLICATIONS

This application is the National Stage filing under 35 U.S.C. 371 of International Application No. PCT/KR2019/012344, filed on Sep. 23, 2019, which claims the benefit of Korean Patent Applications No. 10-2018-0114453 filed on Sep. 21, 2018, No. 10-2018-0115393 filed on Sep. 27, 2018, No. 10-2019-0036179 filed on Mar. 28, 2019 and No. 10-2019-0051851 filed on May 2, 2019, the contents of which are all hereby incorporated by reference herein in their entirety.

BACKGROUND OF THE DISCLOSURE

Field of the Disclosure

The present disclosure relates to wireless communication and, more particularly, to a channel access method of a UE in an unlicensed band and a device using the method.

Related Art

A wireless communication system is a multiple access system that supports communication with multiple users by sharing available system resources (e.g., a bandwidth, transmission power, and the like). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi-carrier frequency division multiple access (MC-FDMA) system, and the like.

FIG. 1 illustrates an example of a 5G usage scenario to which the technical features of the present disclosure are applicable. The 5G usage scenario illustrated in FIG. 1 is merely for illustrative purposes, and the technical features of the present disclosure may also be applied to other 5G usage scenarios which are not shown in FIG. 1.

Referring to FIG. 1, three major requirement areas for 5G includes: (1) an enhanced mobile broadband (eMBB) area; (2) a massive machine-type communication (mMTC) area; and 3) an ultra-reliable and low-latency communication (URLLC) area. Some use cases may require a plurality of areas for optimization, and other use cases may focus on only one key performance indicator (KPI). 5G supports these various use cases in a flexible and reliable manner.

eMBB focuses on overall improvement in data rate, latency, user density, and capacity and coverage of mobile broadband connection. eMBB is aimed at a throughput of about 10 Gbps. eMBB further surpasses basic mobile Internet access and covers abundant interactive operations, a cloud, and media and entertainment applications in augmented reality. Data is one key driver in 5G, and dedicated voice services may not be provided for the first time in the 5G era. In 5G, a voice is expected to be processed as an application simply using data connection provided by a communication system. Main reasons for an increase in the amount of traffic are an increase in the size of content and a growing number of applications requiring a high data rate. Streaming services (audio and video) and interactive video and mobile Internet connectivity will be widely used as more devices are connected to the Internet. A large number of applications require always-on connectivity in order to push real-time information and notifications to a user. Cloud storage and applications are rapidly growing in use on mobile communication platforms and can be applied to both work and entertainment. Cloud storage is a special use case which contributes to an increase in uplink data rate. 5G is also used for telebusiness on the cloud, and requires much lower end-to-end latency to maintain a satisfactory user experience when a tactile interface is used. In entertainments, for example, cloud games and video streaming are other key factors that require enhanced mobile broadband capabilities. Entertainments are essential for smartphones and tablet PCs in any place including a high-mobility environment, such as a train, a car, and an airplane. Another use case is augmented reality and information retrieval for entertainments. Here, augmented reality requires very low latency and a large amount of data in a moment.

mMTC is designed to enable communication between a large number of low-cost devices operated with a battery and is intended to support smart metering, distribution, work areas, and applications including body sensors. mMTC is aimed at supporting a battery life of about ten years and/or about one million devices per square kilometer. mMTC enables seamless connection of embedded sensors in any field and is one of the most widely used 5G applications. Potentially, the number of IoT devices is expected to reach 20.4 billion by 2020. Industrial IoT is one field where 5G plays a key role in enabling smart cities, asset tracking, smart utilities, and agricultural and security infrastructures.

URLLC enables devices and machines to communicate with high reliability, very low latency, and high availability, thus being ideal for vehicular communications, industrial control, factory automation, remote surgery, a smart grid, and public safety applications. URLLC aims at a latency of about 1 ms. URLLC includes new services that will change the industry through remote control of key infrastructures and ultra-reliable/low-latency links, such as self-driving vehicles. Reliability and latency levels are essential for smart grid control, industrial automation, robotics, and drone control and coordination.

Next, a plurality of use cases included in the triangle of FIG. 1 will be described in more detail.

5G is a technique for providing a stream rated at hundreds of megabits per second to gigabytes per second and can complement fiber-to-the-home (FTTH) and cable-based broadband (or DOCSIS). This high speed may be required to provide not only virtual reality (VR) and augmented reality (AR) but also a TV with a resolution of 4K or higher (6K, 8K or above). VR and AR applications mostly include immersive sporting events. A particular application may require a special network configuration. For example, for a VR game, a game company may need to integrate a core server with an edge network server of a network operator in order to minimize latency.

An automotive area is expected to be an important new driver for 5G with many uses for vehicular mobile communications. For example, entertainments for passengers require both high-capacity and high-mobility broadband, because future users continue to expect high-quality connection regardless of location and speed thereof. Another use case in the automotive area is an AR dashboard. A driver can identify an object in the dark on what is being viewed through a front window through the AR dashboard. The AR dashboard displays information to be informed to the driver about the distance and movement of an object in an overlapping manner. In the future, a wireless module enables communication between vehicles, information exchange between a vehicle and a supporting infrastructure, and information exchange between a vehicle and a different connected device (e.g., a device accompanied by a pedestrian). A safety system provides an alternative course for an action so that a driver can drive safely, thereby reducing the risk of accidents. The next step would be a remote control vehicle or a self-driving vehicle, which requires highly reliable and very fast communication between different self-driving vehicles and/or between a vehicle and an infrastructure. In the future, a self-driving vehicle will perform all driving activities, and the driver will focus only on a traffic problem that the vehicle cannot autonomously identify. Technical requirements of self-driving vehicles are ultra-low latency, high speed, and high reliability to increase traffic safety to the extent that humans cannot achieve.

In a smart city and a smart home, which are referred to as a smart society, a high-density wireless sensor network will be embedded. A distributed network of intelligent sensors will identify conditions for cost and energy-efficient maintenance of a city or house. Similar settings may be established for each home. A temperature sensor, window and heating controllers, a security system, and home appliances are all wirelessly connected. Many of these sensors typically require low data rate, low power, and low cost. However, for example, a real-time HD video may be required for a particular type of a device for monitoring.

Since consumption and distribution of energy including heat or gas is decentralized to a high degree, automated control of a distributed sensor network is required. A smart grid collects information and interconnects sensors using digital information and communication technology to function according to the information. This information may include supplier and consumer behavior, thus enabling the smart grid to improve the distribution of fuel, such as electricity, in efficient, reliable, economical, production-sustainable, and automated manners. The smart grid may be considered as a sensor network having low latency.

The health sector has a large number of applications that can benefit from mobile communications. Communication systems can support telemedicine to provide clinical care in remote locations. Telemedicine can help to reduce a distance barrier and can improve access to medical services that are not continuously available in distant rural areas. Telemedicine is also used to save lives in critical treatment and emergency situations. A wireless sensor network based on mobile communication can provide remote monitoring and sensors for parameters, such as heart rate and blood pressure.

Wireless and mobile communication is gradually becoming important in industrial applications. Wiring involves high costs for installation and maintenance. Thus, the possibility of replacing a cable with a reconfigurable wireless link is an attractive aspect for different industrial fields. However, to replace a cable with a reconfigurable wireless link, a wireless connection needs to operate with similar latency, reliability, and capacity to those of a cable and needs to be managed in a simplified manner. Low latency and a very low error probability are new requirements for a 5G connection.

Logistics and cargo tracking is an important use case for mobile communication which enables the tracking of inventory and packages anywhere using a location-based information system. The use case of logistics and cargo tracking typically requires low data rate but needs a large range and reliable location information.

<Artificial Intelligence (AI)>

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for learning data, wherein the label may indicate a correct answer (or result value) that the artificial neural network needs to infer when the learning data is input to the artificial neural network. Unsupervised learning may refer to a method of training an artificial neural network without a label given for learning data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

<Robot>

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields.

A robot may include an actuator or a driver including a motor to perform various physical operations, such as moving a robot joint. In addition, a movable robot may include a wheel, a brake, a propeller, and the like in a driver to run on the ground or fly in the air through the driver.

<Self-Driving or Autonomous Driving>

Autonomous driving refers to a technique of self-driving, and an autonomous vehicle refers to a vehicle that travels without a user's operation or with a user's minimum operation of a user.

For example, autonomous driving may include a technique for maintaining a lane while driving, a technique for automatically adjusting speed, such as adaptive cruise control, a technique for automatically traveling along a predetermined route, and a technique for traveling by automatically setting a route when a destination is set.

A vehicle may include a vehicle having only an internal combustion engine, a hybrid vehicle having both an internal combustion engine and an electric motor, and an electric vehicle having only an electric motor, and may include not only an automobile but also a train, a motorcycle, and the like.

An autonomous vehicle can be regarded as a robot having an autonomous driving function.

<Extended Reality (XR)>

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a cellular phone, a tablet PC, a laptop computer, a desktop computer, a TV, digital signage, and the like. A device to which XR technology is applied may be referred to as an XR device.

As a growing number of communication devices require higher communication capacity, there is a need for advanced mobile broadband communication as compared to existing radio access technology (RAT). Accordingly, communication systems considering services or user equipments (UEs) sensitive to reliability and latency are under discussion. Next-generation RAT considering enhanced mobile broadband communication, massive MTC, and ultra-reliable and low-latency communication (URLLC) may be referred to as new RAT or new radio (NR).

Cellular communication systems, such as long-term evolution (LTE)/NR systems, are also considering using an unlicensed band of 2.4 gigahertz (GHz), which is mainly used by an existing Wi-Fi system, or unlicensed bands of 5 GHz and 60 GHz, which are newly receiving attention, for traffic offloading.

Basically, in an unlicensed band, since a method of performing wireless transmission and reception through contention between communication nodes is assumed, each communication node is required to verify that a different communication node is not performing signal transmission by performing channel sensing before transmitting a signal. For convenience, this operation is called a listen-before-talk (LBT) or a channel access procedure. In particular, an operation of verifying whether the different communication node is performing signal transmission is defined as carrier sensing (CS), and a case where it is determined that the different communication node is not performing signal transmission is defined as a clear channel assessment (CCA) having been verified.

A method and device for enabling a UE to efficiently access a channel in such an unlicensed band are required.

SUMMARY

The present disclosure provides a channel access method of a UE in an unlicensed band and a device using the method.

In one aspect, provided is a channel access method in an unlicensed band. The channel access method includes transmitting data units, receiving feedback information on a data unit even partially overlapping a reference duration among the data units and adjusting a contention window size (CWS) used to determine whether to access a channel of the unlicensed band based on the feedback information.

In another aspect, provided is a wireless device. The wireless device includes a transceiver configured to transmit and receive a wireless signal and a processor operably coupled to the transceiver. The processor is configured to transmit data units, to receive feedback information on a data unit even partially overlapping a reference duration among the data units, and to adjust a contention window size (CWS) used to determine whether to access a channel of the unlicensed band based on the feedback information.

In still another aspect, provided is a processor for a wireless communication device. The processor controls the wireless communication device to transmit data units, to receive feedback information on a data unit even partially overlapping a reference duration among the data units, and to adjust a contention window size (CWS) used to determine whether to access a channel of the unlicensed band based on the feedback information.

NR may provide various services to terminals (or user equipments (UEs)) with various capabilities. This is the same with an unlicensed band of NR. Depending on a UE, whether to adjust a size of a contention window required for an LBT process based on feedback information on which reference resource may vary significantly. In the present disclosure, channel access in an unlicensed band may be made more efficiently by allowing the reference resource to be flexibly and independently set in consideration of such NR characteristics. In addition, when cells having different subcarrier intervals are aggregated and data is transmitted through the cells, the reference resource may be determined according to a slot length of any one of the cells. In this case, it is possible to perform highly reliable communication without ambiguity by clearly defining which data feedback information is to be transmitted in a cell in which the reference resource and the slot length do not match.

BRIEF DESCRIPTION OF THE DRAWINGS

FIG. 22 illustrates an example of a wireless communication system supporting an unlicensed band.

FIG. 31 illustrates CBGs used for CWS adjustment in a first slot of the UL burst.

FIG. 41 illustrates an example of a parity-check matrix expressed as a protograph.

DESCRIPTION OF EXEMPLARY EMBODIMENTS

In the following specification, "I" and "," should be interpreted as representing "and/or". For example, "A/B" may refer to "A and/or B". Further, "A, B" may refer to "A and/or B". Further, "A/B/C" may refer to "at least one of A, B and/or C". Furthermore, "A, B, C" may refer to "at least one of A, B, and/or C".

Furthermore, in the following disclosure, "or" should be interpreted as representing "and/or". For example, "A or B" may include "only A", "only B", and/or "both A and B". In other words, in this disclosure, "or" may be interpreted as representing "additionally" or "alternatively".

Figure 1:
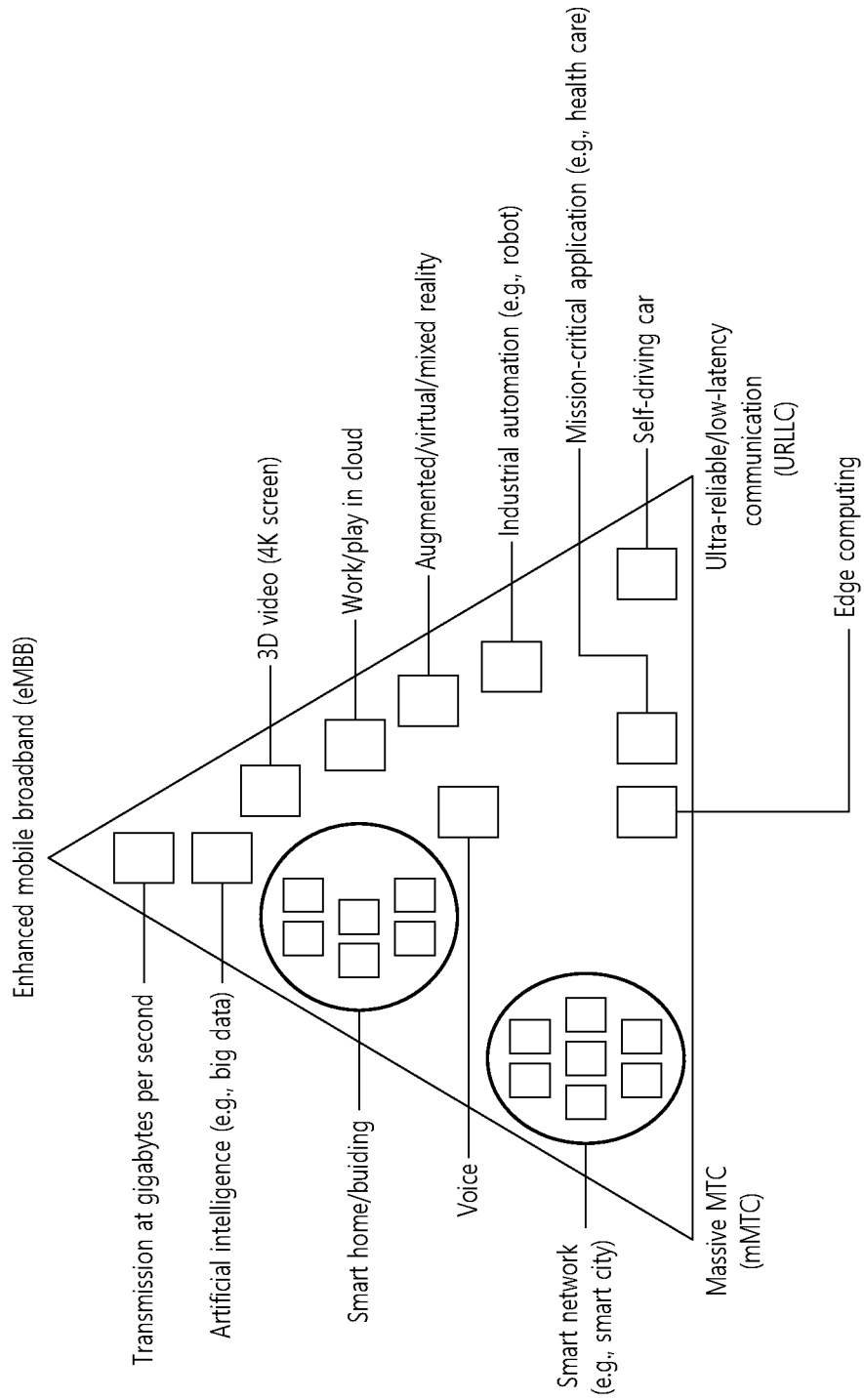
FIG. 1 illustrates an example of a 5G usage scenario to which the technical features of the present disclosure are applicable.
Figure 2:
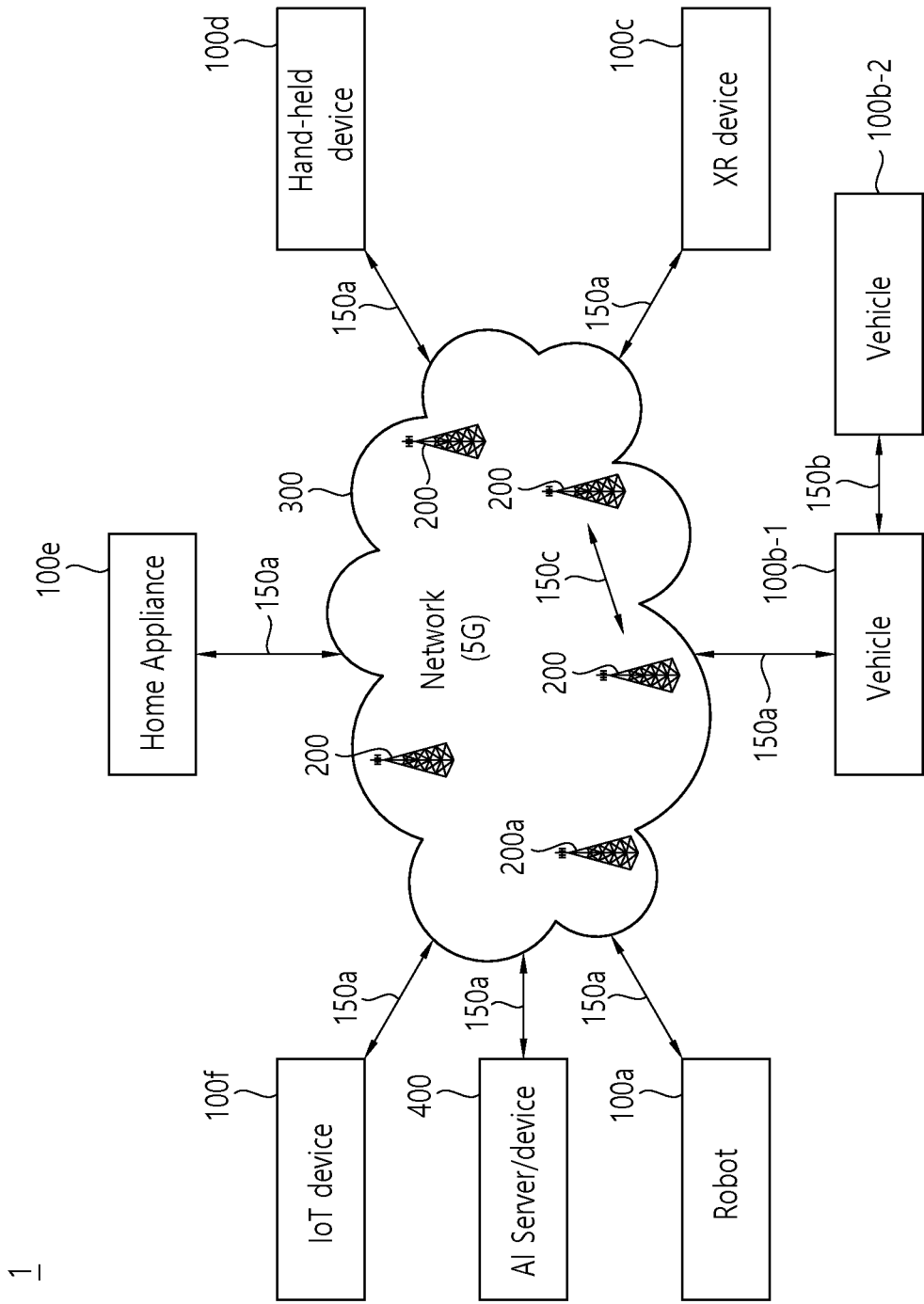
FIG. 2 illustrates an AI system 1.

FIG. 2 illustrates a communication system 1 applied to the present disclosure.

Referring to FIG. 2, a communication system 1 applied to the present disclosure includes a wireless device, a base station (BS), and a network. Here, the wireless device refers to a device that performs communication using a wireless access technology (e.g., 5G new RAT (NR), long term evolution (LTE)), and may be referred to as a communication/wireless/5G device. Wireless devices may include a robot 100a, vehicles 100b-1 and 100b-2, an eXtended reality (XR) device 100c, a hand-held device 100d, a home appliance 100e, an Internet of things (IoT) device 100f, and an AI device/server 400, but is not limited thereto. For example, the vehicle may include a vehicle equipped with a wireless communication function, an autonomous vehicle, a vehicle capable of performing inter-vehicle communication, and the like. Here, the vehicle may include an unmanned aerial vehicle (UAV) (e.g., a drone). The XR device includes augmented a reality (AR)/virtual reality (VR)/mixed reality (MR) device and may be implemented in the form of a head-mounted device (HMD), a head-up display (HUD) provided in a vehicle, a TV, a smartphone, a computer, a wearable device, a home appliance, a digital signage, a vehicle, a robot, and the like. The portable device may include a smartphone, a smart pad, a wearable device (e.g., smart watch or smart glasses), a computer (e.g., notebook computers, etc.), and the like. The home appliance may include a TV, a refrigerator, and a washing machine. The IoT device may include a sensor, a smart meter, and the like. For example, the BS and the network may be implemented as a wireless device, and a specific wireless device 200*a* may operate as a BS/network node for other wireless devices.

The wireless devices 100*a* to 100*f* may be connected to a network 300 through a BS 200. An artificial intelligence (AI) technology may be applied to the wireless devices 100*a* to 100*f*, and the wireless devices 100*a* to 100*f* may be connected to the AI server 400 through the network 300. The network 300 may be configured using a 3G network, a 4G (e.g., LTE) network, or a 5G (e.g., NR) network. The wireless devices 100*a* to 100*f* may communicate with each other through the BS 200/network 300 or may communicate directly (e.g., sidelink communication) without the BS/network. For example, the vehicles 100*b*-1 and 100*b*-2 may perform direct communication (e.g. vehicle to vehicle (V2V)/vehicle to everything (V2X) communication). In addition, the IoT device (e.g., sensor) may directly communicate with other IoT devices (e.g., sensors) or other wireless devices 100*a* to 100*f*.

Wireless communication/connections 150*a*, 150*b*, and 150*c* may be established between the wireless devices 100*a* to 100*f* and BS 200 and between the BS 200 and the BS 200. Here, wireless communication/connection may be established through various wireless access technologies (e.g., 5G NR) such as uplink/downlink communication 150*a*, sidelink communication 150*b* (or D2D communication), and communication 150*c* between BSs (e.g., relay, integrated access backhaul). Through wireless communication/connections 150*a*, 150*b*, and 150*c*, the wireless devices and the BS/wireless device and the BS and the BS may transmit/receive wireless signals to each other. For example, the wireless communication/connections 150*a*, 150*b*, and 150*c* may transmit/receive signals through various physical channels. To this end, at least some of a process of setting various configuration information for transmission/reception of wireless signals, various signal processing processes (e.g., channel encoding/decoding, modulation/demodulation, resource mapping/demapping, etc.), and a resource allocation process may be performed based on various proposals of the present disclosure.

Figure 3:
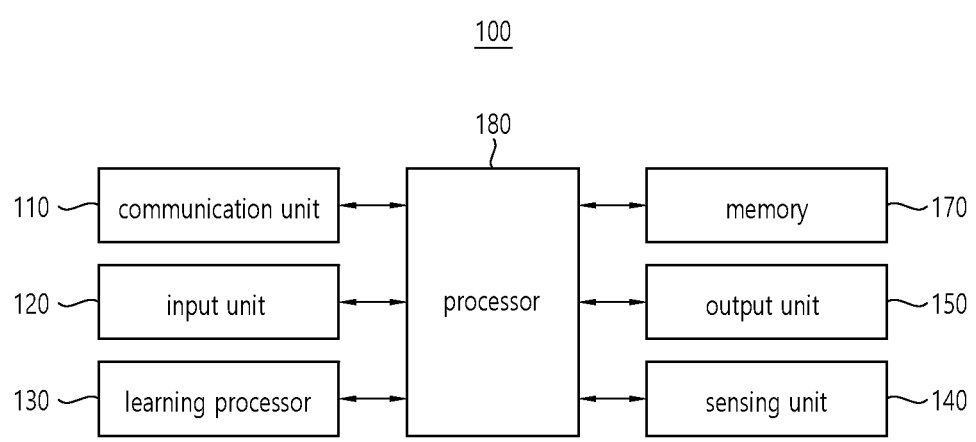
FIG. 3 illustrates an AI device 100.

FIG. 3 illustrates an AI device 100.

The AI device 100 may be configured as a stationary device or a movable device, such as a TV, a projector, a cellular phone, a smartphone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a desktop computer, digital signage, a robot, or a vehicle.

Referring to FIG. 3, the terminal 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100*a* to 100*e* and an AI server 200, using wired or wireless communication technology. For example, the communication unit 110 may transmit and receive sensor information, a user input, a learning model, and a control signal, for example, to and from external devices.

Here, communication technology used by the communication unit 110 may be, for example, a global system for mobile communication (GSM), code division multiple access (CDMA), long-term evolution (LTE), 5G, wireless LAN (WLAN), wireless-fidelity (Wi-Fi), Bluetooth™, radio frequency identification (RFID), infrared data association (IrDA), ZigBee, or near-field communication (NFC).

The input unit 120 may acquire various types of data.

Here, the input unit 120 may include a camera to input an image signal, a microphone to receive an audio signal, and a user input unit to receive information input from a user. Here, the camera or the microphone may be considered as a sensor, and a signal acquired from the camera or the microphone may be referred to as sensing data or sensor information.

The input unit 120 may acquire input data to be used when acquiring an output using learning data for model learning and a learning model. The input unit 120 may acquire unprocessed input data, in which case the processor 180 or the learning processor 130 may extract an input feature by preprocessing the input data.

The learning processor 130 may train a model configured with an artificial neural network using the learning data. Here, the trained artificial neural network may be called a learning model. The learning model may be used to infer a result value for newly input data other than the learning data, and the inferred value may be used as a determination base for performing any operation.

Here, the learning processor 130 may perform AI processing along with a learning processor 240 of an AI server 200.

Here, the learning processor 130 may include a memory integrated with or configured the in AI device 100. Alternatively, the learning processor 130 may be configured using the memory 170, an external memory directly coupled to the AI device 100, or a memory retained in an external device.

The sensing unit 140 may acquire at least one of internal information on the AI device 100 and surrounding environmental information and user information on the AI device 100 using various sensors.

Here, the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, lidar, and radar.

The output unit 150 may generate a visual output, an auditory output, or a tactile output.

Here, the output unit 150 may include a display to output visual information, a speaker to output auditory information, and a haptic module to output tactile information.

The memory 170 may store data which assists various functions of the AI device 100. For example, memory 170 may store input data acquired by the input unit 120, learning data, a learning model, and a learning history.

The processor 180 may determine at least one executable operation of the AI device 100 based on information determined or generated using a data analysis algorithm or a machine learning algorithm. The processor 180 may control constituent elements of the AI device 100 to perform the determined operation.

To this end, the processor 180 may request, retrieve, receive, or utilize data of the learning processor 130 or the memory 170 and may control the constituent elements of the AI device 100 to execute a predictable operation or an operation that is determined desirable among the at least one executable operation.

When connection of an external device is necessary to perform the determined operation, the processor 180 may generate a control signal to control the external device and may transmit the generated control signal to the external device.

The processor 180 may acquire intent information corresponding to a user input and may determine a requirement of a user based on the acquired intent information.

Here, the processor 180 may acquire the intent information corresponding to the user input using at least one of a speech-to-text (STT) engine for converting a voice input into a character string and a natural language processing (NLP) engine for acquiring intent information of a natural language.

Here, at least one of the STT engine or the NLP engine may be at least partially configured with an artificial neural network learned according to a machine learning algorithm. Further, at least one of the STT engine or the NLP engine may be learned by the learning processor 130, may be learned by the learning processor 240 of the AI server 200, or may be learned by distributed processing of the learning processors 130 and 240.

The processor 180 may collect history information including the content of an operation of the AI device 100 or feedback on an operation from the user and may store the collected history information in the memory 170 or the learning processor 130 or may transmit the collected history information to an external device, such as the AI server 200. The collected history information may be used to update a learning model.

The processor 180 may control at least some of the constituent elements of the AI device 100 in order to drive an application program stored in the memory 170. Further, the processor 180 may operate two or more of the constituent elements of the AI device 100 in combination in order to drive the application program.

Figure 4:
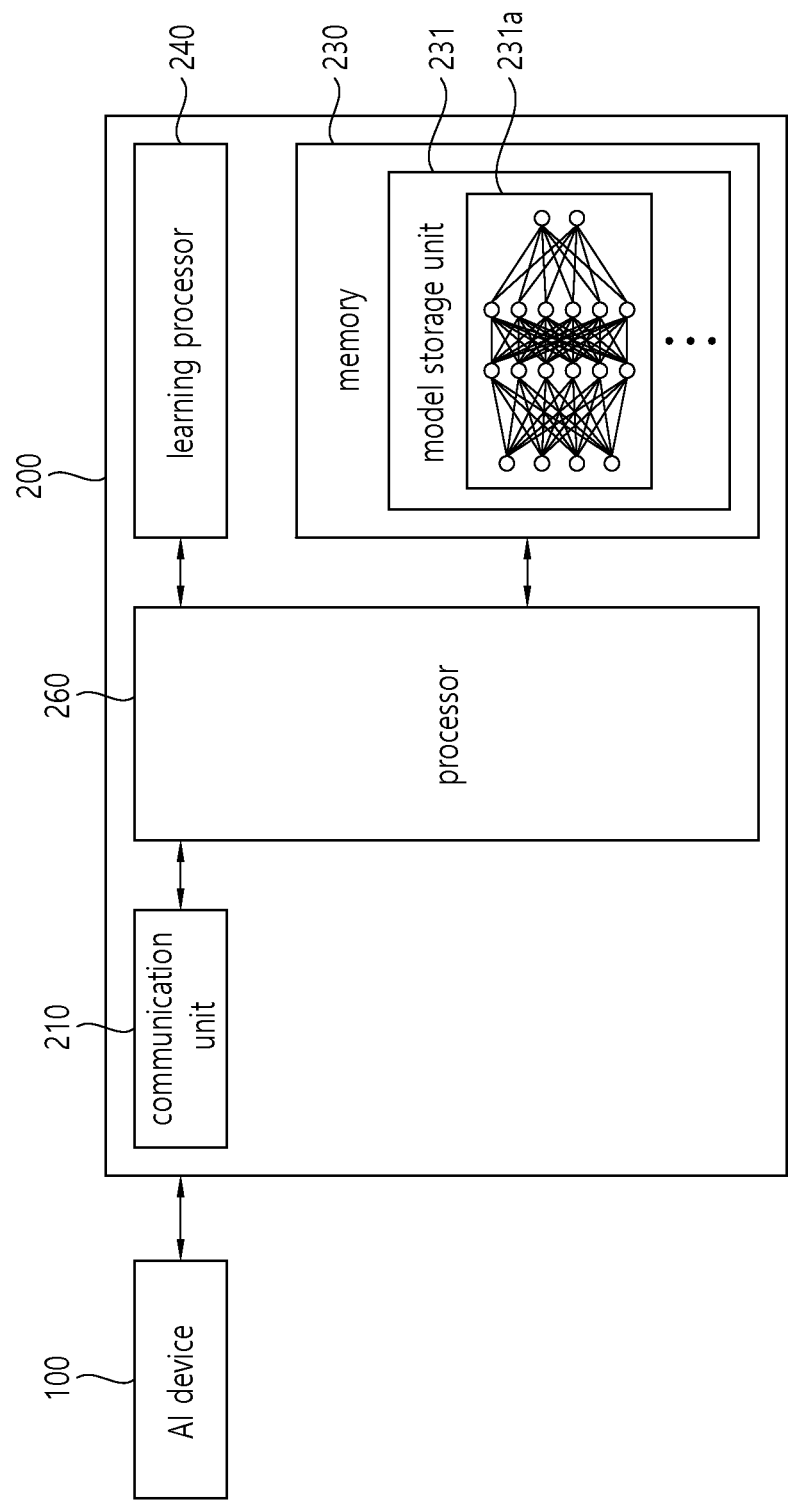
FIG. 4 illustrates an AI server 200 according to an embodiment of the present disclosure.

FIG. 4 illustrates an AI server 200 according to an embodiment of the present disclosure.

Referring to FIG. 4, the AI server 200 may refer to a device that trains an artificial neural network using a machine learning algorithm or uses the trained artificial neural network. The AI server 200 may be configured with a plurality of servers to perform distributed processing and may be defined as a 5G network. The AI server 200 may be included as a constituent element of an AI device 100 to perform at least part of AI processing together with the AI device 100.

The AI server 200 may include a communication unit 210, a memory 230, a learning processor 240, and a processor 260.

The communication unit 210 may transmit and receive data to and from an external device, such as the AI device 100.

The memory 230 may include a model storage unit 231. The model storage unit 231 may store a model (or an artificial neural network) 231*a* which is being learned or has been learned through the learning processor 240.

The learning processor 240 may train the artificial neural network 231*a* using learning data. A learning model may be used, being mounted in the AI server 200 of the artificial neural network or being mounted in an external device, such as the AI device 100.

The learning model may be configured in hardware, software, or a combination of hardware and software. When the learning model is partially or entirely configured in software, one or more instructions forming the learning model may be stored in the memory 230.

The processor 260 may infer a result value for newly input data using the learning model and may generate a response or a control command based on the inferred result value.

Figure 5:
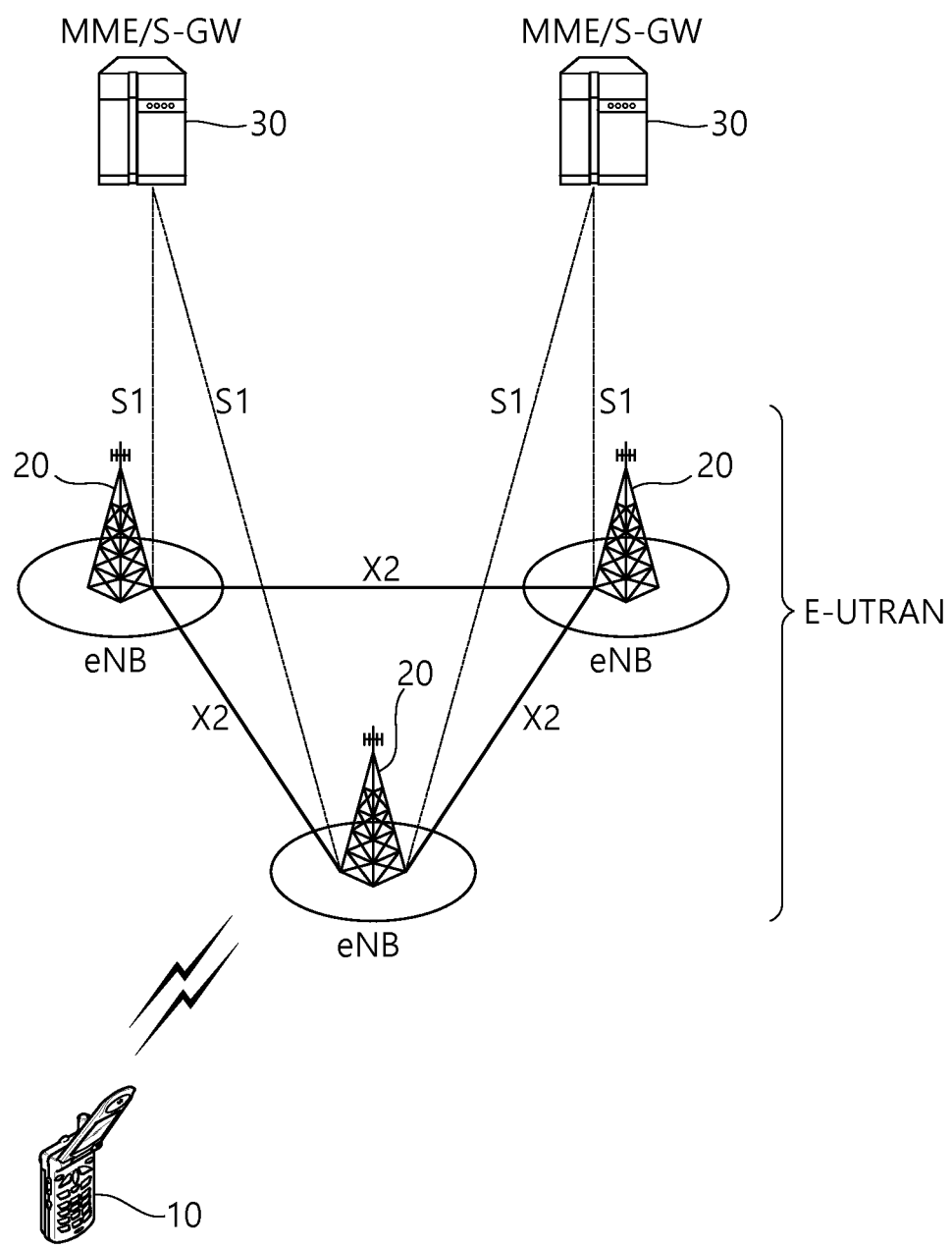
FIG. 5 shows a wireless communication system to which the present disclosure may be applied.

FIG. 5 shows a wireless communication system to which the present disclosure may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 6:
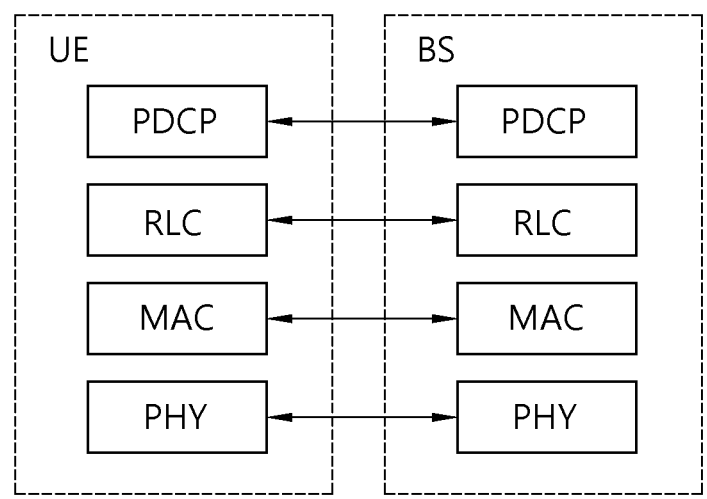
FIG. 6 is a diagram showing a wireless protocol architecture for a user plane.
Figure 7:
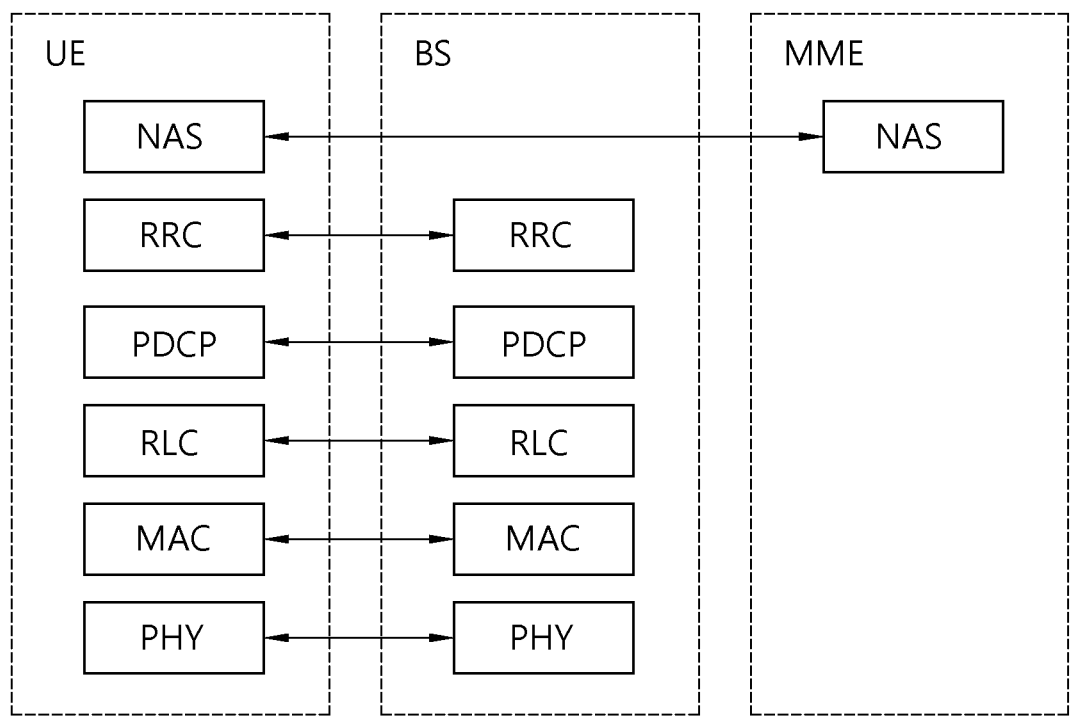
FIG. 7 is a diagram showing a wireless protocol architecture for a control plane.

FIG. 6 is a diagram showing a wireless protocol architecture for a user plane. FIG. 7 is a diagram showing a wireless protocol architecture for a control plane. The user plane is a protocol stack for user data transmission. The control plane is a protocol stack for control signal transmission.

Referring to FIGS. 6 and 7, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

Figure 8:
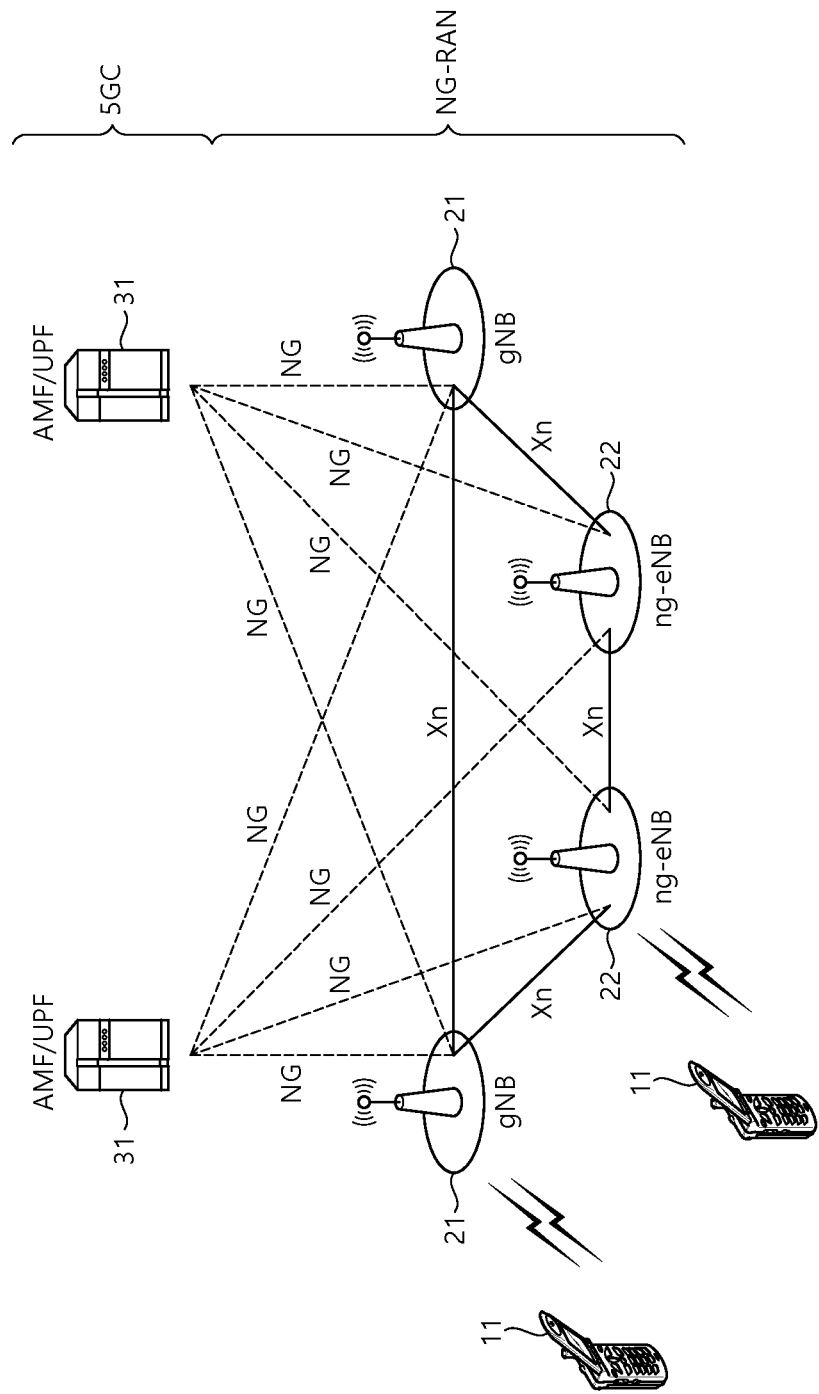
FIG. 8 illustrates another example of a wireless communication system to which technical features of the present disclosure are applicable.

FIG. 8 illustrates another example of a wireless communication system to which technical features of the present disclosure are applicable.

Specifically, FIG. 8 shows system architecture based on a 5G new radio access technology (NR) system. Entities used in the 5G NR system (hereinafter, simply referred to as "NR") may absorb some or all functions of the entities (e.g., the eNB, the MME, and the S-GW) introduced in FIG. 5. The entities used in the NR system may be identified by terms with "NG" to be distinguished from LTE entities.

Referring to FIG. 8, the wireless communication system includes at least one UE 11, a next-generation RAN (NG-RAN), and a 5G core network (5GC). The NG-RAN includes at least one NG-RAN node. The NG-RAN node is an entity corresponding to the BS 20 illustrated in FIG. 5. The NG-RAN node includes at least one gNB 21 and/or at least one ng-eNB 22. The gNB 21 provides an end point of NR control-plane and user-plane protocols to the UE 11. The ng-eNB 22 provides an end point of E-UTRA user-plane and control-plane protocols to the UE 11.

The 5GC includes an access and mobility management function (AMF), a user plane function (UPF), and a session management function (SMF). The AMF hosts functions of NAS security and idle-state mobility processing. The AMF is an entity that includes the functions of a conventional MME. The UPF hosts functions of mobility anchoring function and protocol data unit (PDU) processing. The UPF is an entity that includes the functions of a conventional S-GW. The SMF hosts functions of UE IP address allocation and PDU session control.

The gNB and the ng-eNB are connected to each other via an Xn interface. The gNB and the ng-eNB are also connected to the 5GC through an NG interface. Specifically, the gNB and the ng-eNB are connected to the AMF through an NG-C interface, and to the UPF through an NG-U interface.

Figure 9:
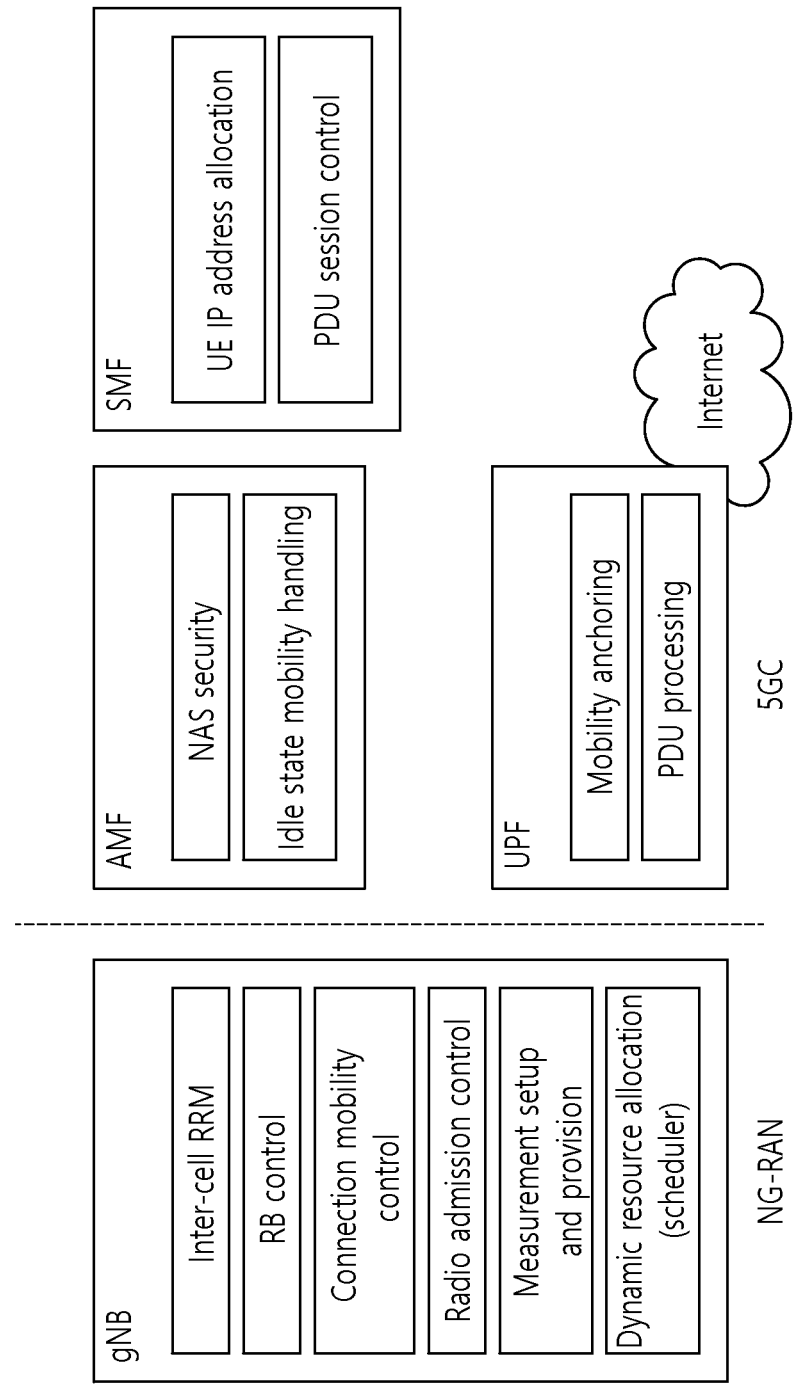
FIG. 9 illustrates a functional division between an NG-RAN and a 5GC.

FIG. 9 illustrates a functional division between an NG-RAN and a 5GC.

Referring to FIG. 9, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 10:
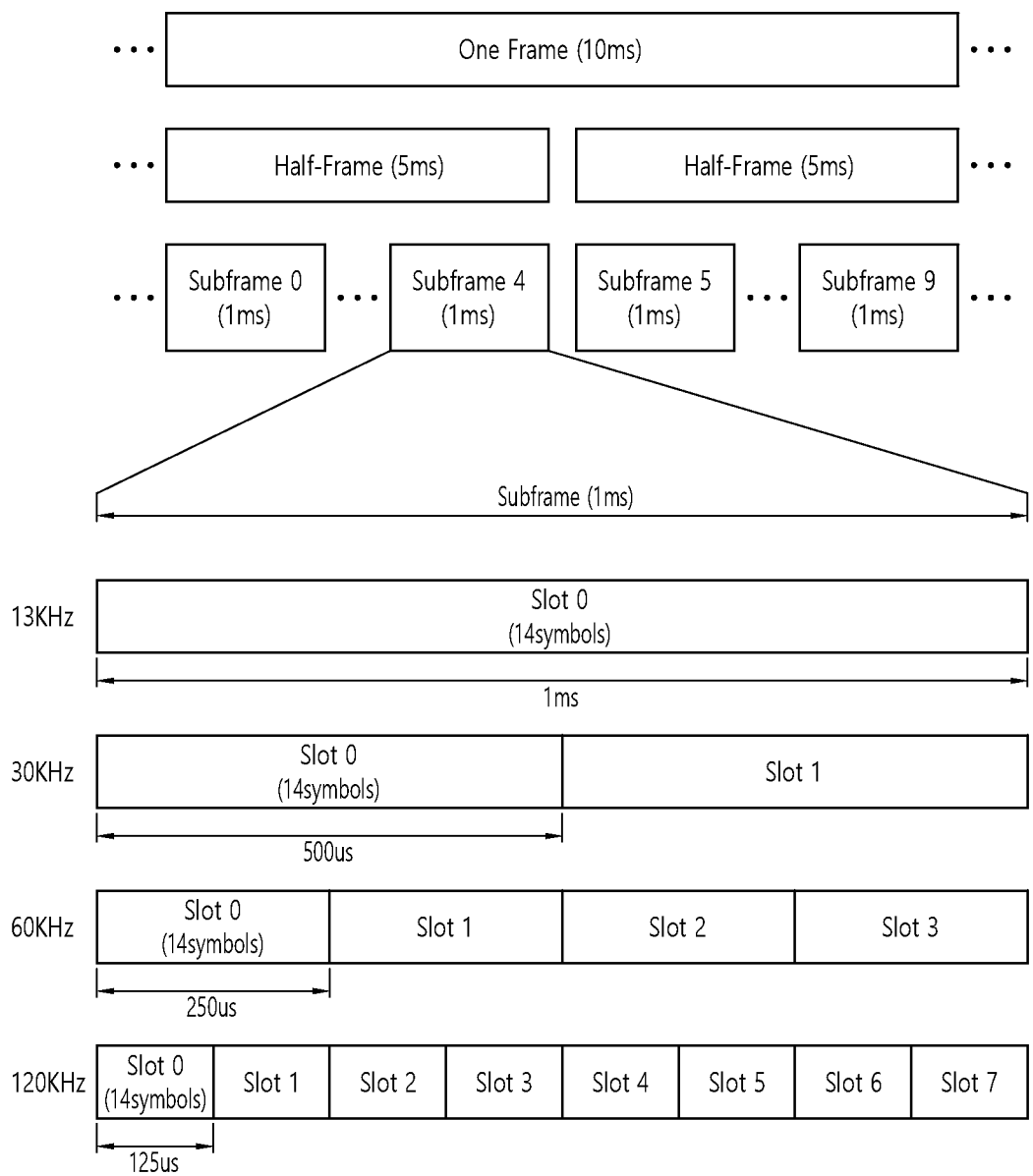
FIG. 10 illustrates an example of a frame structure that may be applied in NR.

FIG. 10 illustrates an example of a frame structure that may be applied in NR.

Referring to FIG. 10, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | Δf = $2^\mu \cdot 15$[kHz] | Cyclic prefix |
|---|---|---|
| 0 | 15 | Normal |
| 1 | 30 | Normal |
| 2 | 60 | Normal |
|   |    | Extended |
| 3 | 120 | normal |
| 4 | 240 | normal |

The following table 2 illustrates the number of slots in a frame ($N^{frame,\mu}_{slot}$), the number of slots in a subframe ($N^{subframe,\mu}N_{slot}$), the number of symbols in a slot ($N^{slot}_{symb}$), and the like, according to subcarrier spacing configurations μ.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 11:
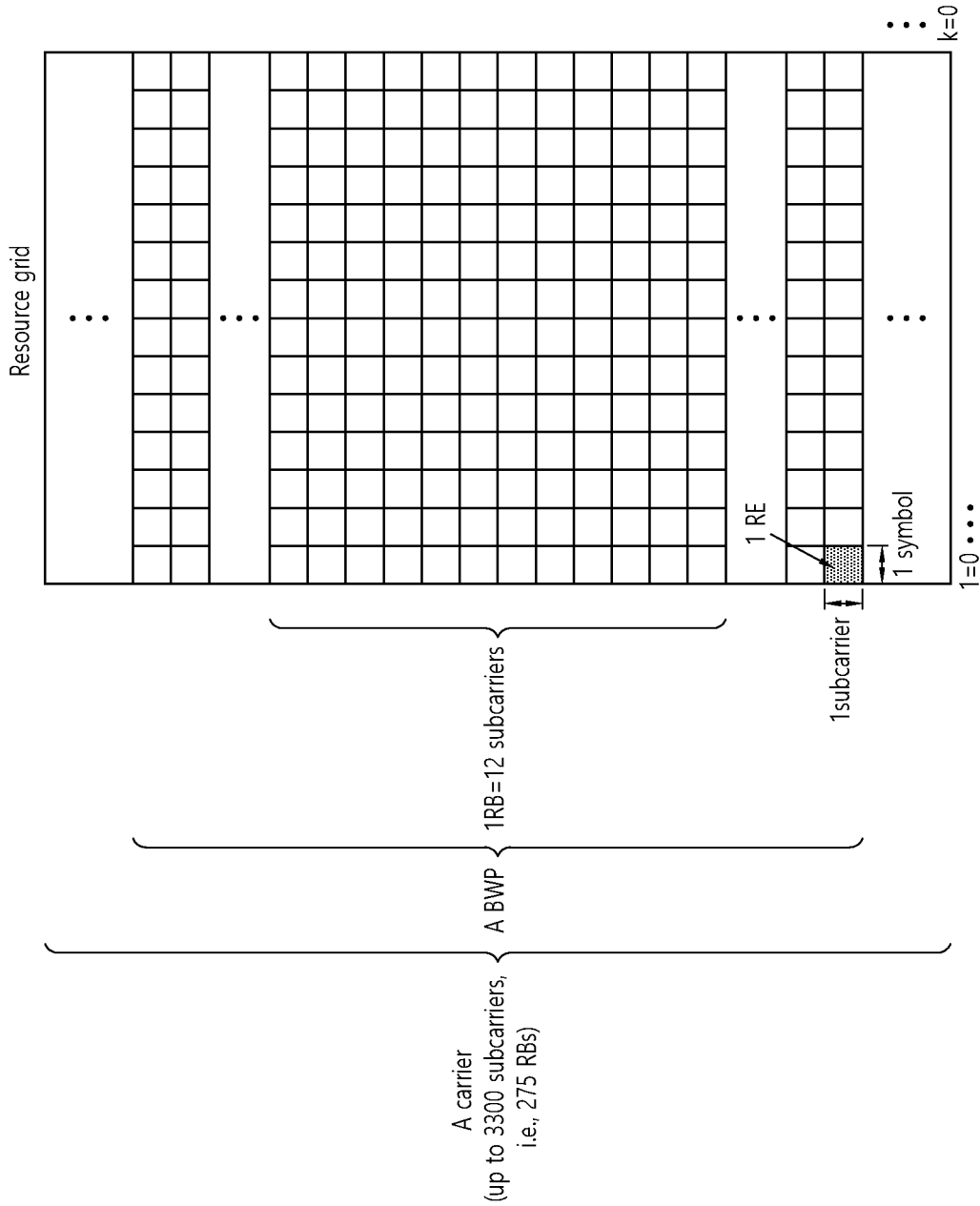
FIG. 11 illustrates a slot structure.

FIG. 11 illustrates a slot structure.

Referring to FIG. 11, a slot includes a plurality of symbols in the time domain. For example, when a normal CP is used, one slot may include 14 symbols; when an extended CP is used, one slot may include 12 symbols. Alternatively, when a normal CP is used, one slot may include 7 symbols; when an extended CP is used, one slot may include 6 symbols.

A carrier includes a plurality of subcarriers in the frequency domain. A resource block (RB) may be defined as a plurality of (e.g., 12) contiguous subcarriers in the frequency domain. A bandwidth part (BWP) may be defined as a plurality of contiguous (P)RBs in the frequency domain and may correspond to one numerology (e.g., SCS, CP length, or the like). A carrier may include up to N (e.g., 5) BWPs. Data communication may be performed through an activated BWP. Each element in a resource grid may be referred to as a resource element (RE) and may be mapped to one complex symbol.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 12:
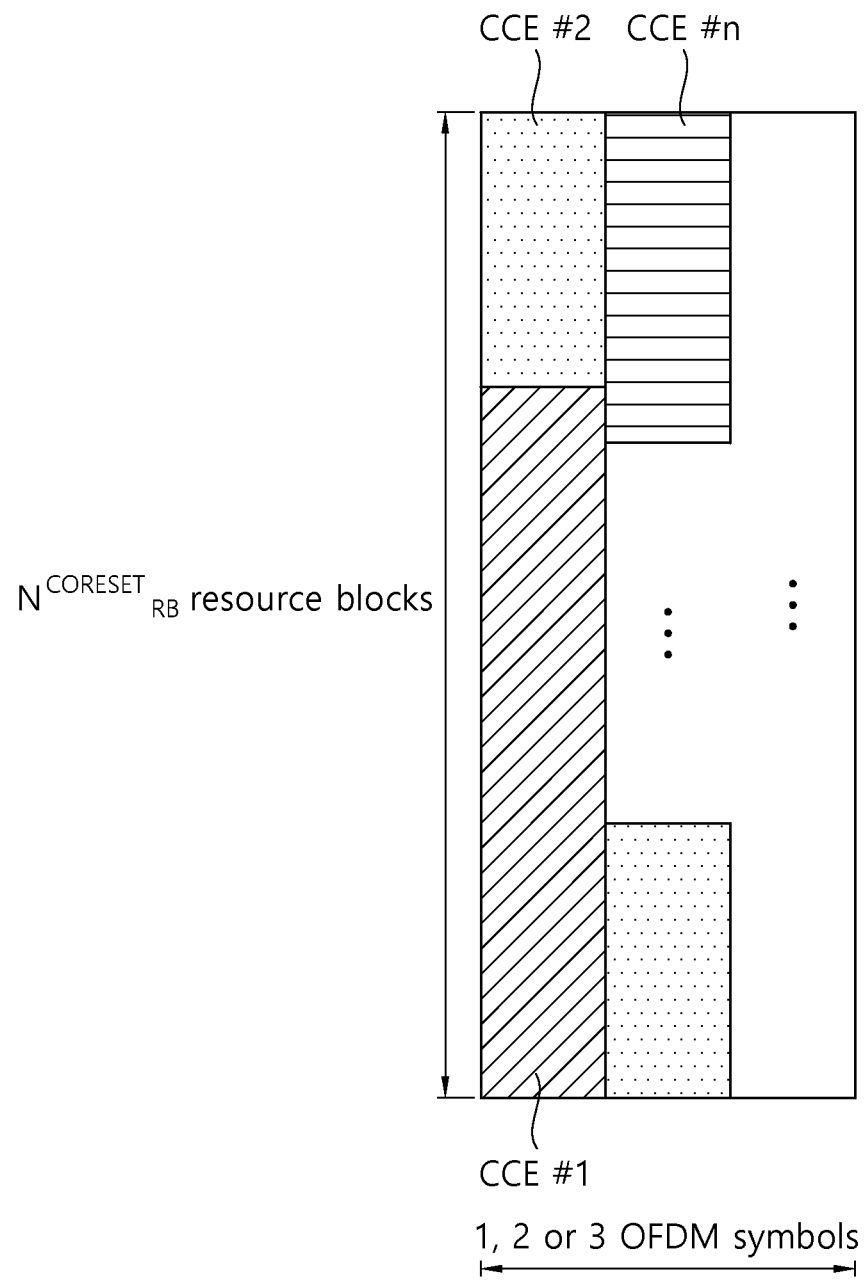
FIG. 12 illustrates CORESET.

FIG. 12 illustrates CORESET.

Referring to FIG. 12, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 12, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 13:
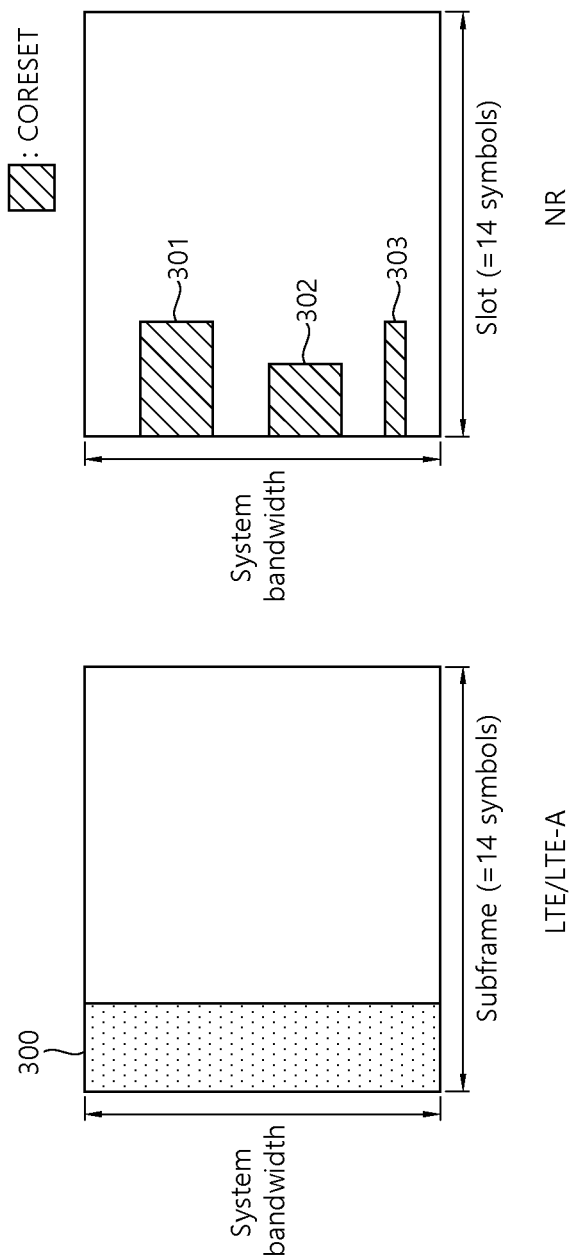
FIG. 13 is a diagram illustrating a difference between a related art control region and the CORESET in NR.

FIG. 13 is a diagram illustrating a difference between a related art control region and the CORESET in NR.

Referring to FIG. 13, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 13, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 14:
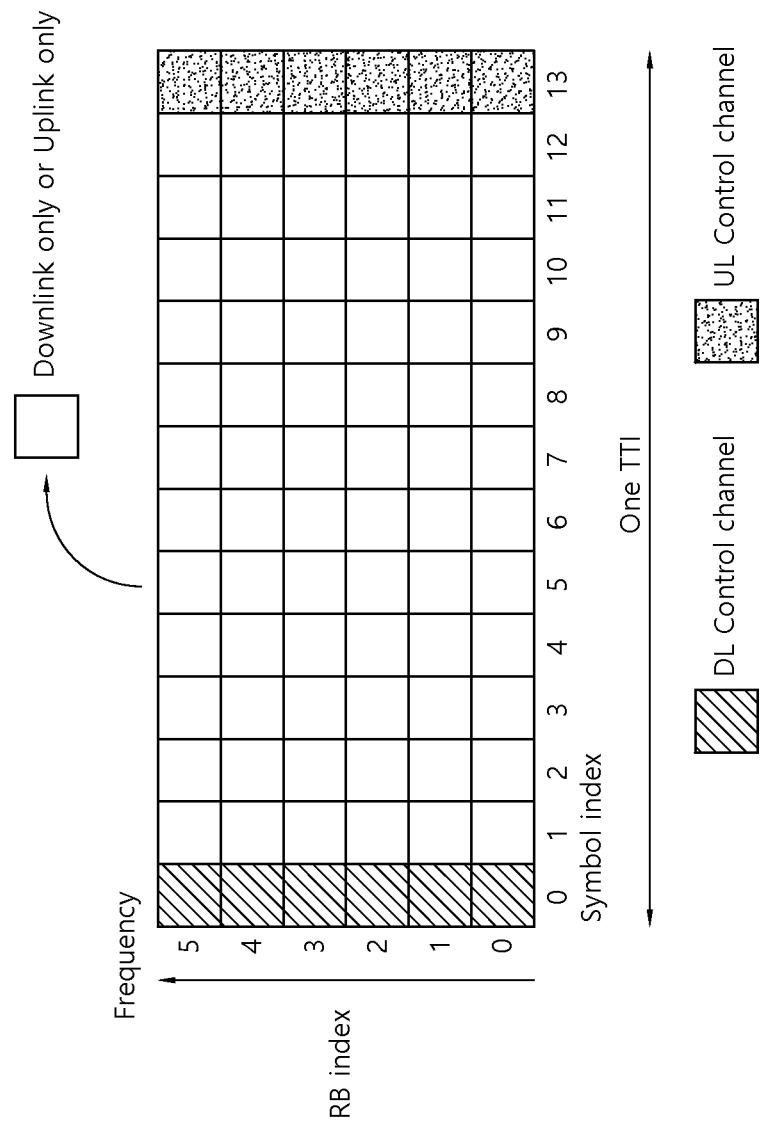
FIG. 14 illustrates an example of a frame structure for new radio access technology.

FIG. 14 illustrates an example of a frame structure for new radio access technology.

In NR, a structure in which a control channel and a data channel are time-division-multiplexed within one TTI, as shown in FIG. 14, can be considered as a frame structure in order to minimize latency.

In FIG. 14, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 15:
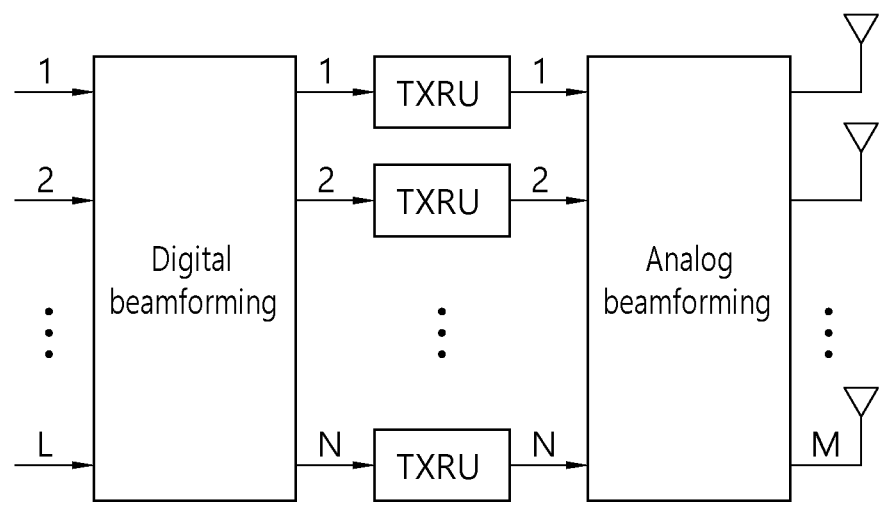
FIG. 15 is an abstract schematic diagram illustrating hybrid beamforming from the viewpoint of TXRUs and physical antennas.

FIG. 15 is an abstract schematic diagram illustrating hybrid beamforming from the viewpoint of TXRUs and physical antennas.

In FIG. 15, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 15, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 16:
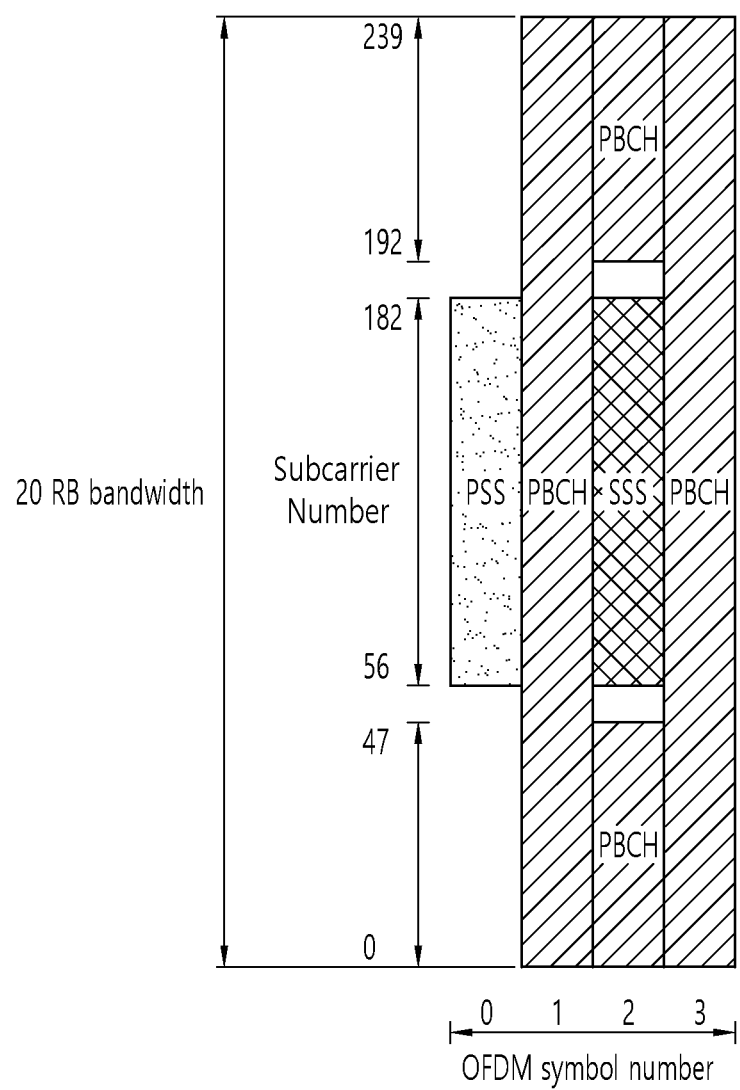
FIG. 16 schematically illustrates a synchronization signal/PBCH (SS/PBCH) block.

FIG. 16 schematically illustrates a synchronization signal/PBCH (SS/PBCH) block.

Referring to FIG. 16, an SS/PBCH block may include a PSS and an SSS, each of which occupies one symbol and 127 subcarriers, and a PBCH, which spans three OFDM symbols and 240 subcarriers where one symbol may include an unoccupied portion in the middle reserved for the SSS. The periodicity of the SS/PBCH block may be configured by a network, and a time position for transmitting the SS/PBCH block may be determined on the basis of subcarrier spacing.

Polar coding may be used for the PBCH. A UE may assume band-specific subcarrier spacing for the SS/PBCH block as long as a network does not configure the UE to assume different subcarrier spacings.

The PBCH symbols carry frequency-multiplexed DMRS thereof. QPSK may be used for the PBCH. 1008 unique physical-layer cell IDs may be assigned.

Regarding a half frame having SS/PBCH blocks, the indexes of first symbols of candidate SS/PBCH blocks are determined according to the subcarrier spacing of SS/PBCH blocks described blow.

Case A—Subcarrier spacing of 15 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case B—Subcarrier spacing of 30 kHz: The first symbols of the candidate SS/PBCH blocks have an index represented by {4, 8, 16, 20}+28*n where n=0 for a carrier frequency of 3 GHz or less and n=0, 1 for a carrier frequency which is greater than 3 GHz and is less than or equal to 6 GHz.

Case C—Subcarrier spacing of 30 kHz: The first symbols of the candidate SS/PBCH blocks have an index represented by {2, 8}+14*n where n=0, 1 for a carrier frequency of 3 GHz or less and n=0, 1, 2, 3 for a carrier frequency which is greater than 3 GHz and is less than or equal to 6 GHz.

Case D—Subcarrier spacing of 120 kHz: The first symbols of the candidate SS/PBCH blocks have an index represented by {4, 8, 16, 20}+28*n where n=0, 1, 2, 3, 5, 6, 7, 8, 10, 11, 12, 13, 15, 16, 17, 18 for a carrier frequency greater than 6 GHz.

Case E—Subcarrier spacing of 240 kHz: The first symbols of the candidate SS/PBCH blocks have an index represented by {8, 12, 16, 20, 32, 36, 40, 44}+56*n where n=0, 1, 2, 3, 5, 6, 7, 8 for a carrier frequency greater than 6 GHz.

The candidate SS/PBCH blocks in the half frame are indexed in ascending order from 0 to L−1 on the time axis. The UE needs to determine two LSBs for L=4 of the SS/PBCH block index per half frame and three LSBs for L>4 from one-to-one mapping with the index of a DM-RS sequence transmitted in the PBCH. For L=64, the UE needs to determine three MSBs of the SS/PBCH block index per half frame by PBCH payload bits.

The indexes of SS/PBCH blocks in which the UE cannot receive other signals or channels in REs overlapping with REs corresponding to the SS/PBCH blocks may be set via a higher-layer parameter 'SSB-transmitted-SIB1'. Further, the indexes of SS/PBCH blocks per serving cell in which the UE cannot receive other signals or channels in REs overlapping with REs corresponding to the SS/PBCH blocks may be set via a higher-layer parameter 'SSB-transmitted'. The setting via 'SSB-transmitted' may override the setting via 'SSB-transmitted-SIB1'. The periodicity of a half frame for reception of SS/PBCH blocks per serving cell may be set via a higher-layer parameter 'SSB-periodicityServingCell'. When the UE does not receive the setting of the periodicity of the half frame for the reception of the SS/PBCH blocks, the UE needs to assume the periodicity of the half frame. The UE may assume that the periodicity is the same for all SS/PBCH blocks in a serving cell.

Figure 17:
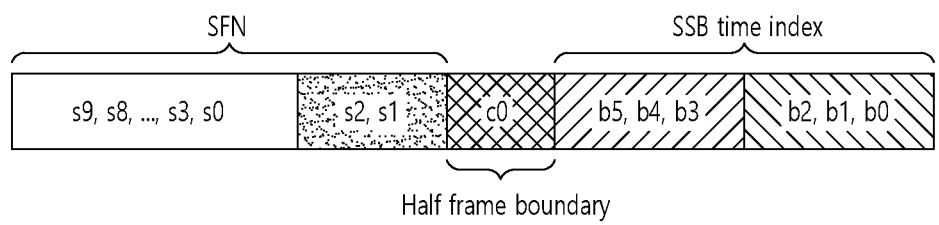
FIG. 17 illustrates a method for a UE to obtain timing information.

FIG. 17 illustrates a method for a UE to obtain timing information.

First, a UE may obtain six-bit SFN information through a master information block (MIB) received in a PBCH. Further, the UE may obtain a four-bit SFN in a PBCH transport block.

Second, the UE may obtain a one-bit half frame indicator as part of a PBCH payload. In less than 3 GHz, the half frame indicator may be implicitly signaled as part of a PBCH DMRS for Lmax=4.

Finally, the UE may obtain an SS/PBCH block index by a DMRS sequence and the PBCH payload. That is, the UE may obtain three bits of LSB of the SS block index by the DMRS sequence for a period of 5 ms. Also, three bits of MSB of timing information are explicitly carried in the PBCH payload (for more than 6 GHz).

In initial cell selection, the UE may assume that a half frame having SS/PBCH blocks occurs with a periodicity of two frames. Upon detecting an SS/PBCH block, when $k_{SSB} \leq 23$ for FR1 and $k_{SSB} \leq 11$ for FR2, the UE determines that a control resource set for a Type0-PDCCH common search space exists. When $k_{SSB} > 23$ for FR1 and $k_{SSB} > 11$ for FR2, the UE determines that there is no control resource set for the Type0-PDCCH common search space.

For a serving cell in which SS/PBCH blocks are not transmitted, the UE obtains time and frequency synchronization of the serving cell based on reception of SS/PBCH blocks on a PCell or PSCell of a cell group for the serving cell.

Hereinafter, acquisition of system information will be described.

System information (SI) is divided into a master information block (MIB) and a plurality of system information blocks (SIBs) where:
the MIB is transmitted always on a BCH according to a period of 40 ms, is repeated within 80 ms, and includes parameters necessary to obtain system information block type1 (SIB1) from a cell;
SIB1 is periodically and repeatedly transmitted on a DL-SCH. SIB1 includes information on availability and scheduling (e.g., periodicity or SI window size) of other SIBs. Further, SIB1 indicates whether the SIBs (i.e., the other SIBs) are periodically broadcast or are provided by request. When the other SIBs are provided by request, SIB1 includes information for a UE to request SI;
SIBs other than SIB1 are carried via system information (SI) messages transmitted on the DL-SCH. Each SI message is transmitted within a time-domain window (referred to as an SI window) periodically occurring;
For a PSCell and SCells, an RAN provides required SI by dedicated signaling. Nevertheless, a UE needs to acquire an MIB of the PSCell in order to obtain the SFN timing of a SCH (which may be different from an MCG). When relevant SI for a SCell is changed, the RAN releases and adds the related SCell. For the PSCell, SI can be changed only by reconfiguration with synchronization (sync).

Figure 18:
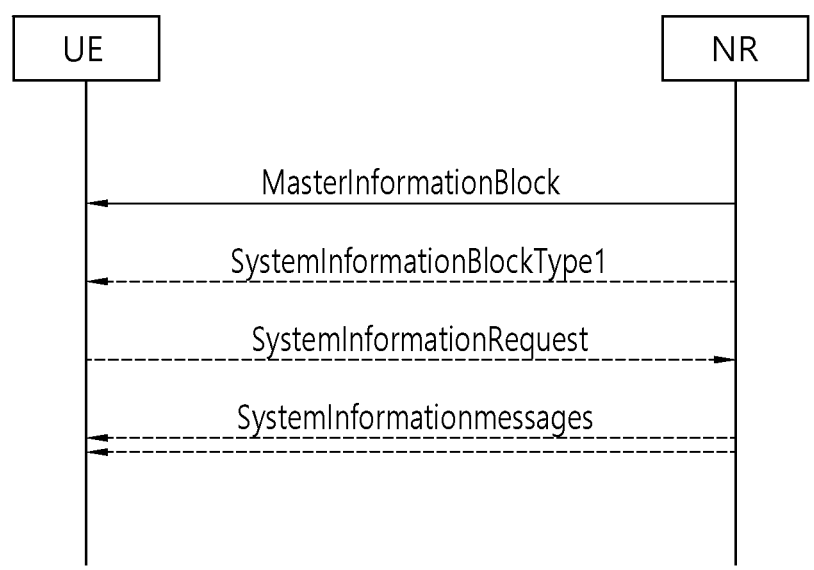
FIG. 18 illustrates an example of a system information acquisition process of a UE.

FIG. 18 illustrates an example of a system information acquisition process of a UE.

Referring to FIG. 18, the UE may receive an MIB from a network and may then receive SIB1. Subsequently, the UE may transmit a system information request to the network and may receive a system information message from the network in response.

The UE may apply a system information acquisition procedure for acquiring access stratum (AS) and non-access stratum (NAS) information.

In RRC_IDLE and RRC_INACTIVE states, the UE needs to ensure valid versions of (at least) the MIB, SIB1, and system information block type X (according to relevant RAT support for mobility controlled by the UE).

In an RRC_CONNECTED state, the UE needs to ensure valid versions of the MIB, SIB1, and system information block type X (according to mobility support for relevant RAT).

The UE needs to store relevant SI obtained from a currently camping/serving cell. The version of the SI obtained and stored by the UE is valid only for a certain period of time. The UE may use this version of the stored SI, for example, after cell reselection, after return from out of coverage, or after indication of a system information change.

Hereinafter, random access will be described.

A UE's random access procedure may be summarized in Table 4.

TABLE 4

| | Type of signal | Operation/obtained information |
| --- | --- | --- |
| Step 1 | Uplink PRACH preamble | To obtain initial beam Random election of RA-preamble ID |
| Step 2 | Random access response on DL-SCH | Timing alignment information RA-preamble ID Initial uplink grant, temporary C-RNTI |
| Step 3 | Uplink transmission on UL-SCH | RRC connection request UE identifier |
| Step 4 | Downlink contention resolution | C-RNTI on PDCCH for initial access C-RNTI on PDCCH for RRC_CONNECTED UE |

Figure 19:
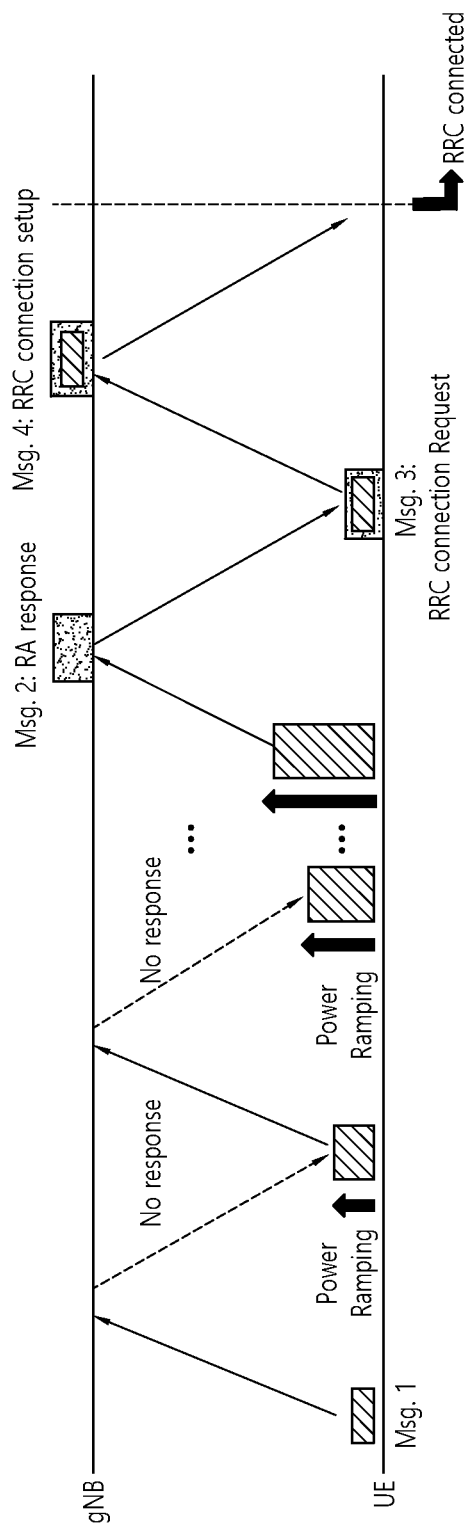
FIG. 19 illustrates a random access procedure.

FIG. 19 illustrates a random access procedure.

Referring to FIG. 19, first, a UE may transmit a PRACH preamble as Msg 1 of the random access procedure via an uplink.

Two random access preamble sequences having different lengths are supported. A long sequence having a length of 839 is applied to a subcarrier spacing of 1.25 kHz and 5 kHz, and a short sequence having a length of 139 is applied to a subcarrier spacing of 15 kHz, 30 kHz, 60 kHz, and 120 kHz. The long sequence supports an unrestricted set and restricted sets of type A and type B, while the short sequence may support only an unrestricted set.

A plurality of RACH preamble formats is defined by one or more RACH OFDM symbols, different cyclic prefixes (CPs), and a guard time. A PRACH preamble setting to be used is provided to the UE as system information.

When there is no response to Msg1, the UE may retransmit the power-ramped PRACH preamble within a specified number of times. The UE calculates PRACH transmission power for retransmission of the preamble based on the most recent estimated path loss and a power ramping counter. When the UE performs beam switching, the power ramping counter does not change.

Figure 20:
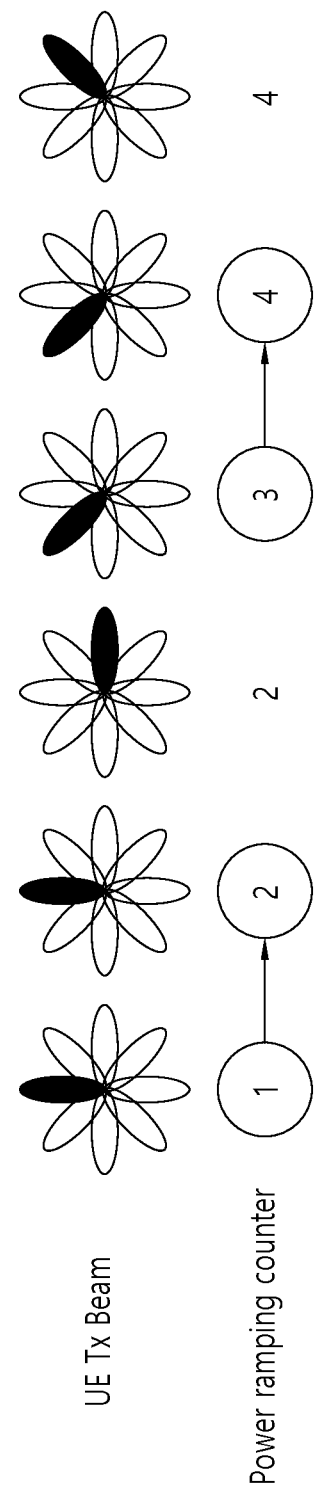
FIG. 20 illustrates a power ramping counter.

FIG. 20 illustrates a power ramping counter.

A UE may perform power ramping for retransmission of a random access preamble based on a power ramping counter. Here, as described above, when the UE performs beam switching in PRACH retransmission, the power ramping counter does not change.

Referring to FIG. 20, when the UE retransmits the random access preamble for the same beam, the UE increases the power ramping counter by 1, for example, the power ramping counter is increased from 1 to 2 and from 3 to 4. However, when the beam is changed, the power ramping counter does not change in PRACH retransmission.

Figure 21:
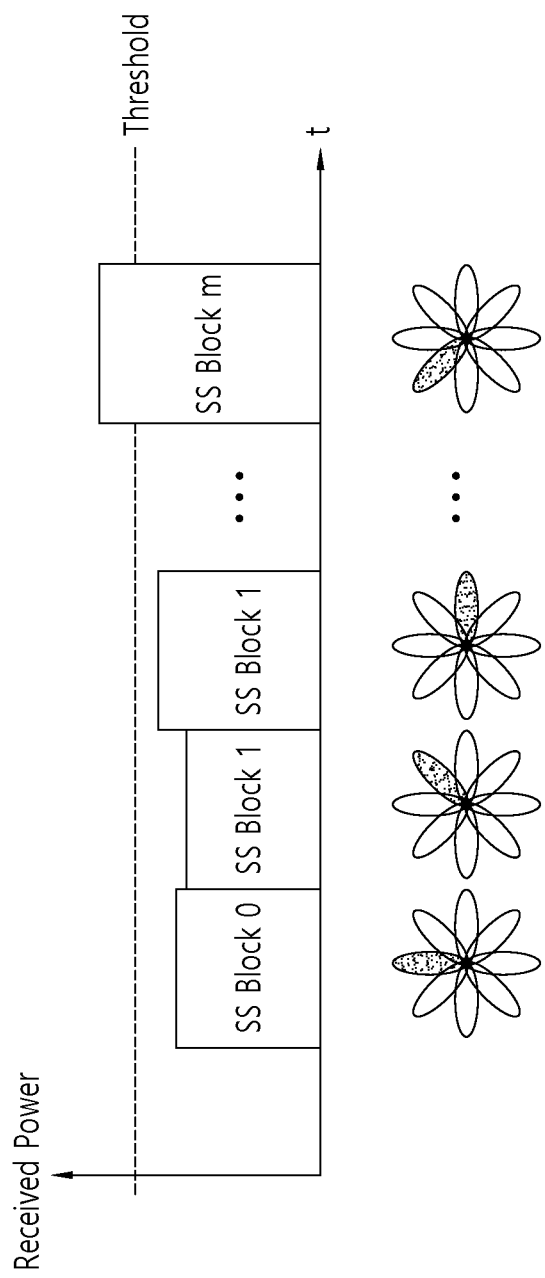
FIG. 21 illustrates the concept of the threshold of an SS block in a relationship with an RACH resource.

FIG. 21 illustrates the concept of the threshold of an SS block in a relationship with an RACH resource.

A UE knows the relationship between SS blocks and RACH resources through system information. The threshold of an SS block in a relationship with an RACH resource is based on RSRP and a network configuration. Transmission or retransmission of a RACH preamble is based on an SS block satisfying the threshold. Therefore, in the example of FIG. 21, since SS block m exceeds the threshold of received power, the RACH preamble is transmitted or retransmitted based on SS block m.

Subsequently, when the UE receives a random access response on a DL-SCH, the DL-SCH may provide timing alignment information, an RA-preamble ID, an initial uplink grant, and a temporary C-RNTI.

Based on the information, the UE may perform uplink transmission of Msg3 of the random access procedure on a UL-SCH. Msg3 may include an RRC connection request and a UE identifier.

In response, a network may transmit Msg4, which can be considered as a contention resolution message, via a downlink. Upon receiving this message, the UE can enter the RRC-connected state.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. A BWP can be composed of resource blocks (RBs) consecutive on the frequency axis and can correspond to one numerology (e.g., a subcarrier spacing, a cyclic prefix (CP) length, a slot/mini-slot duration, or the like).

Further, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with (=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Hereinafter, a channel access procedure according to licensed-assisted access (LAA) will be described. Here, LAA may refer to a method of performing data transmission and reception in an unlicensed band in combination with an unlicensed band (e.g., a Wi-Fi band). Here, a cell accessed by a UE in the unlicensed band may be referred to as a USCell (or LAA SCell), and a cell accessed by the UE in the licensed band may be referred to as a PCell.

First, a downlink channel access procedure will be described.

An eNB operating with LAA SCell(s) needs to perform the following channel access procedure to access channels on which transmission(s) of LSS SCell(s) are performed.

Hereinafter, a channel access procedure for transmission(s) including a PDSCH/PDCCH/EPDCCH will be described.

When a channel in an idle state is sensed first for a slot duration of a defer duration $T_d$ and a counter N is 0 in step 4, the eNB can perform transmission including PDSCH/PDCCH/EPDCCH on a carrier on which transmission(s) of LAA SCell(s) are performed. The counter N is adjusted by sensing a channel additional slot duration(s) according to the steps below.

1) N is set to $N=N_{init}$. Here, $N_{init}$ is an arbitrary number uniformly distributed between 0 and $CW_p$. Then, the procedure proceeds to step 4.

2) If N>0 and the eNB selects decreasing of the counter, N=N−1 is set.

3) When a channel with respect to an additional slot duration is sensed and the additional slot duration is idle, the procedure proceeds to step 4. If not, the procedure proceeds to step 5.

4) The procedure ends if N=0 and proceeds to step 2 if not.

5) The channel is sensed until a busy slot is detected within the additional defer duration $T_d$ or all slots of the additional defer duration $T_d$ are sensed as being idle.

6) If it is sensed that the channel is idle in all slot durations of the additional defer duration $T_d$, the procedure proceeds to step 4. If not, the procedure proceeds to step 5.

When the eNB has not perform transmission including PDSCH/PDCCH/EPDCCH on a carrier on which transmission(s) of LAA SCell(s) are performed after step 4 of the procedure, if the eNB is ready to transmit the PDSCH/PDCCH/EPDCCH, the eNB can perform transmission including PDSCH/PDCCH/EPDCCH on the carrier when it is sensed that the channel is idle in at least a slot duration $T_{sl}$ and the channel is idle in all slot durations of the defer duration $T_d$ immediately before the transmission. When the eNB senses that the channel is not idle in the slot duration $T_{sl}$ or senses that the channel is not idle in arbitrary slot durations of the defer duration $T_d$ immediately before intended transmission when the eNB initially senses the channel after the eNB is ready to perform transmission, the eNB senses that the channel is idle in slot durations of the defer duration $T_d$ and then proceeds to step 1.

The defer duration $T_d$ is configured as a duration of $T_f$=16 μs immediately after consecutive slot durations $m_p$. Here, each slot duration is $T_{sl}$=9 μs and $T_f$ includes an idle slot duration $T_{sl}$ at the start point of $T_f$.

The slot duration $T_{sl}$ is considered to be idle when the eNB senses the channel for the slot duration and power detected at least for 4 us by the eNB in the slot duration is lower than an energy detection threshold $X_{Thresh}$. Otherwise, the slot duration $T_{sl}$ is considered to be busy.

$CW_p$ ($CW_{min,p} \leq CW_p \leq CW_{max,p}$) is a contention window. Application of $CW_p$ will be described in a contention window application procedure.

$CW_{min,p}$ and $CW_{max,p}$ are selected before step 1 of the foregoing procedure.

As illustrated in Table 3, $m_p$, $CW_{min,p}$, and $CW_{max,p}$ are based on a channel access priority class related to eNB transmission.

Adjustment of $X_{Thresh}$ will be described in an energy detection threshold adaptation procedure.

If N>0 in the aforementioned procedure, when the eNB transmits a discovery signal that does not include a PDSCH/PDCCH/EPDCCH, the eNB should not reduce N in slot duration(s) overlapping with discovery signal transmission.

The eNB should not perform continuous transmission on a carrier on which transmission(s) of LAA SCell(s) are performed for a duration that exceeds $T_{mcot,p}$ given in Table 3.

If absence of other technologies sharing carriers can be ensured in the long term (for example, according to a level of regulation) for p=3 and p=4, $T_{mcot,p}$=10 ms. If not, $T_{mcot,p}$=8 ms.

Table 5 shows a channel access priority class.

TABLE 5

| Channel access priority class (p) | $m_p$ | $CW_{min, p}$ | $CW_{max, p}$ | $T_{mcot, p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, a channel access procedure for transmissions including discovery signal transmission(s) without a PDSCH will be described.

An eNB can transmit a discovery signal without a PDSCH on a carrier on which transmission(s) of LAA SCell(s) are performed if a transmission duration is less than 1 ms immediately after sensing that a channel is idle for at least a sensing interval of $T_{drs}$=25 μs. $T_{drs}$ is configured as $T_f$=16 μs immediately after one slot duration $T_{sl}$=9 μs and $T_f$ includes the idle slot duration $T_{sl}$ at the start point of $T_f$. If it is sensed that the channel is idle for slot durations of $T_{drs}$, the channel is considered to be idle for $T_{drs}$.

Hereinafter, a contention window adjustment procedure will be described.

When an eNB performs transmissions including a PDSCH related to channel access priority class p on a carrier, the eNB maintains a contention window value $CW_p$, and adjusts $CW_p$ for transmissions using the following steps before step 1 of the foregoing procedure.

1) For all priority classes p∈{1, 2, 3, 4}, $CW_p$=$CW_{min,p}$ is set.

2) If at least Z=80% of HARQ-ACK values corresponding to PDSCH transmission(s) is determined to be NACK in a reference subframe k, the procedure increases $CW_p$ to a next highest permitted value for all priority classes p∈{1, 2, 3, 4} and remains in step 2. If not, the procedure proceeds to step 1.

The reference subframe k is a subframe in which most recent transmission performed by an eNB on a carrier expected to be available for at least some HARQ-ACK feedbacks starts.

The eNB needs to adjust the value of $CW_p$ for all priority classes p∈{1, 2, 3, 4} only once on the basis of the given reference subframe k.

If $CW_p$=$CW_{max,p}$, the next highest permitted value $CW_{max,p}$ for $CW_p$ adjustment.

When Z is determined,

If eNB transmission(s) available for HARQ-ACK feedback start at the second slot of the subframe k, HARQ-ACK values corresponding to PDSCH transmission(s) in a subframe k+1 can also be used by being added to HARQ-ACK values corresponding to PDSCH transmission(s) in the subframe k.

If HARQ-ACK values correspond to PDSCH transmission(s) on an LAA SCell allocated according to an (E)PDCCH transmitted on the same LAA SCell,
  if the eNB has not detected HARQ-ACK feedback for PDSCH transmission or the eNB detects "DTX", "NACK/DTX" or "any" state, it is computed as NACK.

If HARQ-ACK values correspond to PDSCH transmission(s) on an LAA SCell allocated according to an (E)PDCCH transmitted on another serving cell,
  f HARQ-ACK feedback for PDSCH transmission is detected by the eNB, "NACK/DTX" or "any" state is computed as NACK and "DTX" state is ignored.

If HARQ-ACK feedback for PDSCH transmission is not detected by the eNB,
  if PUCCH format 1b using channel selection is expected to be used by a UE, "NACK/DTX" state corresponding to "no transmission" is computed as NACK and "DTX" state corresponding to "no transmission" is ignored. If not, HARQ-ACK for PDSCH transmission is ignored.

If PDSCH transmission has two codewords, a HARQ-ACK value of each codeword is separately considered.

Bundled HARQ-ACK over M subframes is considered as M HARQ-ACK responses.

If the eNB performs transmission that includes a PDCCH/EPDCCH having DCI format 0A/0B/4A/4B and does not include a PDSCH associated with channel access priority class p on a channel starting at a time to, the eNB maintains the contention window value $CW_p$ and, adjusts $CW_p$ for transmissions using the following steps prior to step 1 of the above-described procedure.

1) For all priority classes p∈{1, 2, 3, 4}, $CW_p$=$CW_{min,p}$ is set.

2) When 10% or less of UL transport blocks scheduled by the eNB has been successfully received using type-2 channel access procedure within an interval from $t_0$ to $t_0$+$T_{CO}$, the procedure increases $CW_p$ to a next highest permitted value for all priority classes p∈{1, 2, 3, 4} and remains in step 2. If not, the procedure proceeds to step 1.

Here, $T_{CO}$ is calculated as described in a channel access procedure for uplink transmission(s) described below.

If $CW_p=CW_{max,p}$ is consecutively used K times for generation of $N_{init}$, $CW_p$ is reset to $CW_{min,p}$ only for a priority class p at which $CW_p=CW_{max,p}$ is consecutively used K times for generation of $N_{init}$. K is selected by the eNB from a set of values of $\{1, 2, \ldots, 8\}$ for each of priority classes $p \in \{1, 2, 3, 4\}$.

Hereinafter, an energy detection threshold adaptation procedure will be described.

An eNB which is accessing a carrier on which transmission(s) of LAA SCell(s) are performed needs to set the energy detection threshold $X_{Thresh}$ to be equal to or less than a maximum energy detection threshold $X_{Thresh\_max}$.

$X_{Thresh\_max}$ is determined as described later.

If absence of other technologies sharing carriers can be ensured in the long term (for example, according to a level of regulation), $X_{Thresh\_max}=\min\{T_{max}+10\text{ dB}, X_r\}$.

$X_r$ is a maximum energy detection threshold defined in dB according to regulatory requirements when the regulatory requirements are defined. If not, $X_r=T_{max}+10$ dB.

If not, $X_{Thresh\_max}=\max\{-72+10*\log 10\text{ (BWMHz/20 Mhz)}$ dBm, min $\{T_{max}, T_{max}-T_A+(P_H+10*\log 10(\text{BWMHz}/20\text{ MHz})-P_{TX})\}\}$.

Here, $T_A=10$ dB for transmission(s) including a PDSCH.

$T_A=5$ dB for transmissions including discovery signal transmission(s) without a PDSCH.

$P_H=23$ dBm.

PTX is the set maximum eNB output power in dBm with respect to a carrier.

An eNB uses the maximum transmission power set with respect to a single carrier irrespective of whether a single carrier transmission or multi-carrier transmission is used.

$T_{max}$ (dBm)=$10*\log 10(3.16228*10^{-8}$ (mW/MHz)* BWMHz(MHz)).

BWMHz is a single carrier bandwidth in MHz.

Hereinafter, a channel access procedure for transmission(s) on a plurality of carriers will be described.

An eNB can access a plurality of carriers on which transmission(s) of LAA SCells are performed according to one of type-A and type-B procedures described later.

Hereinafter, a type-A multi-carrier access procedure will be described.

An eNB needs to perform channel access on each carrier $c_i \in C$ according to the aforementioned channel access procedure for transmission(s) including a PDSCH/PDCCH/EPDCCH. Here, C is a set of carriers intended to be transmitted by the eNB, $i=0, 1, \ldots, q-1$, and q is the number of carriers intended to be transmitted by the eNB.

The counter N described in the aforementioned channel access procedure for transmission(s) including a DSCH/PDCCH/EPDCCH is determined for each carrier $c_i(c\_i)$ and represented as $N_{c\_i}$. $N_{c\_i}$ is maintained in type A1 or type A2.

Hereinafter, type A1 will be described.

The counter N described in the aforementioned channel access procedure for transmission(s) including a DSCH/PDCCH/EPDCCH is determined for each carrier $c_i$ and represented as $N_{c\_i}$.

If absence of other technologies sharing carriers is not ensured in the long term (for example, according to a level of regulation), when the eNB stops transmission on any one of carrier $c_j \in C$, the eNB can resume $N_{c\_i}$ reduction for each carrier $c_i \neq c_j$ after idle slots are sensed after waiting for a duration of $4T_{sl}$ or after $N_{c\_i}$ is reinitialized.

Hereinafter, type A2 will be described.

The counter N described in the aforementioned channel access procedure for transmission(s) including a DSCH/PDCCH/EPDCCH is determined for a carrier $c_j \in C$ and represented as $N_{c\_i}$. Here, $c_j$ is a carrier having a largest $CW_p$ value. For each carrier $N_{c\_i}=N_{c\_i}$. When the eNB stops transmission on any one carrier for which $N_{c\_i}$ has been determined, the eNB needs to reinitialize $N_{c\_i}$ for all carriers.

Hereinafter, a type-B multi-carrier access procedure will be described.

A carrier $c_j \in C$ is selected by an eNB as follows.

The eNB uniformly randomly selects $c_j$ from C prior to respective transmissions on a plurality of carriers $c_i \in C$, or the eNB does not select $c_j$ more than once per second.

Here, C is a set of carriers intended to be transmitted by the eNB, i is 0, 1, ..., q–1, and q is the number of carriers intended to be transmitted by the eNB.

For transmission on a carrier $c_j$, the eNB needs to perform channel access on a carrier $c_j$ according to the aforementioned channel access procedure including a PDSCH/PDCCH/EPDCCH having a modification for type B1 or type B described below.

For transmission on a carrier corresponding to $c_i \in C$ and $c_i \neq c_j$, for each carrier $c_i$, the eNB needs to sense the carrier $c_i$ for at least the sensing interval $T_{mc}=25$ μs immediately before transmission on the carrier $c_j$ and the eNB can perform transmission on the carrier $c_i$ immediately after sensing that the carrier $c_i$ is idle for at least the sensing interval $T_{mc}$. The carrier $c_i$ is considered to be idle for $T_{mc}$ if it is sensed that a channel is idle for all time intervals in which idle sensing is performed on the carrier $c_j$ within the given interval $T_{mc}$.

The eNB should not continuously perform transmission on a carrier corresponding to $c_i \in C$, $c_i \neq c_j$ for a period that exceeds $T_{mcot,p}$ given in Table 4. Here, the value of $T_{mcot,p}$ is determined using a channel access parameter used for carriers $c_j$.

Hereinafter, type B1 will be described.

A single $CW_p$ value is maintained for a set C of carriers

When $CW_p$ is determined for channel access on a carrier $c_j$, step 2 described in the contention window adjustment procedure is modified as follows.

If at least Z=80% of HARQ-ACK values corresponding to PDSCH transmission(s) in reference subframes k of all carriers $c_i \in C$ is determined to be NACK, the procedure increases $CW_p$ to a next highest permitted value for respective priority classes $p \in \{1, 2, 3, 4\}$. If not, the procedure proceeds to step 1.

Hereinafter, type B2 will be described.

$CW_p$ is independently maintained for each carrier $c_i \in C$ using the aforementioned contention window adjustment procedure.

When $N_{init}$ is determined for carriers $c_j$, the value of $CW_p$ of a carrier $c_{j1} \in C$ is used. Here, $c_{j1}$ is a carrier having a largest $CW_p$ value among all carriers in the set C.

Hereinafter, an uplink channel access procedure will be described.

A UE and an eNB which schedules uplink transmission(s) for the UE need to perform the following procedures to access channel(s) on which transmission(s) of LAA SCell(s) are performed for the UE.

Hereinafter, a channel access procedure for uplink transmission(s) will be described.

A UE can access a carrier on which uplink transmission(s) of LAA SCell(s) are performed according to one of type-1 and type-2 uplink channel access procedures. The type 1 channel access procedure and the type 2 channel access procedure will be described later.

If an uplink grant that schedules PUSCH transmission indicates the type-1 channel access procedure, the UE needs to use the type-1 channel access procedure in order to perform transmissions including PUSCH transmission unless otherwise described.

If the uplink grant that schedules PUSCH transmission indicates the type-2 channel access procedure, the UE needs to use the type-2 channel access procedure in order to perform transmissions including PUSCH transmission unless otherwise described.

The UE needs to use the type-1 channel access procedure when the UE performs SRS transmissions including no PUSCH transmission. An uplink channel access priority class p=1 is used for SRS transmissions including no PUSCH.

Table 6 shows a channel access priority class for uplink.

TABLE 6

| Channel access priority class (p) | $m_p$ | $CW_{min,p}$ | $CW_{max,p}$ | $T_{ulmcot,p}$ | Allowed $CW_p$ sizes |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Note 1:
$T_{ulmcot,p}$ = 10 ms if higher layer parameter 'absenceOfAnyOtherTechnology-r14' indicates TRUE for p = 3, 4 and $T_{ulmcot,p}$ = 6 ms if not.
Note 2:
When $T_{ulmcot,p}$ = 6 ms, this can be increased to 8 ms by inserting one or more gaps. A minimum gap duration must be 100 μs. A maximum duration before insertion of any gap must be 6 ms.

When "UL configuration for LAA" field configures "UL offset" 1 and "UL duration" d for a subframe n,
  if end of UE transmission occurs within or before a subframe n+1+d−1, the UE can use channel access type 2 for transmissions within a subframe n+1+i irrespective of channel access type signaled by an uplink grant for such subframes, and i=0, 1, . . . , d−1.

When the UE has scheduled transmissions including a PUSCH in a set of subframes $n_0, n_1, \ldots, n_{w-1}$ using PDCCH DCI format 0B/4B and has not accessed a channel for transmission in a subframe $n_k$, the UE needs to attempt transmission in a subframe $n_{k+1}$ according to a channel access type indicated in DCI. Here, k∈{0, 1, . . . , w−2} and w is the number of scheduled subframes indicated in the DCI.

If the UE is scheduled to perform transmissions which do not have gaps including a PUSCH in the set of subframes $n_0, n_1, \ldots, n_{w-1}$ using one or more PDCCH DCI formats 0A/0B/4A/4B and performs transmission in a subframe $n_k$ after accessing a carrier according to one of the type-1 and type-2 uplink channel access procedures, the UE can continue transmission in subframes after $n_k$. Here, k∈{0, 1, . . . , w−1}.

If the start of UE transmission in a subframe n+1 is immediately after the end of UE transmission in a subframe n, the UE does not expect indication of different channel access types for transmissions in such subframes.

When the UE is scheduled to perform transmission without a gap in subframes $n_0, n_1, \ldots, n_{w-1}$ using one or more PDCCH DCI formats 0A/0B/4A/4B, has stopped transmission for or before a subframe $n_{k1}$ for which k1∈{0, 1, . . . , w−2}, and senses that a channel is continuously idle after transmission has been stopped, the UE can perform transmission in the following subframe $n_{k2}$ for which k2∈{1, . . . , w−1} using the type-2 channel access procedure. If the channel sensed by the UE is not continuously idle after the UE stops transmission, the UE can perform transmission in the following subframe $n_{k2}$ for which k2∈{1, . . . , w−1} using a type-1 channel access procedure having an uplink channel access priority class indicated in DCI corresponding to the subframe $n_{k2}$.

If the UE receives a UL grant, DCI indicates PUSCH transmission which starts in a subframe n using a type-1 channel access procedure and the UE has an ongoing type-1 channel access procedure before the subframe n,
  If an uplink channel access priority class value $p_1$ used for the continuous type-1 channel access procedure is equal to or greater than an uplink channel access priority class value $p_2$ indicated by DCI, the UE can perform PUSCH transmission in response to the UL grant by accessing a carrier using the continuous type-1 channel access procedure.
  If the uplink channel access priority class value $p_1$ used for the continuous type-1 channel access procedure is less than the uplink channel access priority class value $p_2$ indicated by the DCI, the UE needs to end the continuous channel access procedure.

If the UE is scheduled to perform transmission on the set C of carriers in the subframe n, UL grants which schedule PUSCH transmissions on the set C of carriers indicate the type-1 channel access procedure, the same "PUSCH starting position" is indicated by all carriers in the set C of carriers, and carrier frequencies of the set C of carriers are a subset of predefined sets of carrier frequencies,
  the UE can perform transmission on a carrier $c_i$∈C using the type-2 channel access procedure in the following case.
    If the type-2 channel access procedure is performed on the carrier $c_i$ immediately before UE transmission on a carrier corresponding to $c_i$∈C, i≠j and
    when the UE has accessed a carrier $c_j$ using the type-1 channel access procedure,
      here, the carrier $c_j$ is uniformly randomly selected by the UE from the set C of carriers before the type-1 channel access procedure is performed on any carrier in the set C of carriers.

When an eNB has performed transmission on a carrier according to a channel access procedure for transmission(s) including a PDSCH/PDCCH/EPDCCH, the eNB can indicate the type-2 channel access procedure in DCI of a UL grant which schedules transmission(s) including a PUSCH on a carrier in the subframe n. Alternatively, when the eNB has performed transmission on a carrier according to the channel access procedure for transmission(s) including a PDSCH/PDCCH/EPDCCH, the eNB can indicate that the type-2 channel access procedure for transmission(s) including a PUSCH on a carrier can be performed in the subframe n using "UL configuration for LAA" field. Alternatively, when the subframe n is generated within a time interval that starts at $t_0$ and ends at $t_0+T_{CO}$, the eNB can schedule transmissions including a PUSCH on a carrier in the subframe n, which follow transmission by the eNB on a carrier having a duration of $T_{short\_ul}$=25 μs. Here, $T_{CO}=T_{mcot,p}+T_g$, $t_0$ is a time instance at which an eNB starts transmission, the value of $T_{mcot,p}$ is determined by an eNB as described in the downlink channel access procedure, $T_g$ is a total time interval of gaps of all durations which exceed 25 μs generated between downlink transmission of an eNB and uplink transmission scheduled by the eNB and between arbitrary two uplink transmissions which start at to and are scheduled by the eNB.

If continuous scheduling is possible, the eNB needs to schedule uplink transmissions between $t_0$ and $t_0+T_{CO}$ in consecutive subframes.

For uplink transmission on a carrier which follows transmission by the eNB on a carrier having a duration of $T_{short\_ul}$=25 μs, the UE can use the type-2 channel access procedure.

If the eNB indicates the type-2 channel access procedure for the UE in DCI, the eNB indicates a channel access priority class used to acquire access to a channel in the DCI.

Hereinafter, a type-1 uplink channel access procedure will be described.

The UE can perform transmission using the type-1 channel access procedure after sensing that a channel is idle first for a slot duration of a defer duration $T_d$ and after the counter N is 0 in step 4. The counter N is adjusted by sensing a channel with respect to additional slot duration(s) according to the following steps.

1) $N=N_{init}$ is set. Here, $N_{init}$ is an arbitrary number uniformly distributed between 0 and $CW_p$. Then, the procedure proceeds to step 4.

2) If N>0 and the eNB selects decrease of the counter, N=N−1 is set.

3) If a channel with respect to an additional slot duration is sensed and the additional slot duration is idle, the procedure proceeds to step 4. If not, the procedure proceeds to step 5.

4) The procedure ends if N=0 and proceeds to step 2 if not.

5) The channel is sensed until a busy slot is detected within an additional defer duration $T_d$ or it is sensed that all slots of the additional defer duration $T_d$ are idle.

6) If it is sensed that the channel is idle for all slot durations of the additional defer duration $T_d$, the procedure proceeds to step 4. If not, the procedure proceeds to step 5.

When the UE has not performed transmission including PUSCH transmission on a carrier on which transmission(s) of LAA SCell(s) are performed after step 4 of the above-described procedure, the UE can perform transmission including PUSCH transmission on the carrier if it is sensed that a channel is idle in at least the slot duration $T_{sl}$ when the UE is ready to perform transmission including PUSCH transmission and it is sensed that the channel is idle for all slot durations of the defer duration $T_d$ immediately before transmission including PUSCH transmission. If it is not sensed that the channel is idle in the slot duration $T_{sl}$ when the UE has initially sensed the channel after the UE is ready to perform transmission or it is not sensed that the channel is idle for arbitrary slot durations of the defer duration $T_d$ immediately before intended transmission including PUSCH transmission, the UE senses that the channel is idle for slot durations of the defer duration $T_d$ and then proceeds to step 1.

The defer duration $T_d$ is configured as a duration of $T_f$=16 μs immediately after consecutive slot durations $m_p$. Here, each slot duration is $T_{sl}$=9 μs and $T_f$ includes an idle slot duration $T_{sl}$ at the start point of $T_f$.

The slot duration $T_{sl}$ is considered to be idle if the UE senses the channel for the slot duration and power detected by the UE for at least 4 μs in the slot duration is less than the energy detection threshold $X_{Thresh}$. If not, the slot duration $T_{sl}$ is considered to be busy.

$CW_p$ ($CW_{min,p} \le CW_p \le CW_{max,p}$) is a contention window. Adjustment of $CW_p$ will be described in the contention window adjustment procedure.

$CW_{min,p}$ and $CW_{max,p}$ are selected before the aforementioned step 1.

$m_p$, $CW_{min,p}$ and $CW_{max,p}$ are based on a channel access priority class signaled to the UE as shown in Table 4.

$X_{Thresh}$ adaptation will be described in an energy detection threshold adaptation procedure which will be described later.

Hereinafter, a type-2UL channel access procedure will be described.

If an uplink UE uses a type-2 channel access procedure for transmission including PUSCH transmission, the UE can perform transmission including PUSCH transmission immediately after sensing that a channel is idle for at least a sensing interval of $T_{short\_ul}$=25 μs. $T_{short\_ul}$ is configured as a duration of $T_f$=16 μs immediately followed by one shot duration of $T_{sl}$=9 μs, and $T_f$ includes an idle slot duration $T_{sl}$ at the start point of $T_f$. If a channel is sensed as being idle for slot durations of $T_{short\_ul}$, the channel is considered to be idle for $T_{short\_ul}$.

Hereinafter, the contention window adjustment procedure will be described.

If a UE performs transmission using the type-1 channel access procedure associated with a channel access priority class p on a carrier, the UE needs to maintain a contention window value $CW_p$ and adjust $CW_p$ for such transmissions before step 1 of the aforementioned type-1 uplink channel access procedure using the following procedures.

If an NDI value with respect to at least one HARQ procedure associated with HARQ_ID_ref is toggled, $CW_p=CW_{min,p}$ is set for all priority classes p∈{1, 2, 3, 4}.

If not, $CW_p$ is increased to a next highest permitted value for all the priority classes p∈{1, 2, 3, 4}.

HARQ_ID_ref is a HARQ process ID of UL-SCH in a reference subframe $n_{ref}$. The reference subframe $n_{ref}$ is determined as follows.

When the UE has received an uplink grant in a subframe $n_g$, a subframe $n_w$ is a most recent subframe prior to a subframe $n_g$-3 in which the UE has transmitted UL-SCH using the type-1 channel access procedure.

If the UE performs transmission which starts in a subframe no without gaps and includes UL-SCH in subframes $n_0, n_1, \ldots, n_w$, the reference subframe $n_{ref}$ is the subframe $n_0$, If not, the reference subframe $n_{ref}$ is the subframe $n_w$.

If the UE is scheduled to perform transmissions including PUSCH transmission without gaps in a set of subframes $n_0, n_1, \ldots, n_{w-1}$ using the type-1 channel access procedure and any transmission including PUSCH transmission cannot be performed in the set of subframes, the UE can maintain the value of $CW_p$ without changing the same for all priority classes p∈{1, 2, 3, 4}.

If a reference subframe for finally scheduled transmission is also $n_{ref}$, the UE can maintain the value of $CW_p$ for all priority classes p∈{1, 2, 3, 4} using the type-1 channel access procedure as in finally scheduled transmission including PUSCH transmission.

If $CW_p=CW_{max,p}$, a next highest permitted value for $CW_p$ adjustment is $CW_{max,p}$.

If $CW_p=CW_{max,p}$ is consecutively used K times for generation of $N_{init}$, $CW_p$ is reset to $CW_{min,p}$ only for a priority class p at which $CW_p=CW_{max,p}$ is consecutively used K times for generation of $N_{init}$. K is selected by the UE from a set of values of {1, 2, . . . , 8} for each of the priority classes p∈{1, 2, 3, 4}.

Hereinafter, energy detection threshold adaptation procedure.

A UE which has accessed a carrier on which transmission(s) of LAA SCell(s) are performed needs to set the energy detection threshold $X_{Thresh}$ to below a maximum energy detection threshold $X_{Thresh\_max}$.

$X_{Thresh\_max}$ is determined as follows.

If the UE is configured by higher layer parameter "max-EnergyDetectionThreshold-r14",
  $X_{Thresh\_max}$ is set to the same value as a value signaled by the higher layer parameter.

If not,
  the UE needs to determine $X'_{Thresh\_max}$ according to a default maximum energy detection threshold computation procedure which will be described later.
  If the UE is configured by higher layer parameter "energyDetectionThresholdOffset-r14",
    $X_{Thresh\_max}$ is set by applying $X'_{Thresh\_max}$ according to an offset value signaled by the higher layer parameter.
  If not,
    the UE needs to set $X_{Thresh\_max} = X'_{Thresh\_max}$.

Hereinafter, the default maximum energy detection threshold computation procedure will be described.

If higher layer parameter "absenceOfAnyOtherTechnology-r14" indicates "TRUE":

$X'_{Thresh\_max} = \min\{T_{max}+10 \text{ dB}, X_r\}$, here,
  $X_r$ is a maximum energy detection threshold defined in dBm according to regulatory requirements when the regulatory requirements are defined. If not $X_r = T_{max}+10$ dB.

If not,
$X'_{Thresh\_max} = \max\{-72+10*\log 10(BWMHz/20 \text{ MHz}) \text{ dBm}, \min\{T_{max}, T_{max}-T_A \pm (P_H+10*\log 10(BWMHz/20 \text{ MHz})-P_{TX})\}\}$ Here,
$T_A = 10$ dB
$P_H = 23$ dBm
$P_{TX}$ is set to $P_{CMAX\_H,c}$.
$T_{max}(dBm) = 10*\log 10(3.16228*10^{-8} \text{ (mW/MHz)} *BWMHz(MHz))$ BWMHz is a single carrier bandwidth in MHz.

Hereinafter, the present disclosure will be described.

With demands for greater communication capacity from a growing number of communication devices, the efficient utilization of a limited frequency band is becoming an increasingly important requirement for future wireless communication systems. Cellular communication systems, such as LTE/NR systems, are also considering using an unlicensed band, for example a 2.4 GHz band generally used by an existing Wi-Fi system or 5 GHz and 60 GHz bands newly emerging, for traffic offloading.

FIG. 22 illustrates an example of a wireless communication system supporting an unlicensed band.

Referring to FIG. 22, a cell operating in a license band (hereinafter, also referred to as an L-band) may be defined as an L-cell, and a carrier of the L-cell may be referred to as a (DL/UL) LCC. Further, a cell operating in an unlicensed band (hereinafter, also referred to as a U-band) may be defined as a U-cell, and a carrier of the U-cell may be referred to as a (DL/UL) UCC. A carrier/carrier-frequency of a cell may refer to an operating frequency (e.g., center frequency) of the cell. A cell/carrier (e.g., component carrier (CC)) may be collectively referred to as a cell.

As illustrated in FIG. 22(a), when a UE and a base station transmit and receive signals through an LCC and a UCC which are subjected to carrier aggregation, the LCC may be set as a primary CC (PCC) and the UCC may be set as a secondary CC (SCC). Alternatively, as illustrated in FIG. 22(b), the UE and the base station may transmit and receive signals through a single UCC or a plurality of UCCs subjected to carrier aggregation. That is, the UE and the base station may transmit and receive signals only through a UCC(s) without any LCC.

Hereinafter, a signal transmission/reception operation in an unlicensed band described above in the present disclosure may be performed based on all the above-described deployment scenarios (unless specified otherwise).

In an unlicensed band, a method of performing wireless transmission and reception through contention between communication nodes may be assumed. Therefore, it is required that each communication node performs channel sensing before transmitting a signal to verify that a different communication node is not performing signal transmission. For convenience, this operation is referred to as a listen-before-talk (LBT) or a channel access procedure (CAP).

In particular, an operation of verifying whether the different communication node is performing signal transmission may be referred to as carrier sensing (CS), and a case where it is determined that the different communication node is not performing signal transmission may be referred to as a clear channel assessment (CCA) having been verified.

A base station (eNB) or a UE of an LTE/NR system also needs to perform an LBT for signal transmission in an unlicensed band (U-band). When the base station or the UE of the LTE/NR system transmits a signal, other communication nodes, such as a Wi-Fi node, also need to perform an LBT so as not to cause interference. For example, in the Wi-Fi standard (801.11ac), a CCA threshold is defined as −62 dBm for a non-Wi-Fi signal and as −82 dBm for a Wi-Fi signal. That is, a station (STA, UE) or an access point (AP) does not transmit a signal so as not to cause interference when a signal other than a Wi-Fi signal is received with a power of −62 dBm or more.

For the UE to transmit uplink data in the unlicensed band, first, the base station needs to succeed in an LBT for UL grant transmission in the unlicensed band, and the UE also needs to succeed in an LBT for UL data transmission. That is, the UE can attempt UL data transmission only when both LBTs of the base station and the UE are successful.

Further, in the LTE system, a delay of at least 4 msec is required between an UL grant and UL data scheduled through the UL grant. Therefore, if a different transmission node coexisting in the unlicensed band achieves access first during the corresponding time, scheduled UL data transmission may be delayed. For this reason, a method for increasing efficiency of UL data transmission in the unlicensed band is under discussion.

In LTE licensed-assisted access (LAA), a base station may report a subframe or slot allowed/available for an autonomous uplink (AUL) to a UE through a bitmap of X bits (e.g., X=40 bits), and thus the base station may report autonomous UL transmission of transmitting UL data without a UL grant to the UE.

When receiving an indication of automatic transmission activation (auto Tx activation), the UE can transmit uplink data without a UL grant in the subframe or slot indicated by the bitmap. Just as the base station transmits a PDCCH, which is scheduling information necessary for decoding, when transmitting a PDSCH to the UE, the UE may transmit AUL UCI, which is information necessary for the base station to decode a PUSCH, when transmitting the PUSCH in an AUL.

The AUL UCI may include information necessary to receive an AUL PUSCH, such as an HARQ ID, a new data indicator (NDI), a redundancy version (RV), a starting AUL subframe (SF) position, and a last AUL SF position, and information for sharing a UE-initiated COT with the base station.

Specifically, sharing a UE-initiated COT with the base station refers to an operation that enables the UE to transfer some of occupied channels to the base station through a random-backoff category-4 LBT (or type-1 channel access procedure) and the base station to transmit a PDCCH (and/or PDSCH) when a channel is idle through a one-shot LBT of 25 usec (using a timing gap provided by the UE emptying the last symbol).

In NR, in order to support UL transmission with relatively high reliability and low latency, the base station also supports time-domain, frequency-domain, and code-domain resources as configured grant type 1 (hereinafter, also referred to as type 1) and configured grant type 2 (hereinafter, also referred to as type 2) configured for the UE through i) a higher-layer signal (e.g., RRC signaling) or ii) a combination of a higher-layer signal and an L1 (physical-layer) signal (e.g., DCI).

The UE may perform UL transmission using a resource configured as type 1 or type 2 without receiving a UL grant from the base station. For type 1, all of the period of a configured grant, an offset relative to system frame number (SFN)=0, time/frequency resource allocation, the number of repetitions, a DMRS parameter, a modulation and coding scheme (MCS)/transport block size (TBS), a power control parameter and the like may be configured only with a higher-layer signal, such as RRC signaling, without an L1 signal. For type 2, the period of a configured grant, and a power control parameter are configured through a higher-layer signal, such as RRC signaling, and remaining resource information (e.g., an offset of initial transmission timing, time/frequency resource allocation, a DMRS parameter, an MCS/TBS, and the like) is indicated through activation DCI, which is an L1 signal.

The AUL of LTE LAA and the configured grant method of NR are significantly different in an HARQ-ACK feedback transmission method for a PUSCH transmitted by a UE without a UL grant and whether there is UCI transmitted together with a PUSCH.

Regarding an HARQ-ACK feedback transmission method, explicit HARQ-ACK feedback information is transmitted through AUL-downlink feedback information (DFI) in LTE LAA, whereas an HARQ process is (implicitly) determined using a symbol index, a symbol period, and as many equations as the number of HARQ processes in the configured grant method of NR.

Regarding UCI transmitted together with a PUSCH, in LTE LAA, information including an HARQ ID, an NDI, and an RV is transmitted as AUL-UCI whenever an AUL PUSCH is transmitted. In the configured grant method of NR, a UE is recognized/identified using a time/frequency resource and a DMRS resource used by the UE for PUSCH transmission. In LTE LAA, however, a UE is recognized/identified using a DMRS resource and a UE ID explicitly included in AUL-UCI transmitted together with a PUSCH.

The present disclosure proposes a method of adjusting a contention window size (CWS) in a random back-off-based downlink (DL) LBT and uplink (UL) LBT process when a UE reports HARQ-ACK information for each transport block (TB) or code block group (CBG) and a BS instructs (re)transmission in units of TBs or CBGs in a wireless communication system including the BS and the UE.

As data traffic increases rapidly due to the recent advent of smart devices, etc., a method of utilizing an unlicensed band for cellular communication is considered in wireless communication systems such as 3GPP LTE-A or the like.

As an example, in Rel-13/14 LTE-A system, extending from an existing method of supporting carrier aggregation (CA) by determining a primary cell (PCell) and a secondary cell (SCell), a method of operating a licensed-assisted access (LAA) secondary cell in an unlicensed band near 2.4 GHz or 5 GHz mainly used by systems such as Wi-Fi is supported. The primary cell may refer to a carrier (or cell) that provides functions such as RRC connection and re-establishment, mobility, random access, and system information, and the secondary cell may refer to a carrier (or cell) that mainly provides a PDSCH/PUSCH-based data transmission function.

In the unlicensed band, a method of performing wireless transmission/reception through contention between communication nodes may be assumed and each communication node may be requested to perform channel sensing before transmitting a signal and check that other communication nodes do not transmit a signal. For convenience, such an operation is called a listen before talk (LBT), and in particular, an operation of checking whether another communication node transmits a signal may be defined as carrier sensing (CS) or clear channel assessment (CCA).

As a result of CCA, if it is determined that there is no signal transmission from another communication node, it is referred to as a channel unoccupied (or channel idle) state, and if there is signal transmission, it may be referred to as a channel occupied (or channel busy) state. For example, in the Wi-Fi standard (e.g., 801.11ac), a CCA threshold (i.e., threshold for determining CCA) is defined as −62 dBm for non-Wi-Fi signals and is defined as −82 dBm for Wi-Fi signals. This may mean that a station (STA) or an access point (AP) does not transmit a signal so as not to cause interference when a signal other than Wi-Fi is received with a power (or energy) level of −62 dBm or more.

One of the LBT methods is random back-off-based LBT. The random back-off-based LBT may refer to LBT in which a counter value named as a back-off counter is (arbitrarily) set in a range named as a contention window (CW) size, CCA is performed in a plurality of time slots, and when a specific time slot is determined to be channel idle, back-off counter values are reduced one by one, and thereafter, a signal transmission is allowed when the back-off counter value is 0.

As an example, in the Rel-13 LTE system, a random back-off-based LBT scheme named Category 4 (hereinafter, Cat. 4) is introduced as a DL LBT operation in the LAA system. As LBT parameters for The Cat. 4 DL LBT, a length of a defer period, a contention window size value, a maximum channel occupancy time (MCOT) value, a (corresponding) traffic type, and the like, for each class may be determined for a total of four channel access priority classes as shown in Table 5 above.

The BS performs random back-off using the LBT parameters determined according to the channel access priority classes, and when accessing a channel after completing the random back-off, the BS may perform signal transmission within the MCOT. In the DL LBT process, the contention window size may be adjusted. For example, a first subframe (SF) is determined as a reference SF in the latest downlink transmission burst (DL TX burst) in which HARQ-ACK is available, and the contention window size may be adjusted based on the results of HARQ-ACK in the corresponding reference subframe. The DL TX burst may refer to a series of downlink transmissions.

That is, according to a decoding result of a first transmitted subframe in the latest downlink transmission burst transmitted by the BS, i) if more than 80% of HARQ-ACK is NACK, it is determined that contention has occurred and the contention window size is increased to a contention window size next largest after the currently applied contention window size in a previously arranged contention window size set, or otherwise, ii) it is determined that there is no contention and the contention window size may be initialized to a minimum value (e.g., $CW_{min}$).

This method is based on the assumption that, when the transmission burst is transmitted after the LBT operation is successfully performed, the occurrence of NACK (in more than a certain ratio) in the transmitted first subframe is due to simultaneous transmission by different nodes because the contention window size was insufficient.

As an uplink LBT operation in the LAA system, a method of applying a single CCA slot-based LBT (hereinafter, referred to as one-shot LBT) that transmits an uplink signal (e.g., PUSCH) by considering only a 25 us-long CCA slot and Category 4 LBT (hereinafter, Cat. 4 LBT) using LBT parameters defined by four LBT priority classes as shown in Table 7 below has been adopted. Table 7 below shows defer period lengths, contention window minimum/maximum size values, maximum channel occupancy time (MCOT) values, and contention window size sets for each LBT priority class in the order of columns.

TABLE 7

| Channel Access Priority Class p | $m_p$ | $CW_{min,p}$ | $CW_{max,p}$ | $T_{ulmcot,p}$ | Allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

In the LAA UL, there is no separate channel such as PHICH for notifying the UE of HARQ-ACK information for a PUSCH due to the introduction of an asynchronous HARQ procedure, and accurate HARQ-ACK information cannot be used to adjust the contention window size in the UL LBT process. Accordingly, in the UL LBT process, when a UL grant is received in nth subframe, a first subframe of the latest UL transmission burst before the (n−3)th subframe is set as the reference subframe, and the contention window size is adjusted based on an NDI for an HARQ process ID corresponding to the reference subframe. That is, when the BS toggles one or more NDIs (for each of one or more transport blocks) (or if the BS instructs retransmission for one or more transport blocks (TBs)), the contention window size is increased to a contention window size next largest after the currently applied contention window size on the assumption that transmission has failed because the PUSCH collides with another signal in the reference subframe. Otherwise, the contention window size is initialized to a minimum value (e.g., $CW_{min}$) on the assumption that the PUSCH in the reference subframe has been successfully transmitted (without collision with other signals).

Meanwhile, the 3GPP standardization organization is currently standardizing on a wireless communication system named NR as part of a 5G wireless communication system. The NR system is to support a plurality of logical networks in a single physical system, and thus designed to support services (e.g., eMBB, mMTC, URLLC, etc.) having various requirements.

In addition, in the NR system, when a transport block (TB) is transmitted through a physical data shared channel (PDSCH) which is a physical channel for data transmission, if the TB size is large, the TB is divided into a plurality of code blocks (CBs), and thereafter, one or more CBs may be grouped to set a code block group (CBG), and HARQ-ACK transmission in the CBG unit and/or (re)transmission in the CBG unit may be performed. For example, the TB may be transmitted at initial transmission, and thereafter, when the UE reports HARQ-ACK information for each CBG, only some CBGs whose HARQ-ACK is NACK may be collected and retransmitted.

In addition, in the NR system, a HARQ-ACK transmission time (hereinafter, HARQ-ACK timing) may be indicated to the UE through downlink control information (DCI), which is a physical layer control signal, based on a PDSCH reception time. As an example, the BS may previously set a plurality of HARQ-ACK timing values to the UE by higher layer signals such as RRC signaling, schedule the PDSCH with DL scheduling DCI, and select/indicate one of HARQ-ACK timing values set by the higher layer signaling as HARQ-ACK timing values for application to the PDSCH through a specific bit field in the DL scheduling DCI. Similarly, for a PUSCH transmission time (hereinafter, referred to as PUSCH timing) based on a UL grant reception time, the BS may previously set a plurality of PUSCH timing values by higher layer signaling such as RRC signaling, schedule the PUSCH with a UL grant, and select/indicate one of the set PUSCH timing values as a PUSCH timing value for transmitting the PUSCH through a specific bit field in the UL grant by higher layer signaling.

Hereinafter, in the present disclosure, for convenience of description, a series of signals transmitted by a transmitting node within a maximum COT after the LBT operation is referred to as a transmission burst. In addition, in the present disclosure, a scheduling resource unit in the time axis (for TB transmission) is referred to as a slot (or subframe).

<Method of Adjusting Contention Window Size (CWS) in DL LBT Process>

Figure 23:
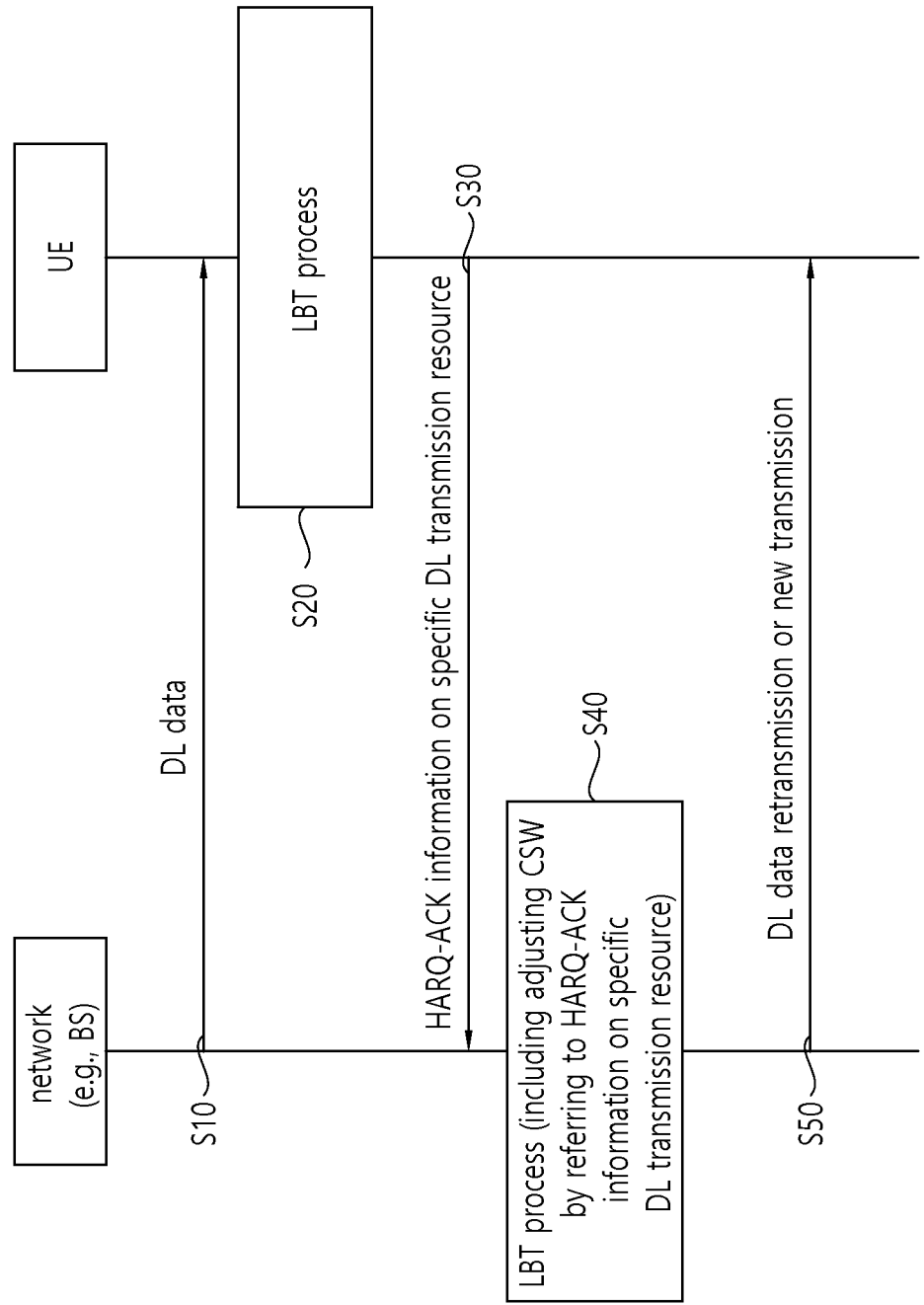
FIG. 23 illustrates a method of adjusting a CWS in a downlink LBT process.

FIG. 23 illustrates a method of adjusting a CWS in a downlink LBT process.

Referring to FIG. 23, a BS (network) transmits downlink data to a UE (S10). The UE transmits HARQ-ACK information for a specific DL transmission resource through an LBT process (S20) (S30). The BS may perform downlink data retransmission or new transmission to the UE (S50) through the LBT process (S50). The process S40 may include a process of adjusting a CWS with reference to HARQ-ACK information for the specific DL transmission resource.

The BS may (dynamically) indicate an HARQ-ACK timing to the UE, and a method for setting a specific DL transmission resource (hereinafter, referred to as a reference DL resource) (as an HARQ-ACK reference target) when referring to HARQ-ACK corresponding to the specific DL transmission resource for adjusting the CWS in the DL LBT process is proposed as follows.

As an example, at least one of the following methods may be used to determine/set the specific DL transmission resource (reference DL resource) related to CWS adjustment in the DL LBT process of S40.

[Proposed Method #1] HARQ-ACKs for TBs and CBGs entirely or partially included in a specific time duration T (e.g., 3 symbols), starting from a symbol from which a COT of the latest (i.e., the most recent) downlink transmission burst in which HARQ-ACK is available may be used for CWS adjustment. The time duration T may be referred to as a reference resource or a reference duration hereinafter.

(1) However, the meaning that the HARQ-ACK is available may refer to one of the following.
  A. All HARQ-ACKs for transmission in a first (transmission) subframe (or slot) in the downlink transmission burst are available,
  B. HARQ-ACK of X % or more for transmission in the first (transmission) subframe (or slot) in the downlink transmission burst is available.

The T may be defined only in the first transmission slot (or subframe) of the latest downlink transmission burst in which HARQ-ACK is available. Alternatively, the T may start from the first symbol among PDSCH data symbols included in the COT for each UE, and thus, may start differently for each UE or for each subcarrier spacing (SCS). That is, if a DMRS or PDCCH symbol is located between the start symbol of the COT and the first data symbol of the PDSCH, T may start from the first data symbol of the PDSCH immediately after the DMRS or PDCCH.

HARQ-ACK for transmission in which HARQ-ACK is not available in the downlink transmission burst may be ignored or regarded as NACK, and X may be a value agreed in advance or a value set by the BS through higher layer signaling (e.g., RRC signaling) or a dynamic control signal (e.g., DCI).

In addition, that the HARQ-ACK is available may refer to that a time corresponding to the HARQ-ACK timing has passed since PDSCH scheduling (corresponding to HARQ-ACK).

As an example, it is assumed that the BS uses HARQ-ACKs available for TBs and CBGs entirely or partially included in the specific time duration T from the symbol in which the COT of the latest downlink transmission burst starts among downlink transmission bursts in which at least one HARQ-ACK is available, to adjust the CWS.

Figure 24:
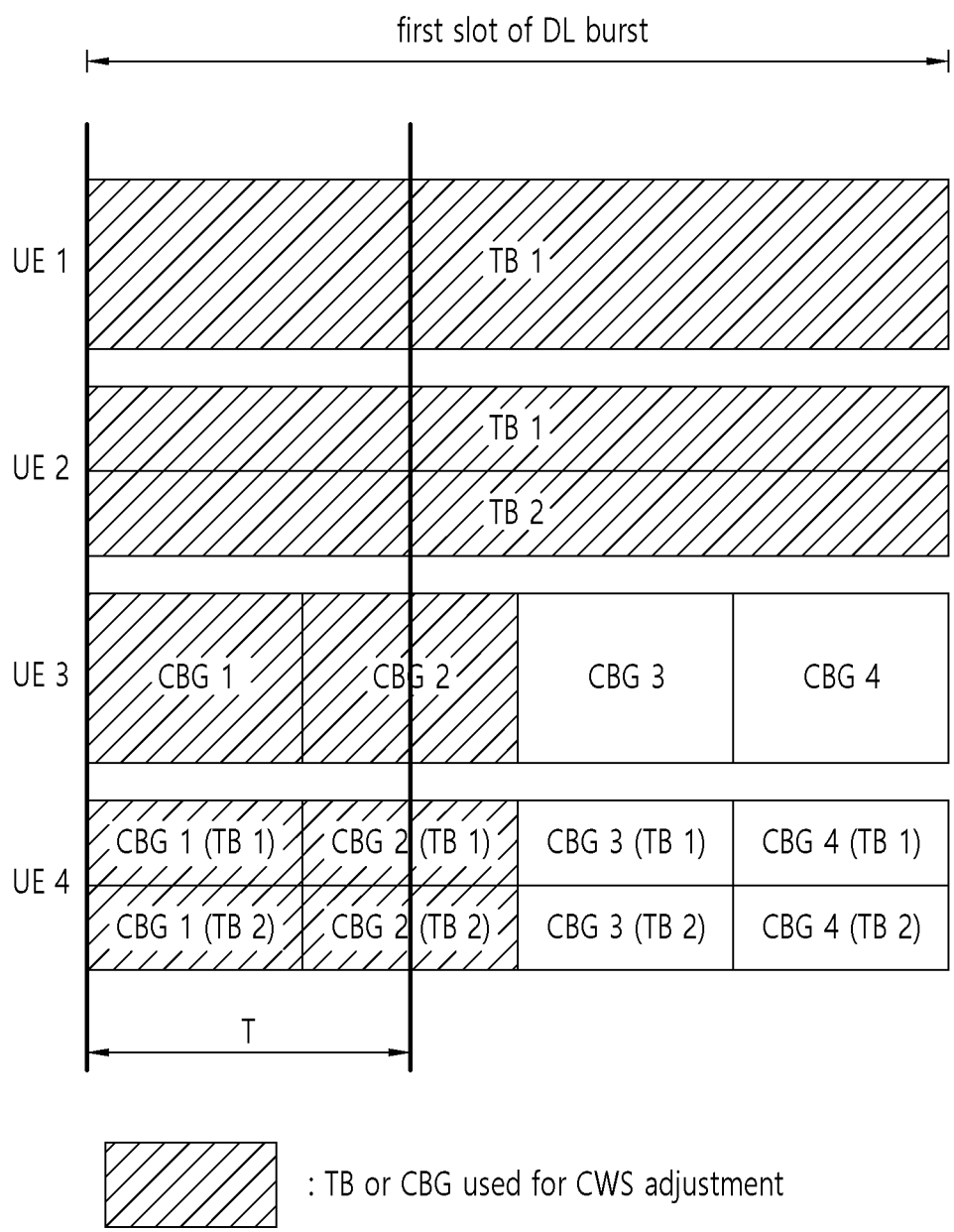
FIG. 24 illustrates a transport block or codeblock group used for adjusting a contention window size in a first slot of a downlink transmission burst.

FIG. 24 illustrates a transport block or codeblock group used for adjusting a contention window size in a first slot of a downlink transmission burst.

Referring to FIG. 24, UE 1 (if CBG-based DL (re) transmission is not configured or is scheduled in DCI format 1_0, if ever) may have transmitted 1 TB, UE 2 (if CBG-based DL (re)transmission is not configured or is scheduled in DCI format 1_0, if ever) may have transmitted 2 TBs, UE 3 (if CBG-based DL (re)transmission is configured and is scheduled in DCI format 1_1) may have transmitted four CBGs (four CBGs per TB), and UE 4 (if CBG-based DL (re)transmission is configured and is scheduled in DCI format 1_1) may have transmitted 8 CBGs (four CBGs per TB). In this case, HARQ-ACK per TB for TB1 of UE1 and TB1 and TB2 of UE2 entirely or partially included in the time duration T and HARQ-ACK (per CBG) for CBG(s) of the CBG1 and CBG2 of UE 3 and CBG1 and CBG2 configuring TB1 and CBG1 and CBG2 configuring TB2 of UE 4 may be used for adjusting the CWS. That is, HARQ-ACKs in the shaded portion in FIG. 24 may be used for the contention window size.

[Proposed Method #2] Only HARQ-ACK whose TBs or CBGs are entirely included in the specific time duration T (e.g., 3 symbols) starting from the symbol in which the COT of the latest downlink transmission burst in which the HARQ-ACK is available starts may be used for adjusting the CWS.

(1) However, the meaning that the HARQ-ACK is available may refer to one of the following.
  A. All HARQ-ACKs for transmission in the first (transmission) subframe (or slot) in the downlink transmission burst are available,
  B. HARQ-ACK of X % or more for transmission in the first (transmission) subframe (or slot) in the downlink transmission burst is available.

The T may be defined only in the first transmission slot (or subframe) of the latest downlink transmission burst in which HARQ-ACK is available. Alternatively, the T may start from a first symbol among PDSCH data symbols included in the COT for each UE, and thus may start differently for each UE or for each subcarrier spacing (SCS). That is, if a DMRS or PDCCH symbol is located between the start symbol of the COT and the first data symbol of the PDSCH, T may start from a first data symbol of the PDSCH immediately after the DMRS or PDCCH.

HARQ-ACK for transmission in which HARQ-ACK is not available in the downlink transmission burst may be ignored or considered as NACK, and X may be a previously agreed value or the BS is a value set by the BS by higher layer signaling (e.g., RRC signaling) or by a dynamic control signal (e.g., downlink control information (DCI)). In addition, the meaning that the HARQ-ACK is available may refer to that a time corresponding to the HARQ-ACK timing has passed since PDSCH scheduling (corresponding to HARQ-ACK).

Figure 25:
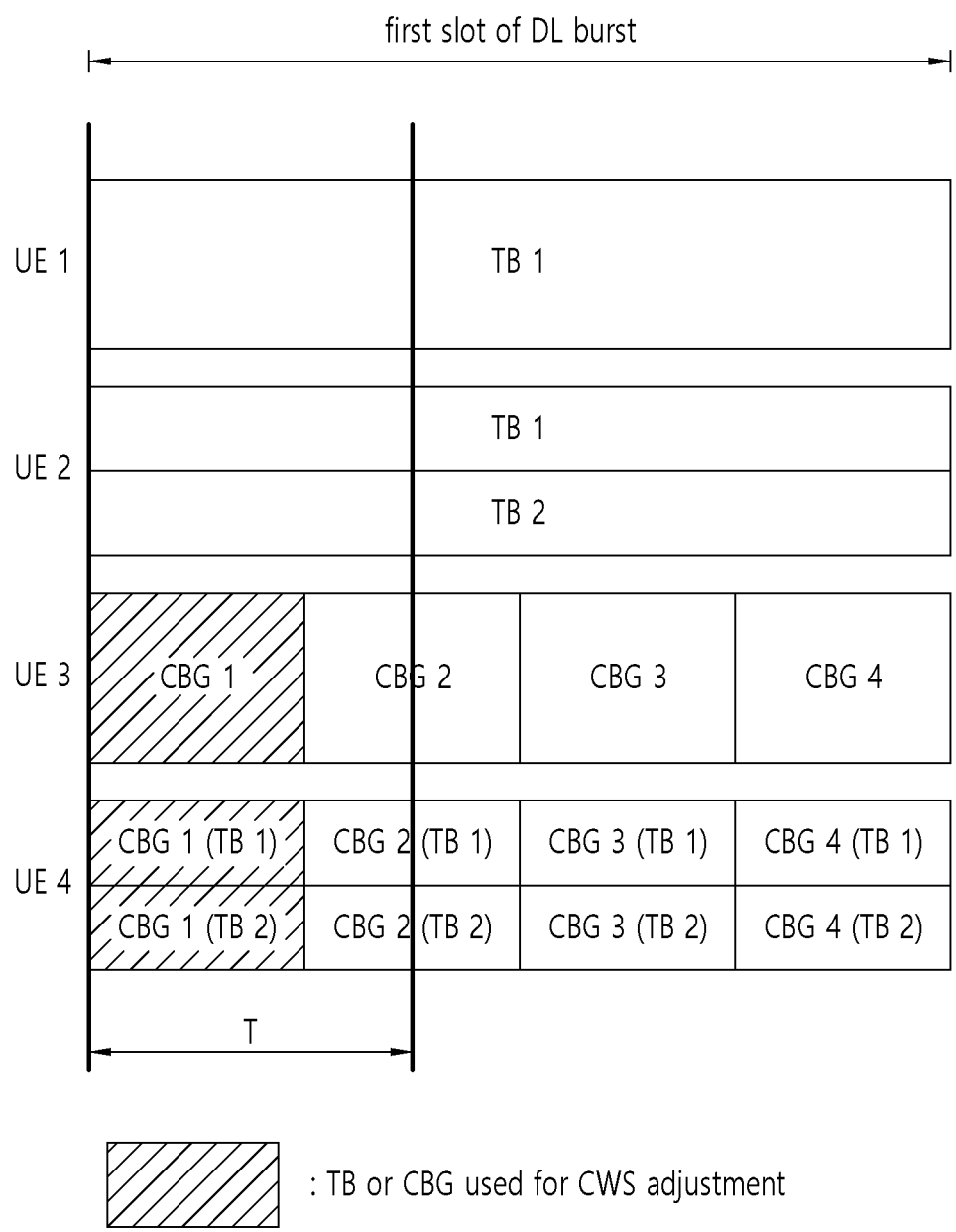
FIG. 25 is another example showing a transport block or a codeblock group used to adjust a contention window size in a first slot of a downlink transmission burst.

FIG. 25 is another example showing a transport block or a codeblock group used to adjust a contention window size in a first slot of a downlink transmission burst.

As an example, it is assumed that the BS uses HARQ-ACKs for TBs and CBGs entirely or partially included in the specific time duration T from the symbol in which the COT starts in the first transmitted subframe (or slot) of the latest downlink transmission burst, among downlink transmission bursts in which at least one HARQ-ACK is available, to adjust the CWS.

As shown in FIG. 25, when UE 1 transmits one TB, UE 2 transmits two TBs, UE 3 transmits four CBGs (4 CBGs per TB), and UE 4 transmits 8 CBGs (4 CBGs per TB), HARQ-ACK (per CBG) for CBG 1 of UE 3 in which the entirety of the TB or CBG is included in the time duration T and for CBG(s) of CBG1 configuring TB1 of UE 4 and CBG1 configuring TB2 of UE 4 may be used to adjust the CWS.

That is, in the example of FIG. 25, HARQ-ACK in the shaded portion may be used for the contention window size. In the proposed method, HARQ-ACK per CBG for CBGs earliest in the time axis or for K (e.g., K=2) CBG(s), among the CBG(s) in which HARQ-ACK is available and which are transmitted in the reference DL resource through the appropriate time duration T may be used to adjust the CWS.

[Proposed Method #3] TB or CBG-unit HARQ ACK effective in the specific time duration T (from the first data symbol) in which COT starts (within the first transmission slot (or subframe)) of the latest downlink transmission burst in which HARQ-ACK is available may be processed as follows and be referred to CWS adjustment.
  (1) Method of not bundling
  (2) Method of bundling by each TB
  (3) Method of bundling for each UE
  (4) Method of bundling for each PDSCH A. When a NACK (or ACK) ratio for CWS adjustment using the HARQ-ACKs processed by the above methods, it may be calculated by giving each HARQ-ACK a weight as follows.

i. Method of giving weight only to HARQ-ACK in the earliest TB or CBG unit on the time axis, ii. Method of giving sequential weights to HARQ-ACKs per TB or CBG in order from earliest to latest on the time axis, and iii. Method of giving weight according to the spread on the time axis.

However, the effective TB or CBG unit HARQ-ACK in the above may be the HARQ-ACK selected through the aforementioned [Proposed Method #1] or [Proposed Method #2], and the BS may selectively use one of the bundling method and the weighting method to calculate the ratio for CWS adjustment.

After selecting an effective HARQ-ACK in the reference DL resource through [Proposed Method #1] or [Proposed Method #2], the BS should calculate the ratio of NACK or ACK to perform CWS adjustment in the DL LBT process. In this case, the effective HARQ-ACK selected by the above method may be a TB unit or a CBG unit, and bundling may be required for ratio calculation. If all effective HARQ-ACK units are TB or CBG units, calculation may be performed without bundling, and bundling may be performed for each TB, each UE, or for each PDSCH. In addition, if the HARQ-ACK for the earliest transmission of the downlink transmission burst is NACK, it may be assumed that there was a collision with another signal, and if it is ACK, it may be assumed that there was no collision with another signal. In this case, among effective HARQ-ACKs, the earliest TB or CBG-unit HARQ-ACK on the time axis may be given a weight and used for CWS adjustment, or the weights are differentiated in order from earliest to latest on the time axis to be used for CWS adjustment.

As an example, in FIGS. 24 and 25, it is assumed that, until a CWS adjustment point, UE 1 reports [NACK] for TB 1, UE 2 reports [NACK] for TB 1 and [ACK] for TB 2, UE 3 reports [NACK, ACK, NACK, ACK] for CBGs 1/2/3/4 in TB 1, and UE 4 reports [ACK, NACK, NACK, ACK] for CBGs 1/2/3/4 in TB 1 and reports [NACK, ACK, NACK, ACK] for CBGs 1/2/3/4, and CWS is increased if more than 80% of effective HARQ-ACK in the interval T is NACK, and CWS is initialized otherwise.

Under this assumption, in the case of adjusting CWS without bundling or weighting, if CWS is adjusted with the effective HARQ-ACK selected by the method of [Proposed Method #1], the total number of effective HARQ-ACKs is 1 (UE 1)+2 (UE 2)+2 (UE 3)+4 (UE 4)=9, of which NACK is 1 (UE 1)+1 (UE 2)+1 (UE 3)+2 (UE 4)=5, which is less than 80%, and thus, the contention window size may be initialized.

If the effective HARQ-ACK selected by the method of [Proposed Method #2] is used for CWS adjustment, HARQ-ACK (per CBG) of CBG(s) of CBG1 of UE3 in which the entirety of the TB or CBG is included in the time duration T, CBG1 configuring TB1 of UE 4, and CBG1 configuring TB2 of UE 4 in FIG. 25 may be used to adjust the CWS. Therefore, the total number of HARQ-ACKs is 0 (UE 1)+0 (UE 2)+1 (UE 3)+2 (UE 4)=3, of which NACK is 0 (UE 1)+0 (UE 2)+1 (UE 3)+1 (UE 4)=2, which is less than 80%, and thus, the contention window size may be initialized.

Under the above assumption, in the case of giving a weight only to the earliest TB or CBG on the time axis without performing bundling, if a weight 3 is given only to the earliest TB or CBG on the time axis, among the effective HARQ-ACKs selected by the method of [Proposed Method #1], CBG1 of UE 3 may be regarded as 3 NACKs, CBG 1 (TB 1) of UE 4 may be regarded as 3 ACKs, and CBG 1 (TB 2) may be regarded as 3 NACKs. Therefore, the ratio of NACK is calculated as (1+1+3+4)/(1+2+4+8) and CWS may be initialized.

Or, under the above assumption, in the case of adjusting the CWS is by performing bundling for each TB and giving a weight according to the degree of spread in the time axis, if bundling is performed for each TB in the effective HARQ-ACK selected by the method of [Proposed Method #1], the effective HARQ-ACK of UE 3 is NACK and the effective HARQ-ACK of UE 4 is ACK (TB 1) and NACK (TB 2), and since the CBGs of UE 3 and UE 4 occupy half of UE 1 and UE 2, double weights are given to the bundled effective HARQ-ACKs of UE 3 and UE 4 is 1 (UE 1)+2 (UE 2)+2 (UE 3) and 4 (UE 4)=6, in which NACK is 1 (UE 1)+0 (UE 2)+2 (UE 3)+2 (UE 4)=5, and thus, the CWS may be increased to a higher value.

[Proposed Method #9] When a TB-unit PDSCH, which is scheduled based on slots, a TB-unit PDSCH scheduled based on non-slots (or transmitted through 2, 4, or 7 OFDM symbols), and a PDSCH for which CBG-unit (re)transmission is configured coexist in a specific DL transmission resource that the BS refers to for CWS adjustment in the DL LBT process, HARQ-ACKs for slot-based TBs, non-slot-based TBs, and CBGs entirely or partially included in a specific time duration (e.g., 3 symbols) from the symbol from which COT of the latest downlink transmission burst in which HARQ-ACK is available starts may be used for CWS adjustment.

(1) However, the meaning that the HARQ-ACK is available may refer to one of the following.

A. All HARQ-ACKs for transmission in the first (transmission) subframe (or slot) in the downlink transmission burst are available, B. HARQ-ACK of X % or more for transmission in the first (transmission) subframe (or slot) in the downlink transmission burst is available.

The T may be defined only in the first transmission slot (or subframe) of the latest downlink transmission burst in which HARQ-ACK is available. Alternatively, the T may start from the first symbol among PDSCH data symbols included in the COT for each UE, and thus may start differently for each UE or for each subcarrier spacing (SCS). That is, if a DMRS or PDCCH symbol is located between the start symbol of the COT and the first data symbol of the PDSCH, T may start from the first data symbol of the PDSCH immediately after the DMRS or PDCCH.

HARQ-ACK for transmission in which HARQ-ACK is not available in the downlink transmission burst may be ignored or regarded as NACK, and X may be a value agreed in advance or a value set by the BS through higher layer signaling (e.g., RRC signaling) or a dynamic control signal (e.g., DCI). In addition, that the HARQ-ACK is available may refer to that a time corresponding to the HARQ-ACK timing has passed since PDSCH scheduling (corresponding to HARQ-ACK).

Figure 26:
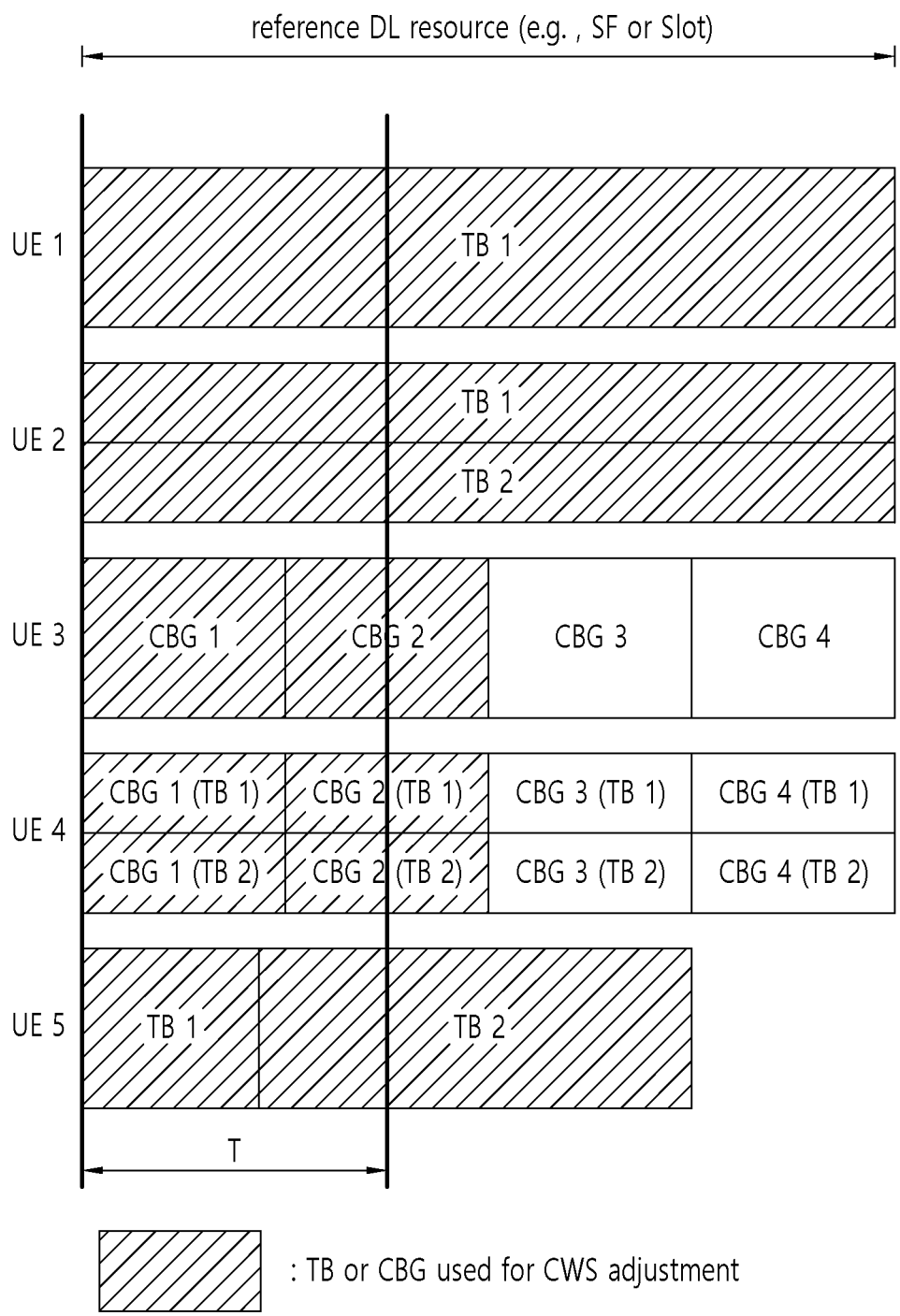
FIG. 26 is another example showing a transport block or a codeblock group used for adjusting the size of a contention window within a reference DL resource.

FIG. 26 is another example showing a transport block or a codeblock group used for adjusting the size of a contention window within a reference DL resource.

It is assumed that the BS uses HARQ-ACKs available for slot-based TBs and non-slot-based TBs, and CBGs entirely or partially included in the specific time duration T from the symbol in which the COT of the latest downlink transmission burst starts among downlink transmission bursts in which at least one HARQ-ACK is available, to adjust the CWS.

In this case, as shown in FIG. 26, when UE 1 (if CBG-based DL (re)transmission is not configured or is scheduled in DCI format 1_0, if ever) has transmitted 1 TB, UE 2 (if CBG-based DL (re)transmission is not configured or is scheduled in DCI format 1_0, if ever) has transmitted 2 TBs, UE 3 (if CBG-based DL (re)transmission is configured and is scheduled in DCI format 1_1) has transmitted four CBGs (four CBGs per TB), UE 4 (if CBG-based DL (re)transmission is configured and is scheduled in DCI format 1_1) has transmitted 8 CBGs (four CBGs per TB), and UE 5 has transmitted one TB having a length of two symbols and one TB having a length of 7 symbols by non-slot-based scheduling, HARQ-ACK per TB for TB1 of UE1 and TB1 and TB2 of UE2 entirely or partially included in the time duration T and HARQ-ACK (per CBG) for CBG(s) of the CBG1 and CBG2 of UE 3 and CBG1 and CBG2 configuring TB1 and CBG1 and CBG2 configuring TB2 of UE 4, and TB1 and TB 2 of UE 5 may be used for adjusting the CWS. That is, HARQ-ACKs in the shaded portion in the example of FIG. 26 may be used for the contention window size.

When the non-slot-based scheduling TB1 and TB2 transmitted by UE 5 are transmitted in CBG unit, all CBGs entirely or partially included in T among the CBGs of each TB may be selected as HARQ-ACK to be referred to for CWS adjustment, like UE3 and UE4.

After selecting an effective HARQ-ACK in the reference DL resource through [Proposed Method #9], the BS may use the ratio of NACK or ACK to perform CWS adjustment in the DL LBT process. In this case, the effective HARQ-ACK selected by the above method may be a TB unit or a CBG unit, and bundling may be required for ratio calculation. [Proposed Method #3] may be used for the HARQ-ACK bundling method in different units and calculating the ratio of NACK. The BS may reset the CWS to a minimum value by comparing it with a specific threshold based on the result calculated in this manner or adjust it to a larger CWS value in a next step.

[Proposed Method #11] A TB or CBG-unit HARQ-ACK effective in the specific time duration T (from a first data symbol) in which COT of the latest downlink transmission burst (within a first transmission slot (or subframe) in which HARQ-ACK is available) starts is selected and processed as follows so as to be referred to for CWS adjustment or the specific time duration T may be set or indicated in the reference DL resource (e.g., subframe or slot).

When a NACK ratio Z is calculated, effective HARQ-ACKs may be converted into effective HARQ-ACKs in the following manner and reflected, and a calculated value may be compared with 1 and a smaller value may be selectively used to calculate the NACK ratio. That is, effective HARQ-ACK=min(A1 or A2 or B1 or B2, 1). Here, min (X, Y) refers to a smaller value among X and Y.

(1) A1=(number of symbols occupied by effective TB or CBG)/14
(2) A2=(number of symbols included in T among symbols occupied by effective TB or CBG)/14
(3) B1=(number of symbols occupied by effective TB or CBG)/T
(4) B2=(number of symbols included in T among symbols occupied by effective TB or CBG)/T In the above, the effective TB or CBG unit HARQ-ACK may be the HARQ-ACK selected through [Proposed Method #1] or [Proposed Method #2], and the BS may calculate the NACK ratio Z according to this proposed method to increase or reset the CWS according to a criterion.

The T may be defined only in the first transmission slot (or subframe) of the latest downlink transmission burst in which HARQ-ACK is available.

The T may start from the first symbol among the PDSCH data symbols included in the COT for each UE, and thus may be different for each UE or for each SCS. That is, if a DMRS or PDCCH symbol is located between the start symbol of the COT and the first data symbol of the PDSCH, T may start from a first data symbol of the PDSCH immediately after the DMRS or PDCCH.

Figure 27:
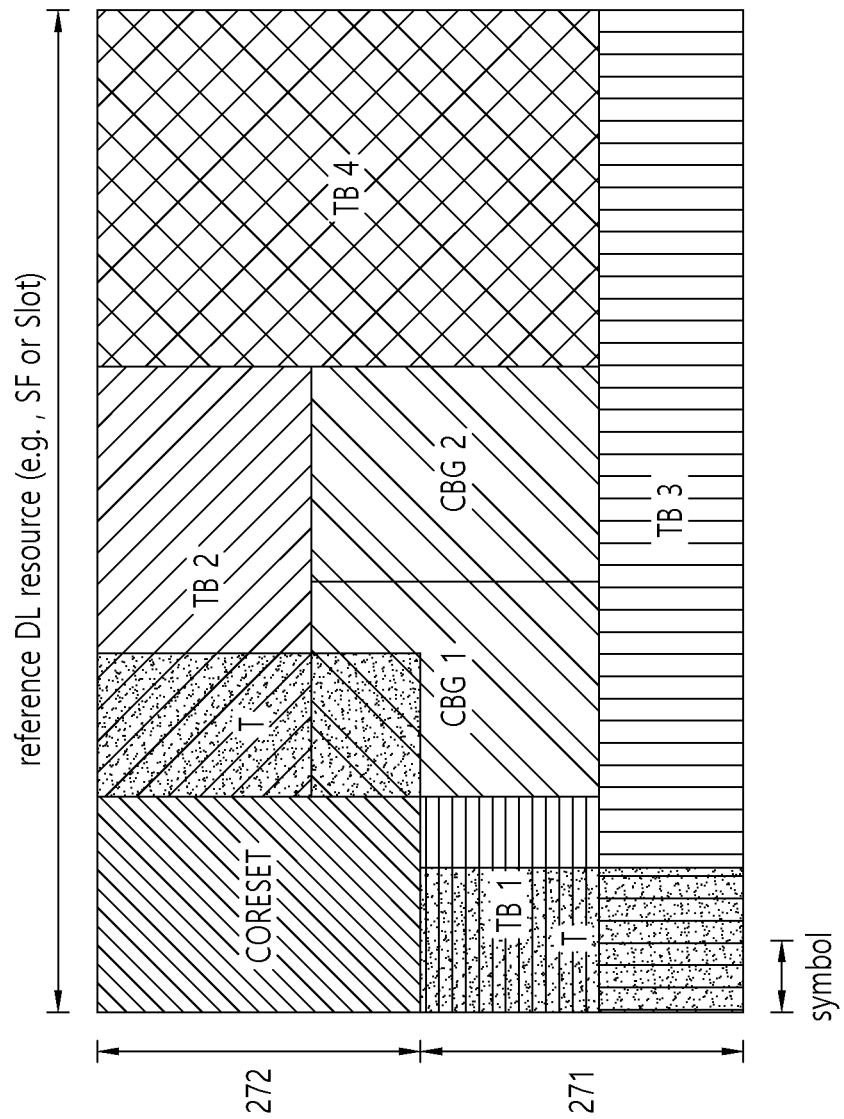
FIG. 27 illustrates a CORESET and a plurality of TBs set in a reference DL resource, and a TB and a CBG to be used for CWS adjustment.

FIG. 27 illustrates a CORESET and a plurality of TBs set in a reference DL resource, and a TB and a CBG to be used for CWS adjustment.

Referring to FIG. 27, a 3-symbol CORESET in the reference DL resource is set over some frequency domains, and a plurality of TB1, TB2, TB4 scheduled based on non-slot (mini-slot) and slot-based TB3 may be scheduled for a plurality of UEs. In addition, T may be set as 2 symbols.

T starts from the first symbol among the PDSCH data symbols included in the COT and is set or indicated excluding the DMRS or PDCCH symbol between the COT start symbol and the first PDSCH data symbol. Thus, in an upper frequency region 272, T is set immediately after the CORESET symbol in which the CORESET is set, to overlap TB2 and CBG1, and in a lower frequency region 271 in which CORESET is not set, T is set from the first PDSCH symbol in which COT starts, to overlap TB1 and TB3. Therefore, if HARQ-ACK to be referred to for CWS adjustment is selected by the method of [Proposed Method #1], TB1 and TB2, CBG1, and TB3 may be selected as effective HARQ-ACKs.

Figure 28:
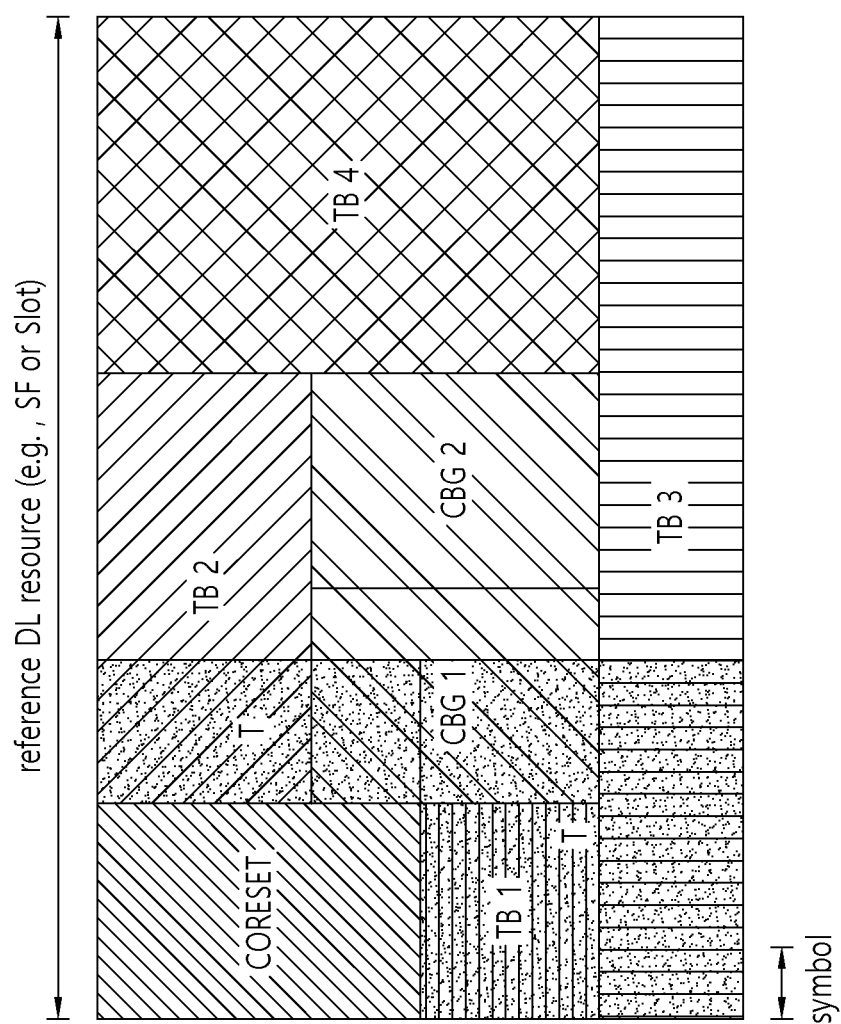
FIG. 28 shows a CORESET and a plurality of TBs set in a reference DL resource, and an example of setting a T region.

FIG. 28 shows a CORESET and a plurality of TBs set in a reference DL resource, and an example of setting a T region.

Referring to FIG. 28, when a DMRS or CORESET exists between the COT start symbol and the PDSCH first data symbol, the T value set after the corresponding DMRS and CORESET may be adjusted to be set according to symbol units. That is, T may be set as shown in FIG. 28 by matching the T region set at the lower portion 271 of the frequency domain in FIG. 27 with the T region at the upper portion 272 in symbol units. That is, the T value set after DMRS or CORESET may be set by matching symbol units.

Meanwhile, since the number of symbols occupied in the reference DL resource for each TB or CBG and the number of symbols included in T may be different from each other, when calculating the NACK ratio with the selected effective HARQ-ACKs, the NACK ratio may be converted into effective HARQ-ACK, calculated as follows, and then reflected.

Figure 29:
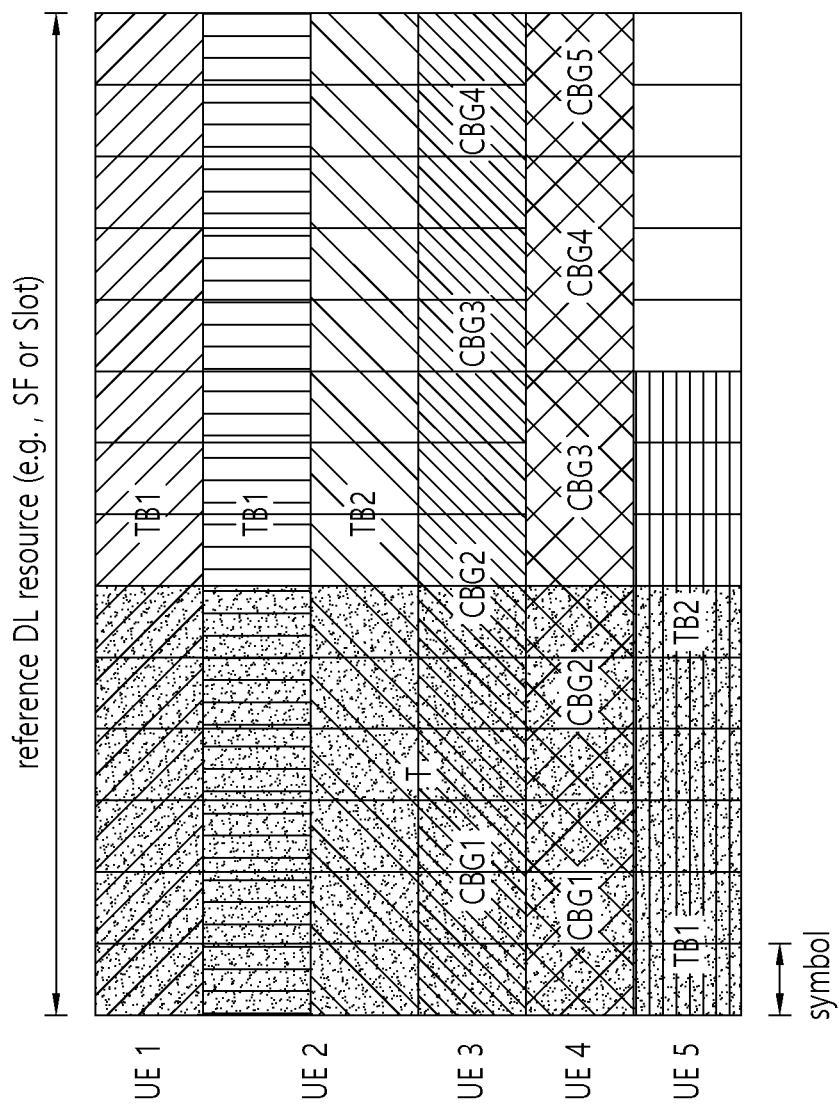
FIG. 29 illustrates a method of calculating an effective HARQ-ACK.

FIG. 29 illustrates a method of calculating an effective HARQ-ACK.

Referring to FIG. 29, as [Proposed Method #1], that is, as a method in which all CBGs and TBs completely included or overlapped in T are selected as effective HARQ-ACK, when HARQ-ACKs for TB/CBG overlapped with T are effective HARQ-ACKs, effective HARQ-ACKs calculated by four methods are as follows.

(1) A1=(number of symbols occupied by effective TB or CBG)/14

TABLE 8

| UE1 | UE2 | UE3 | UE4 | UE5 |
|---|---|---|---|---|
| TB1 = 1 | TB1 = 1, TB2 = 1 | CBG1 = 4/14, CBG2 = 4/14 | CBG1 = 3/14, CBG2 = 3/14 | TB1 = 2/14, TB2 = 7/14 |

(2) A2=(number of symbols included in T among symbols occupied by effective TB or CBG)/14

TABLE 9

| UE1 | UE2 | UE3 | UE4 | UE5 |
|---|---|---|---|---|
| TB1 = 6/14 | TB1 = 6/14, TB2 = 6/14 | CBG1 = 4/14, CBG2 = 2/14 | CBG1 = 3/14, CBG2 = 3/14 | TB1 = 2/14, TB2 = 4/14 |

(3) B1=(number of symbols occupied by effective TB or CBG)/T

TABLE 10

| UE1 | UE2 | UE3 | UE4 | UE5 |
|---|---|---|---|---|
| TB1 = min(14/6, 1) = 1 | TB1 = min(14/6, 1) = 1, TB2 = min(14/6, 1) = 1 | CBG1 = 4/6, CBG2 = 2/6 | CBG1 = 3/6, CBG2 = 3/6 | TB1 = 2/6, TB2 = 1 |

(4) B2=(number of symbols included in T among symbols occupied by effective TB or CBG)/T

TABLE 11

| UE1 | UE2 | UE3 | UE4 | UE5 |
|---|---|---|---|---|
| TB1 = 1 | TB1 = 1, TB2 = 1 | CBG1 = 4/6, CBG2 = 2/6 | CBG1 = 3/6, CBG2 = 3/6 | TB1 = 2/6, TB2 = 4/6 |

In FIG. 29, UE 2 may be a UE that has transmitted a plurality of TBs through multiple antennas. In this case, after a process of selecting an effective HARQ-ACK for each TB is performed, spatial bundling may be performed through an AND operation to one HARQ-ACK after performing the process of selecting the effective HARQ-ACK. The effective HARQ-ACK calculated as described above may be reflected and calculated as the number of HARQ-ACKs and the number of NACKs of the corresponding ratio in the denominator when calculating the NACK ratio.

<Method of Adjusting CWS in UL LBT Process>

Figure 30:
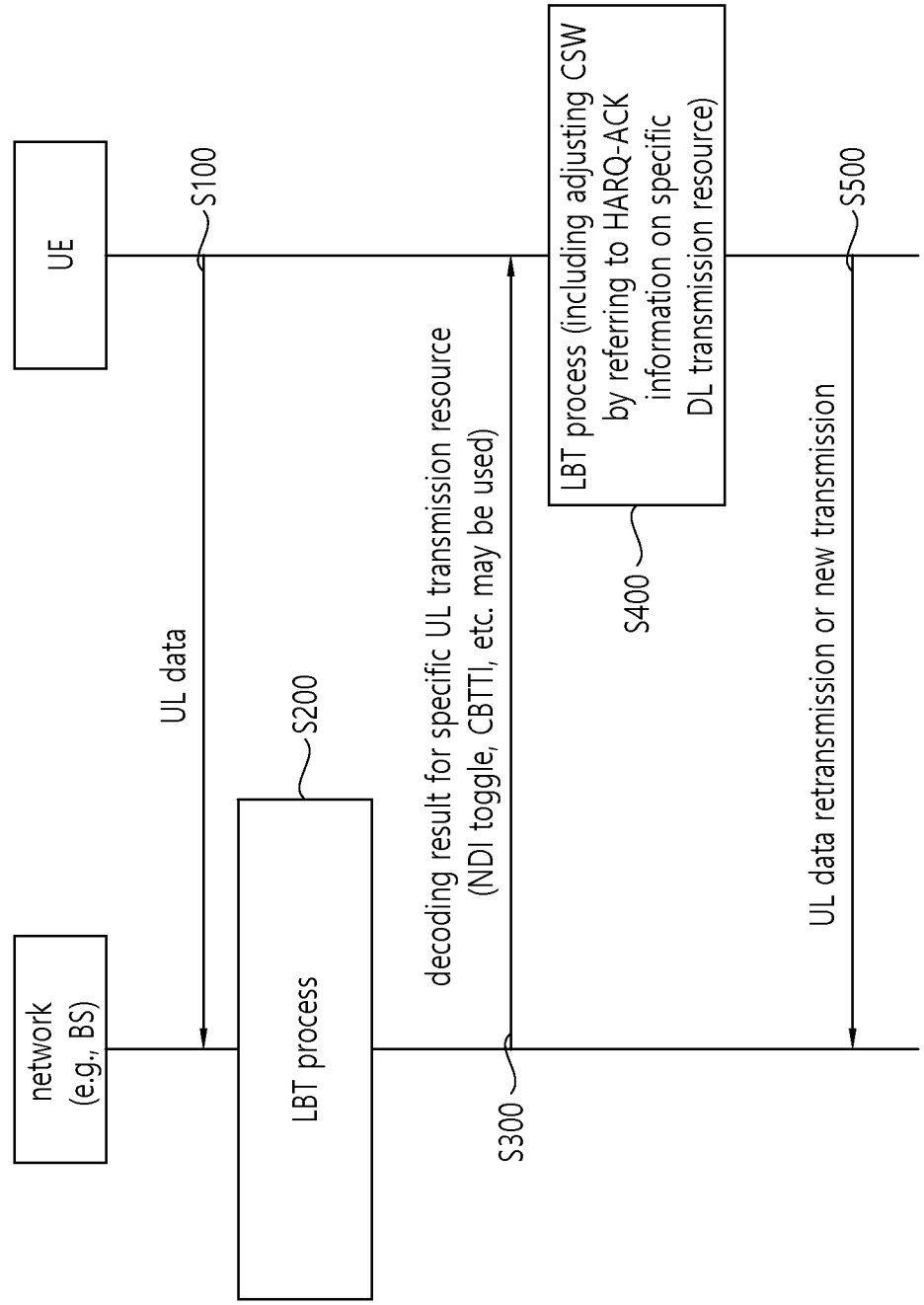
FIG. 30 illustrates a method of adjusting a CWS in an uplink LBT process.

FIG. 30 illustrates a method of adjusting a CWS in an uplink LBT process.

Referring to FIG. 30, the UE transmits uplink data to a BS (network) (S100). The BS transmits a decoding result (NDI toggle, CBGTI) for a specific uplink transmission resource to the UE (S300) through the LBT process (S200). The UE may perform uplink data retransmission or new transmission to the BS (S500) through the LBT process (including the process of adjusting CWS with reference to the decoding result for the specific uplink transmission resource) (S400).

At least one of the following methods may be used to determine/set the specific uplink transmission resource related to CWS adjustment in the UL LBT process of S400.

[Proposed Method #4] For CWS adjustment in the UL LBT process, when referring to whether to retransmit the HARQ process corresponding to a specific UL transmission resource, the specific UL transmission resource (as a reference target for retransmission for the HARQ process) (i.e., reference UL resources), may be set as follows.

(1) In a (first (transmission) slot (or subframe) of the UL transmission burst including the latest UL transmission slot (or subframe) before M slots (or subframes) based on a UL grant reception time, A) a decoding result for TBs and CBGs entirely or partially included in the specific time duration T starting from the first data symbol from the symbol in which COT starts may be used for CWS adjustment. Or B) only a decoding result in which the entirety of TBs or CBGs are included in the specific time duration T from the symbol in which the COT starts in the reference UL resource set as described above may be used for CWS adjustment.

The values M and T may be previously agreed values or may be values set by the BS through higher layer signaling (e.g., RRC signaling) or a dynamic control signal (e.g., DCI). The T may start from the first symbol among PUSCH data symbols included in the COT for each UE, and thus may be different for each UE or for each SCS. That is, if the DMRS is located between the start symbol of the COT and the first data symbol of the PUSCH, T may start from the first data symbol of the PUSCH immediately after the DMRS. The DMRS may be transmitted even in a symbol other than the first symbol of the PUSCH, and the reference UL resource may be from the first data symbol of the PUSCH, other than the DMRS symbol, to the T or from the first data symbol of the PUSCH, other than the DMRS symbol, to a T time resource excluding DMRS symbols.

FIG. 31 illustrates CBGs used for CWS adjustment in a first slot of the UL burst.

Referring to FIG. 31, there may be a PUSCH in which CBG unit transmission is scheduled in the first slot of the UL burst. Since T starts from the first data symbol excluding the DMRS or PDCCH of the COT start, it starts from the symbol after the DMRS symbol.

In FIG. 31(a), as in A) of Proposed Method #4, when some CBGs are included in T, all of the decoding results for the corresponding CBGs may be effectively referred to for CWS adjustment. Meanwhile, in FIG. 31(b), only the decoding result of CBG1 including all the CBGs are included in T as in B) of Proposed Method #4 may be effectively referred to for CWS adjustment. If T is set or indicated as the entire slot duration, all decoding results in the first (transmission) slot of the UL transmission burst in both methods A) and B) may be effectively referred to for CWS adjustment.

As in the aforementioned Proposed Method #1 and Proposed Method #4, when the reference resource (or reference duration) T is set, the T may not be aligned with a slot boundary. In this case, after regarding the end of the slot overlapping with the T as a reference duration, HARQ-ACKs for all TBs (or CBGs) scheduled in the reference duration may be used for CWS adjustment.

Figure 32:
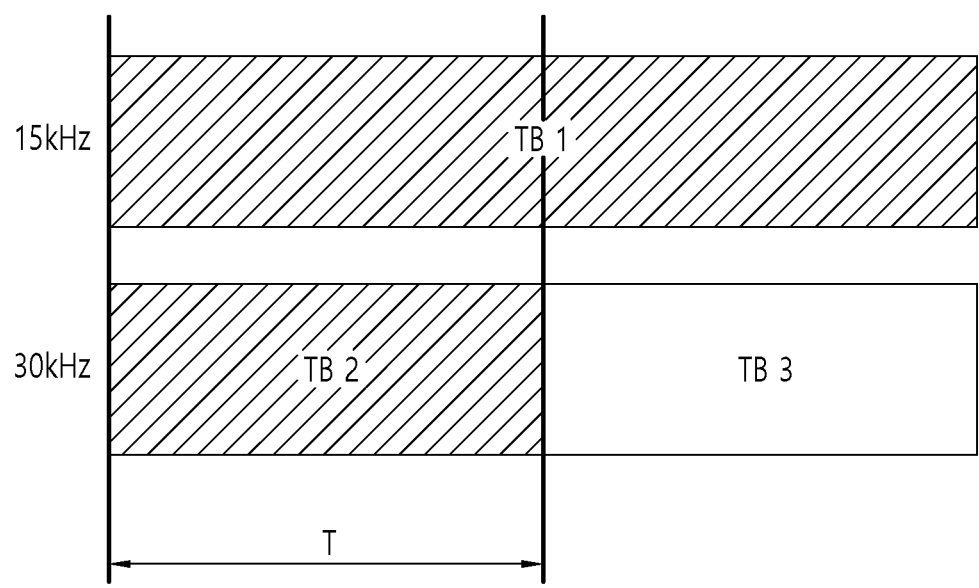
FIG. 32 illustrates a TB as a target of ACK/NACK used for CWS adjustment when the reference resource T is not aligned with the slot boundary.

FIG. 32 illustrates a TB as a target of ACK/NACK used for CWS adjustment when the reference resource T is not aligned with the slot boundary.

Referring to FIG. 32, the BS may transmit a PDSCH through two cells by aggregating two cells having a subcarrier spacing (SCS) of 15 kHz and 30 kHz, respectively. In this case, it is assumed that the reference duration T is set based on a 30 kHz slot. Then, the reference duration T corresponds only to the middle of the 15 kHz slot. If the reference resource T is not aligned with the slot boundary as described above, all HARQ-ACKs for TB (/CBG) scheduled in a 15 kHz slot may be reflected in CWS adjustment.

Figure 33:
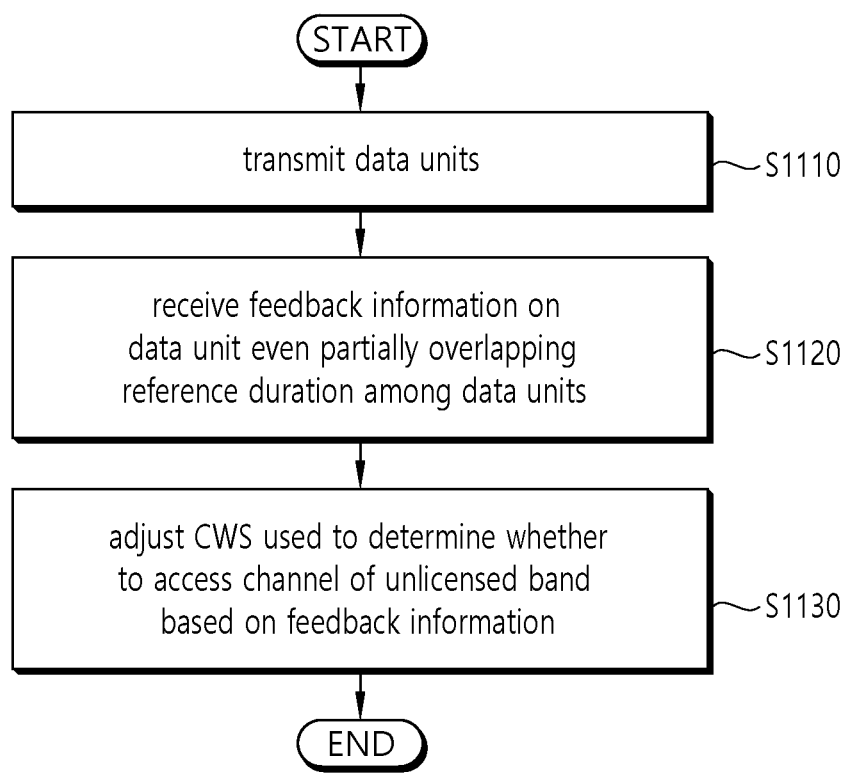
FIG. 33 illustrates a method of accessing a channel in an unlicensed band.

FIG. 33 illustrates a method of accessing a channel in an unlicensed band.

Referring to FIG. 33, the wireless device transmits data units (S1110).

For example, the data units may be transmitted through a first cell having a first subcarrier spacing and a second cell having a second subcarrier spacing, and the first subcarrier spacing and the second subcarrier spacing may be different from each other. For example, the first subcarrier spacing may be 15 kHz, and the second subcarrier spacing may be 30 kHz. The data unit may be a transport block (TB) or a code block group (CBG). At least a code block group may be included in the transport block, and at least one code block may be included in the code block group.

The wireless device receives feedback information on a data unit that partially overlaps a reference duration among the data units (S1120). As described with reference to FIG. 32, the reference duration may not be aligned with the slot of the first cell but may be aligned with the slot of the second cell.

The wireless device adjusts a contention window size (CWS) used to determine whether to access the channel in the unlicensed band based on the feedback information (S1130). For example, as described with reference to FIG. 32, the wireless device may receive ACK/NACK for a data unit (TB or CBG) that is partially transmitted within the reference duration T and adjust CWS based on the ACK/NACK. That is, among the data units, the contention window size may be adjusted based on feedback information on all data units transmitted even partially within the reference duration.

For example, if NACK is fed back for a transport block that partially overlaps within the reference duration or if the ratio of NACK is more than a certain value, the CWS may be increased to a higher value. If ACK is fed back or if the ratio of NACK is less than a certain value, CWS may be initialized or decreased.

When the data units are transmitted through the first cell having the first subcarrier spacing and the second cell having the second subcarrier spacing, the reference duration may be determined based on a slot length according to the first subcarrier spacing or the second subcarrier spacing.

In a time duration based on the contention window size, when it is determined that the channel is not used by another device, a data unit may be transmitted.

The wireless device may transmit information for setting the reference duration to a receiving device.

The method described in FIGS. 32 and 33 may be a method of specifically applying the methods described in Proposed Method #1 and/or Proposed Method #4 described above.

[Proposed Method #5] In the UL LBT process, the CWS of the UE may be adjusted based on the decoding result of the effective CBG selected through the aforementioned [Proposed Method #4].

(1) The use of the decoding result of the effective TB or CBG for CWS adjustment may refer to initializing or increasing the CWS through whether to toggle an NDI in a UL grant having the same HARQ process ID with respect to a HARQ process ID of the PUSCH scheduled within the configured time duration T and CBGTI.

(2) In a state where a UL grant scheduling the same HARQ process ID X is received, if NDI is toggled or NDI is not toggled and retransmission of some or all of the effective CBG index(s) is not indicated through CBGTI (here, some effective CBG index(s) may be the earliest CBG index on the time axis or a specific CBG index configured or indicated by the BS), it may be operated to reset the CWS (that is, it is assumed that reception of the effective CBG index(s) in the gNB is ACK).

(3) In a state where a UL grant DCI scheduling the same HARQ process ID X is received, if NDI is not toggled and retransmission of some or all of the effective CBG index(s) is indicated through CBGTI (here, some effective CBG index(s) may be the earliest CBG index on the time axis or a specific CBG index configured or indicated by the BS), the CWS may be increased (that is, it is assumed that reception of the effective CBG index(s) in the gNB is NACK).

(4) In the above, the effective CBG index(s) may refer to a representative CBG or all selected CBGs among the CBGs selected by the aforementioned [Proposed Method #4].

However, the method may be applicable under the premise that when the BS fails to receive a specific CBG index(s), it always indicates retransmission of the corresponding CBG(s) in a next retransmission scheduling. This principle may be applied to the time-advanced CBG index(s) of all slots or the first slot of the UL burst that the BS considers.

The BS may schedule a PUSCH in units of CBG to the UE with a specific HARQ process ID through the UL grant and indicate retransmission of only some CBGs that fail to decode through the CBGTI through the UL grant. For example, if the BS transmits the UL grant scheduling the same HARQ process ID X for the PUSCH scheduled by the HARQ process ID X, the UE recognizes it as a new data scheduling and initializes the CWS if the NDI value is toggled. If, however, the NDI value is not toggled and retransmission is not indicated for the effective CBG(s) selected by [Proposed Method #4] by CBGTI, the effective CBG(s) may be regarded as ACK and CWS may be initialized. Conversely, if the NDI value is not toggled and the retransmission of the effective CBG(s) is indicated through the CBGTI, the UE may assume the corresponding effective CBG(s) as NACK and adjust the CWS to a higher value.

[Proposed Method #10] When referring to whether to retransmit the HARQ process corresponding to a specific UL transmission resource for CWS adjustment in the UL LBT process, a specific UL transmission resource (as a reference target regarding retransmission for the HARQ process) (i.e., reference UL resources) may be set as follows.

However, the PUSCH scheduled for the specific UL transmission resource (reference UL resource) may include a slot-based TB or a plurality of CBGs or a plurality of TBs transmitted on a non-slot basis.

(1) In a (first (transmission) slot (or subframe) of the UL transmission burst including the latest UL transmission slot (or subframe) before M slots (or subframes) based on a UL grant reception time), A) a decoding result for TBs and CBGs entirely or partially included in the specific time duration T starting from the first data symbol from the symbol in which COT starts may be used for CWS adjustment, or B) only a decoding result in which the entirety of TBs or CBGs are included in the specific time duration T from the symbol in which the COT starts in the reference UL resource set as described above may be used for CWS adjustment.

The values M and T may be previously agreed values or may be values set by the BS through higher layer signaling (e.g., RRC signaling) or a dynamic control signal (e.g., DCI). The T may start from the first symbol among PUSCH data symbols included in the COT for each UE, and thus may be different for each UE or for each SCS. That is, if the DMRS is located between the start symbol of the COT and the first data symbol of the PUSCH, T may start from the first data symbol of the PUSCH immediately after the DMRS. The DMRS may be transmitted even in a symbol other than the first symbol of the PUSCH, and the reference UL resource may be from the first data symbol of the PUSCH, other than the DMRS symbol, to the T or from the first data symbol of the PUSCH, other than the DMRS symbol, to a T time resource excluding DMRS symbols.

Figure 34:
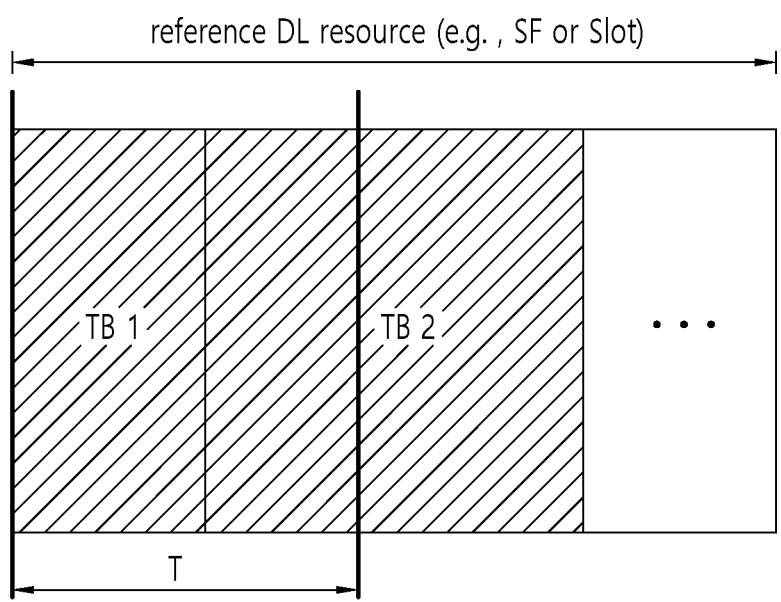
FIG. 34 illustrates TBs used for CWS adjustment.

FIG. 34 illustrates TBs used for CWS adjustment.

A plurality of non-slot-based PUSCHs may be scheduled in a specific UL transmission resource. In a first slot of the UL burst, there may be a PUSCH having a length of 2 symbols and a length of 4 symbols scheduled on a non-slot basis. If CBG-based (re)transmission is set, TB1 and TB2 of FIG. 34 may be configured with a single or multiple CBGs. Since T may be a T time resource excluding a DMRS symbol from a first data symbol of the PUSCH, not the DMRS symbol, it may be equal to the sum of the data symbols excluding the DMRS symbol. Alternatively, if data is carried in the DMRS symbol, the corresponding symbol length may also be included in T. Therefore, in the example, if the DMRS is mapped to the symbol in front of TB 2, the corresponding symbol may not be included in T, but may be set to be T including data symbols that follow.

In FIG. 34, even if part of TB (or part of CBG constituting the corresponding TB when the corresponding PUSCH is set for CBG-unit (re)transmission of the corresponding PUSCH) is included in T as in A) of Proposed Method #10, a decoding result for the corresponding TB (or CBG) is effectively referred to for CWS adjustment. Therefore, when a plurality of non-slot-based PUSCHs are scheduled in the reference UL resource, HARQ-ACK for all TB1 and TB2 that entirely or partially included in T (or part of CBG included in T among CBGs constituting TB2 in a case where CBG-based (re)transmission is set) may be referred to for CWS adjustment.

Figure 35:
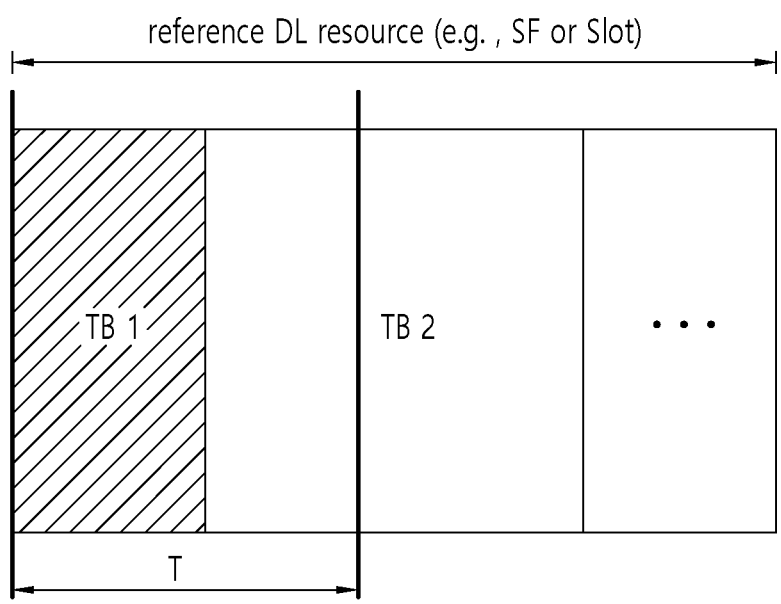
FIG. 35 is another example illustrating TB used for CWS adjustment.

FIG. 35 is another example illustrating TB used for CWS adjustment.

Referring to FIG. 35, in a case where all the TBs (or CBG-unit (re)transmission) is set in T as B) of Proposed Method #10, only the decoding result of TB1 (or CBG entirely included in T among CBGs constituting the TB1) in which TB (or CBG entirely included in T among CBGs constituting the corresponding TB may be effectively referred to for CWS adjustment.

If T is set or indicated as an entire slot interval, all decoding results (HARQ-ACK) in the first (transmission) slot of the UL transmission burst in both methods A) and B) may be effectively referred to for CWS adjustment.

[Proposed Method #5] may be used for CWS adjustment of the UE based on the decoding result of the effective TB or CBG selected through [Proposed Method #10].

<Method of Setting Flexible Feedback Timing of HARQ-ACK to be Referred to for CWS Adjustment>

In the existing LTE system, when a UL grant is received in the nth subframe, a first (transmission) subframe of a UL transmission burst including the latest UL subframe prior to the (n−3)th subframe is set to a reference subframe. This is a timeline in consideration of a processing time of the BS for scheduling retransmission or new UL transmission by transmitting a UL grant after the BS receives and decodes the PUSCH sent by the UE.

If this is generalized, the earliest feedback timing for the PUSCH transmitted by the UE in (subframe) n−K is K=3 in the case of LTE, which is (subframe) n after 3 subframes. The UE adjusts its CWS through an NDI in the UL grant including feedback information on the PUSCH transmitted in the reference UL subframe, and when the NDI is toggled, it is assumed that new data is scheduled and the previous PUSCH transmission is considered successful, and the CWS is initialized. In addition, if NDI is not toggled, it is regarded that NACK has been fed back and CWS is increased to a higher value. In NR, depending on a processing time capability of the BS and the UE, the HARQ-ACK feedback timing is accelerated, so that K may be less than 3.

Meanwhile, in a future wireless communication system, an autonomous UL access (AUL) may be introduced in which a UE may perform UL transmission through a preset resource without a UL grant. The BS may transmit HARQ-ACK feedback to the UE through downlink feedback information (AUL-DFI) or UL grant for the AUL PUSCH transmitted by the UE. The UE adjusts the CWS based on the corresponding feedback information. If the AUL-DFI or the UL grant is not received during a period of more than N subframes for the AUL PUSCH, the CWS is increased to a higher value. Here, N=max (contention window size adjustment timer X, burst length+1), the burst length is a length of the ith transmitted UL transmission burst, X is a CWS adjustment timer, and when the timer expires, CWS adjustment is performed and may be set to the UE by higher layer signaling. Similarly, when grant-free UL transmission is performed through a configured grant similar to AUL in NR-U, a minimum value of X may be smaller according to a processing time capability of the BS and the UE.

Figure 36:
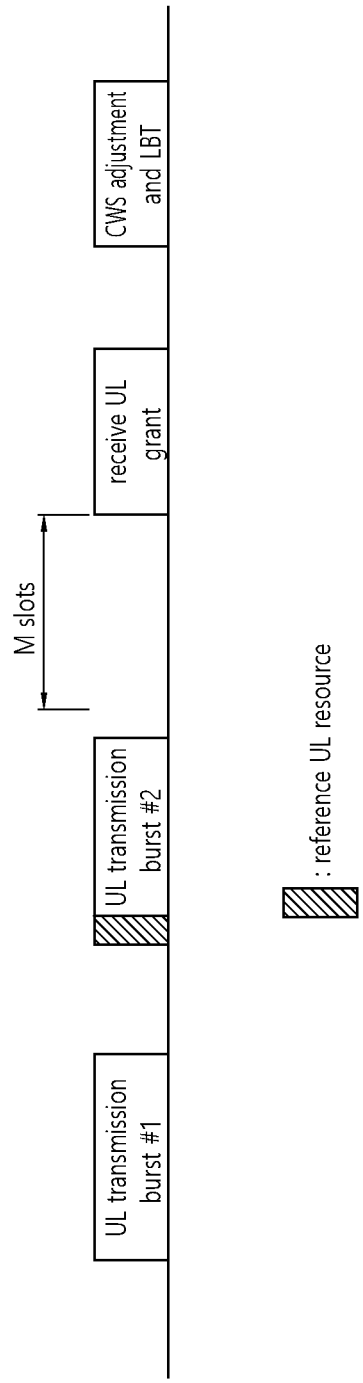
FIG. 36 shows an example of a UL LBT process.

FIG. 36 shows an example of a UL LBT process.

Referring to FIG. 36, the UE may transmit a UL transmission burst #1, and then transmit a UL transmission burst #2. The UL transmission burst may refer to continuous uplink transmission and may be transmitted through a plurality of consecutive slots in the time domain. The UL transmission burst may be transmitted through a PUSCH.

The UE may receive the UL grant. In this case, the UE may use, as a reference UL resource, a first slot (or subframe) of the UL transmission burst including the latest UL transmission slot (or subframe) before M (M is an integer) slots (or subframes) based on a reception time of the UL grant. Specifically, in order to adjust the contention window size in the UL LBT process, whether to retransmit for the HARQ process corresponding to a specific UL transmission resource may be referred to. In this case, the specific UL transmission resource may be referred to as a reference UL resource. In FIG. 36, UL transmission burst #2 includes the latest UL transmission slot before M slots based on the UL grant reception time. Accordingly, the first (transmission) slot of UL transmission burst #2 may be used as a reference UL resource.

The UE may perform CWS adjustment and LBT by using ACK/NACK or feedback information (such as NDI) for the reference UL resource. For example, when the NDI is toggled in a UL grant including feedback information (e.g., NDI) on a PUSCH transmitted through the reference UL resource, new data is scheduled, which is regarded as successful PUSCH transmission and CWS may be initialized. In addition, if the NDI is not toggled, it is considered that the NACK is fed back, the CWS is increased to a higher value, and the LBT process may then be performed.

In this process, the value M is conventionally set to a fixed value or a predetermined value, but the present disclosure proposes that the value M should be set to be flexible or independently set for each UE as follows.

[Proposed Method #6] When referring to whether to retransmit for the HARQ process corresponding to a specific UL transmission resource to adjust the contention window size in the UL LBT process, the specific UL transmission resource (hereinafter, reference UL resource) (as a reference target for whether to retransmit for the HARQ process) may be a first (transmission) slot (or subframe) of UL transmission burst including the latest UL transmission slot (or subframe) before M slots (or subframes) based on a reception time of the UL grant. In this case, (1) the value M indicated by the BS through higher layer signaling (e.g., RRC signaling) or a dynamic control signal (e.g., DCI) may be used. (2) When the value M is not set or indicated by the BS, the operation may be performed based on a default value (e.g., 3 slots). (3) The UE may operate under the assumption of the value M based on its processing capability information. However, the value M determined based on the processing capability information may be a value determined by values N1 and N2 themselves or functions of a plurality of K1 and K2 set to the UE (e.g., min(K1) or min(K2) or min(min(K1), min(K2))).

The M may mean/imply a time for the BS to obtain the decoding result for the corresponding PUSCH after receiving the PUSCH. In NR, unlike LTE, the value M is not fixed and an independent value M may be set for each UE through higher layer signaling or DCI (in consideration of a slot length set for each UE and a transmission band). When generalized, the first (transmission) subframe (or slot) of the UL transmission burst including the latest UL transmission subframe (or slot) before T1 ms based on the UL grant reception time may be set as a reference UL resource.

If the BS does not indicate or set the value M to the UE, the UE may operate based on an assumption based on capability information regarding whether a UL grant received in slot n (or subframe n) is a first (transmission) slot of the UL transmission burst including the latest UL slot (before M slots) prior to how many slots (or subframes) or based on the assumption of a basic value.

The UE initially reports the capability N1 and N2 values related to its processing time to the BS. Here, N1 is a symbol unit time taken from PDSCH reception to PUCCH transmission, and N2 is symbol unit time taken from PDCCH reception to PUSCH transmission. In consideration of the processing time capability of the UE and timing advanced ($T_A$), the BS indicates, to the UE, the time K1 in slot units for transmitting the PUCCH after receiving the PDSCH and the time K2 in slot units for transmitting the PUSCH after receiving the PDCCH. Therefore, the UE may operate based on the value M as one of the values of N1 and N2 themselves determined based on the processing capability information or a value determined by a function of a plurality of K1 and K2s set to the UE (e.g., min(K1) or min(K2) or min(min (K1), min(K2))).

Figure 37:
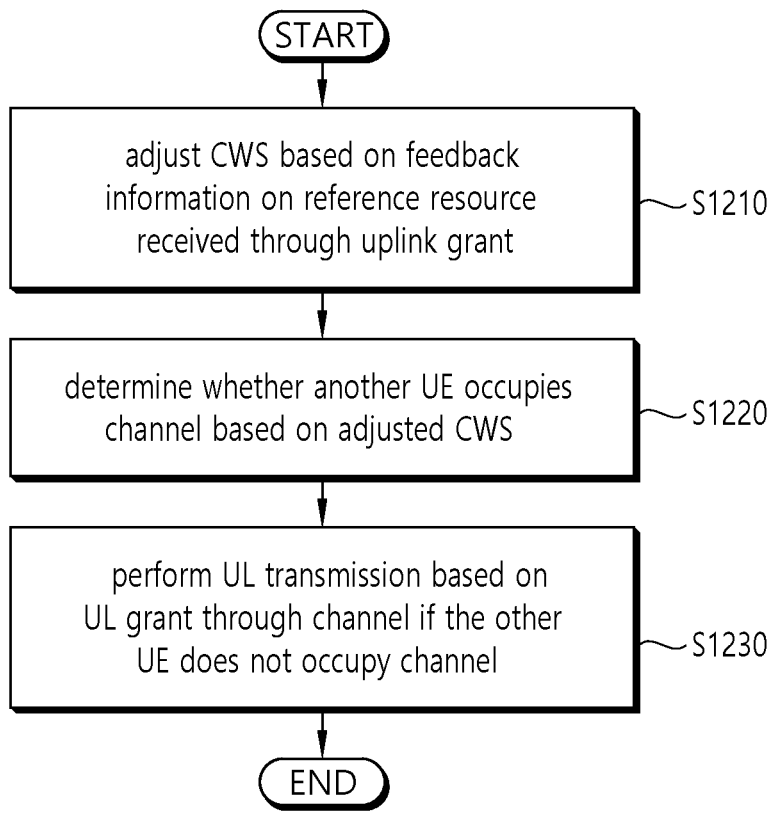
FIG. 37 exemplifies a channel access method of a UE based on Proposed Method #6.

FIG. 37 exemplifies a channel access method of a UE based on Proposed Method #6.

Referring to FIG. 37, the UE adjusts a contention window size (CWS) based on feedback information on a reference resource received through an uplink grant (S1210). The feedback information may be ACK/NACK (acknowledgement/negative-acknowledgement) information on uplink data transmitted by the UE in the reference resource or information (e.g., NDI) indicating whether or not new uplink data different from the uplink data transmitted by the UE in the reference resource is scheduled.

The UE determines whether another UE occupies a channel based on the adjusted CWS (S1220), and if the other UE does not occupy the channel, the UE performs uplink transmission based on the uplink grant through the channel (S1230).

Here, the reference resource may be a first transmission slot of the uplink transmission burst including the latest uplink transmission slot from before M (M is an integer) slots based on a time when the uplink grant is received. Also, the value M may be a value set by the BS.

The value M may be set through, for example, an RRC signal or DCI.

The uplink transmission burst may refer to uplink data transmitted through consecutive (series) slots.

Meanwhile, if a signal for setting the value M is not received from the BS, a default value may be used as the value M. Alternatively, if the signal for setting the value M is not received from the BS, a value determined based on processing capability information of the UE may be used as the value M. The processing capability information of the UE may include a symbol unit time taken to transmit a physical uplink control channel (PUCCH) after receiving a physical downlink shared channel (PDSCH) and a symbol unit time taken to transmit a physical uplink control channel (PUSCH) after receiving a physical downlink control channel (PDCCH).

The value M may be independently set for each UE.

The UE includes a transceiver for transmitting and receiving a wireless signal and a processor operating in conjunction with the transceiver, and the processor may perform the aforementioned methods.

A reference duration for CWS adjustment regarding occupancy of a BS (gNB) initiated channel may be defined as follows.

In the case of each LBT bandwidth set in which a channel occupancy with a unicast PDSCH and a single contention window are maintained, a reference duration for CWS adjustment may be one which occurs first among until the end of a first slot in which at least one unicast PDSCH is transmitted in all resources allocated for the PDSCH, starting from channel occupancy, or until the end of the first transmission burst by the BS including the unicast PDSCH(s) transmitted through all resources allocated to the PDSCH.

If there is a unicast PDSCH in channel occupancy but the unicast PDSCH is not transmitted through all resources allocated to the corresponding PDSCH, a duration of the first transmission burst by the BS within the channel occupancy including the unicast PDSCH may be a reference duration for CWS adjustment.

A reference duration for CWS adjustment for UE-initiated channel occupancy may be defined as follows.

In the case of each LBT bandwidth set in which a channel occupancy with a PUSCH and a single contention window are maintained, a reference duration for CWS adjustment may be one which occurs first among until the end of a first slot in which at least one PUSCH is transmitted in all resources allocated for the PUSCH, starting from channel occupancy or until the end of the first transmission burst including the PUSCH(s) transmitted by the UE through all resources allocated to the PUSCH.

In a case where the channel occupancy has a PUSCH but does not transmit the PUSCH through all the resources allocated to the PUSCH, a duration of the first transmission burst by the UE in the channel occupancy including the PUSCH(s) may be a reference duration for CWS adjustment.

[Proposed Method #7] In a configured grant in an unlicensed band (CGU), if the UE fails to receive HARQ feedback for the CGU PUSCH for a specific time (this time is called N slot), the UE performs CWS adjustment, and here, the N value may be set as follows. However, N=max (contention window size adjustment timer X, Ti burst length+1).

(1) A method of setting an independent value X for each UE through higher layer signaling or DCI.

A. The value X may be a value determined by the N1 and N2 values themselves or a function of a plurality of K1 and K2s set to the UE (for example, min(K1) or min(K2) or min(min(K1), min(K2)) or min(K1)+1 or min(K2)+1 or min(min(K1), min(K2))+1).

(2) In a situation where the value X is not set from the BS, the UE may operate under the assumption of a default value (e.g., 5 ms).

When there is no feedback through AUL-DFI or UL grant for N or more subframes (or slots) from the BS for the CGU-PUSCH transmitted by the UE in the AUL of the existing LTE (here N=max (contention window size adjustment timer X, Ti burst length+1)), CWS is increased to a higher value. In NR, the processing time may be relatively shortened according to the capability of the UE and the BS, so the value X, which is a criterion for CWS adjustment, may also be shortened compared to LTE. Therefore, the BS may set the independent value X for each UE by the N1 and N2 values themselves or the function of the plurality of K1 and K2s set to the UE (e.g., min(K1) or min(K2) or min(min(K1), min(K2)) or min(K1)+1 or min(K2)+1 or min(min(K1), min(K2))+1) through higher layer signaling or DCI. Alternatively, if the value X is not set, the UE may operate under the assumption of a default value (e.g., 5 ms).

<Method of Setting the Number of UE Type 2 LBT Attempts in UL Slots Continuously Allocated in Shared COT>

In LTE FeLAA, mode 1 and mode 2 UL partial subframe transmission which may start transmission at the #7th symbol (or between the #7th symbol and #8th symbol) within the COT shared by the BS to the UE has been introduced. When type 1 LBT is referred to as a random back-off-based LBT and type 2 LBT is referred to as a short one-shot LBT for 25 us, each mode may be set to an upper layer signal, RRC, and mode 1, mode 2, or both may be dynamically indicated through a UL grant to the UE.

When a single subframe is scheduled in mode 1 in the COT shared by the BS to the UE, two type 2 LBTs may be attempted at a first slot start position and a second slot start position within the subframe. Depending on the LBT performance result, transmission may be started from the first slot or the second slot. In the latter case, the first slot in the subframe is punctured. When a single subframe is scheduled in mode 2, LBT is not attempted at the first slot start position, and LBT is performed at the second slot start position, and if successful, transmission is started, and TB is rate-matched to the second slot. In addition, when a plurality of (multi) subframes are scheduled through DCI 0B or 4B, in mode 1, LBT is attempted at the start point of each subframe and at the #7 symbol to start transmission when successful. In the case of mode 2, LBT is attempted only at symbol #7 in the first subframe, and transmission is started when successful, and LBT is performed only at a start point of a subframe in the remaining subframes.

If both mode 1 and mode 2 are indicated, LBT is attempted only at the #7 symbol in the first subframe, and transmission may be started if successful, and LBT is attempted at a start time of each subframe and at the symbol #7 to start transmission if successful in the remaining subframes.

Meanwhile, in LTE FeLAA, when N consecutive UL subframes are allocated (by multi-subframe scheduling) within the COT shared by the BS to the UE as described above and mode 1 is allowed (or scheduled) to the UE, a maximum number of type 2 LBT attempts may be limited to N+1. That is, in the case of mode 1 in a plurality of N consecutive subframes, LBT may be performed at the start positions of the first and second slots of each slot, so if LBT is performed at all start points, a maximum of 2N type 2 LBTs may be performed, but the maximum number of type 2 LBTs may be limited to N+1 in consideration of the problem of coexistence with Wi-Fi. In which subframe to attempt N+1 type 2 LBT attempts depends on the implementation of the UE, and if N+1 LBTs, which is the maximum number of type 2 LBTs, are attempted within the allocated UL subframe, LBT cannot be attempted any more although the scheduled UL subframe remains, and thus UL transmission cannot be performed in the remaining subframe. Even in NR-U, it may be necessary to limit the number of type 2 LBT attempts in UL slots continuously allocated within the COT.

[Proposed Method #8] The maximum number of type 2 LBT attempts in consecutive W (or W ms) multiple (multi) UL slots (hereinafter, UL burst) may be limited as follows.

(1) When the UL burst includes only UL channels having the same priority, type 2 LBT may be allowed up to W+X1 (if X1=1, the same as LTE) or W*X2. However, X1 or X2 may be set to be different according to priority of the UL channel constituting the UL burst, and a larger X1 or X2 value may be set for a higher priority.

(2) When the UL burst is configured by mixing UL channels having different priorities, A) the same number of type 2 LBTs as the case of including only UL channels having a specific priority (e.g., the lowest or highest priority) as in (1) above may be allowed or B) a larger number of type 2 LBTs than the case of including only UL channels having a specific priority (e.g., the lowest or highest priority) as in (1) above may be allowed. For example, it may be set to W+X1+N, in which case N may be the maximum number of type 2 LBTs for the UL channel having the specific priority (e.g., a relatively high priority).

In the case of (2) above, a minimum number of LBTs for the UL channel having the specific priority (e.g., a relatively high priority) may be allocated by the BS. However, when X1, X2, and N may be predetermined values or constants set or indicated by the BS and, if X1, X2, and N are not separately indicated or set, the UE may operate based on the assumption of a default value (e.g., X1=1).

In the above, the corresponding method may be applied when a plurality of start candidate positions in the slots are set/indicated for all or part of the slots in one continuous UL burst.

When the priorities of the UL channels constituting the UL burst are different from each other, the proposed method may be applied to each section by dividing the section into one or more UL bursts even within one continuous UL burst.

As an example, if the UE has been scheduled with W (or W ms) multiple UL slots within the COT shared by the BS and this UL burst is configured only with UL channels (e.g., PUSCH) having the same priority, the UE may attempt a maximum W+X1 LBTs according to the set or indicated value X (e.g., X1=1). If the corresponding burst includes UL bursts having the same priority but includes only UL channels (e.g., PUCCH) having a higher priority than the PUSCH mentioned in the previous example, the value X may be set to be different according to the priority of the UL channel by the maximum allowed number of type 2 LBT W+X2 (Here, X2>X1). Alternatively, when the value X is not indicated or set by the BS, the UE may operate based on the assumption of a specific default value (e.g., X=1).

In which slot to perform the LBT of W+X may differ depending on the implementation of the UE, and if all of the maximum type 2 LBT counts W+X are attempted at a specific time in the UL burst, LBT cannot be attempted in the remaining slots that are scheduled, and thus, UL transmission cannot be performed.

As another example, when UL bursts are configured by mixing UL channels with different priorities, type 2 LBT attempts up to W+X times may be allowed like the case where UL bursts include UL channels having the same priority.

In addition, when transmission of a UL channel such as PUCCH or PRACH including UCI such as HARQ-ACK is indicated with higher priority than the PUSCH in some N slots (or N ms) of the UL burst, the maximum number of type 2 LBTs of the UE within one COT may be allowed up to W+X+N. Here, the value of N is the number of additional type 2 LBTs for the UL channel having a specific priority. For example, in a UL burst composed of 5 slots, if there are 4 slots for which PUSCH is scheduled and one slot for which PUCCH is scheduled, type 2 LBTs may be performed up to W+X+N as type 2 LBT number N for the PUCCH having higher priority than the PUSCH is added to the maximum type 2 LBT number allowed for PUSCH transmission.

Meanwhile, in a situation in which the maximum number of type 2 LBT attempts for all UL bursts in (2) is allowed as described above, the BS may allocate a minimum number of type 2 LBTs to the UL channel having a specific priority. For example, in a UL burst composed of 5 slots, when there are 4 slots for which PUSCH is scheduled and one slot for which PUCCH is scheduled and the maximum number of type 2 LBT attempts of all W+X times is allowed, type 2 LBT for PUCCH transmission may be allocated to be performed at least three times. In this case, the maximum number of type 2 LBTs allowed for PUSCH transmission may be W+X−3 excluding the number of LBT attempts for PUCCH transmission among all W+Xs. In addition, the maximum number of type 2 LBTs may be defined for each priority of UL channels constituting the UL burst.

Meanwhile, the contents of the present disclosure are not limited to the uplink or downlink between the BS and the UE, and the proposed method may be used for direct communication between UEs.

Since examples of the aforementioned proposed method may also be included as one of the implementation methods of the present disclosure, it is obvious that the examples may be regarded as a kind of proposed method. In addition, the aforementioned proposed methods may be implemented independently or may be implemented in the form of a combination (or merge) of some of the proposed methods. A rule may be defined such that a BS provides or a transmitting UE transmits, to a receiving UE, the information on whether to apply the proposed methods (or information on the rules of the proposed methods) through predefined signaling (e.g., physical layer signaling or a higher layer signaling).

The contents of the present disclosure are not limitedly applied to direct communication between UEs and may also be used in uplink or downlink. In this case, a BS or a relay node may use the proposed method.

Since examples of the aforementioned proposed method may also be included as one of the implementation methods of the present disclosure, it is obvious that the examples may be regarded as a kind of proposed method. In addition, the aforementioned proposed methods may be implemented independently or may be implemented in the form of a combination (or merge) of some of the proposed methods. A rule may be defined such that a BS provides or a transmitting UE transmits, to the receiving UE, the information on whether to apply the proposed methods (or information on the rules of the proposed methods) through predefined signaling (e.g., physical layer signaling or a higher layer signaling).

Figure 38:
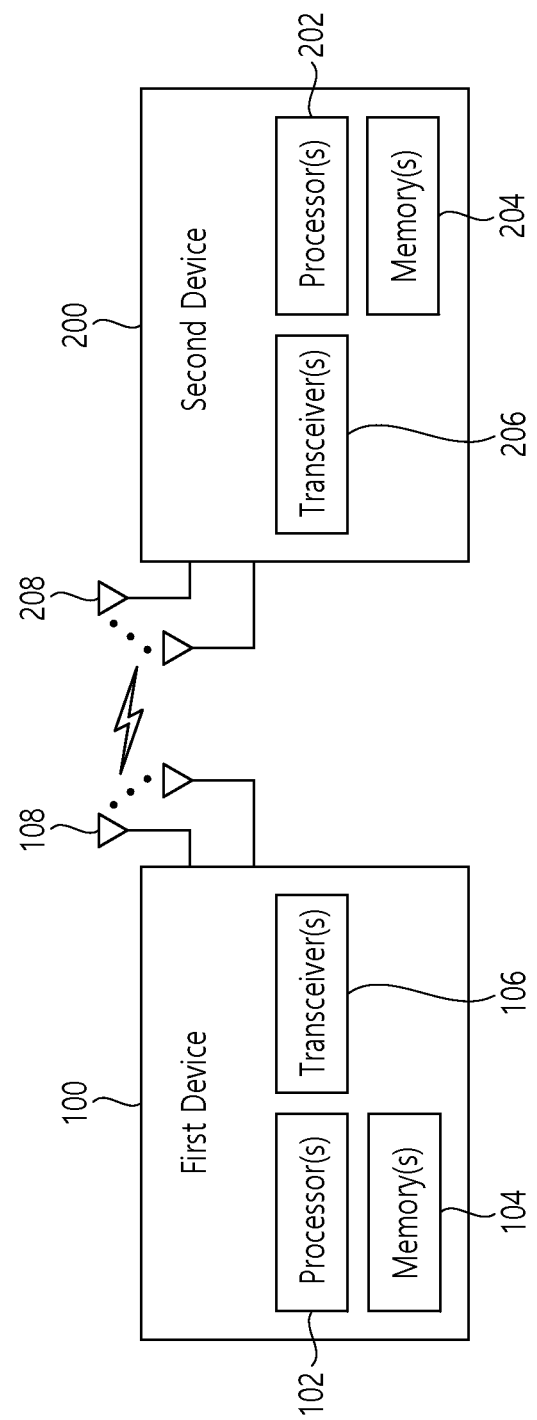
FIG. 38 illustrates a wireless device applicable to the present disclosure.

FIG. 38 illustrates a wireless device applicable to the present disclosure.

Referring to FIG. 38, a first wireless device 100 and a second wireless device 200 may transmit and receive wireless signals through various wireless access technologies (e.g., LTE and NR). Here, {first wireless device 100, second wireless device 200} may be matched to {wireless device 100x, BS 200} and/or {wireless device 100x, wireless device 100x} of FIG. 2.

The first wireless device 100 includes one or more processors 102 and one or more memories 104, and may further include one or more transceivers 106 and/or one or more antennas 108. The processor 102 may control the memory 104 and/or the transceiver 106 and may be configured to implement the descriptions, functions, procedures, proposals, methods, and/or operational flowcharts disclosed herein. For example, the processor 102 may generate first information/signal by processing information in the memory 104 and then transmit a wireless signal including the first information/signal through the transceiver 106. In addition, the processor 102 may receive a wireless signal including second information/signal through the transceiver 106 and then store information obtained by processing the second information/signal in the memory 104. The memory 104 may be connected to the processor 102 and may store various information related to the operation of the processor 102. For example, the memory 104 may perform some or all of the processes controlled by the processor 102 or store software codes including commands for performing the descriptions, functions, procedures, proposals, methods, and/or operational flowcharts disclosed herein. Here, the processor 102 and the memory 104 may be part of a communication modem/circuit/chip designed to implement wireless communication technology (e.g., LTE, NR). The transceiver 106 may be connected to the processor 102 and may transmit and/or receive wireless signals through one or more antennas 108. The transceiver 106 may include a transmitter and/or a receiver. The transceiver 106 may be mixed with a radio frequency (RF) unit. In the present disclosure, a wireless device may refer to a communication modem/circuit/chip.

The second wireless device 200 includes one or more processors 202 and one or more memories 204, and may further include one or more transceivers 206 and/or one or more antennas 208. The processor 202 may control the memory 204 and/or the transceiver 206 and may be configured to implement the descriptions, functions, procedures, proposals, methods, and/or operational flowcharts disclosed herein. For example, the processor 202 may generate third information/signal by processing information in the memory 204 and then transmit a wireless signal including the third information/signal through the transceiver 206. In addition, the processor 202 may receive a wireless signal including fourth information/signal through the transceiver 206 and then store information obtained by processing the fourth information/signal in the memory 204. The memory 204 may be connected to the processor 202 and may store various information related to the operation of the processor 202. For example, the memory 204 may perform some or all of the processes controlled by the processor 202 or store software codes including commands for performing the descriptions, functions, procedures, proposals, methods, and/or operational flowcharts disclosed herein. Here, the processor 202 and the memory 204 may be part of a communication modem/circuit/chip designed to implement wireless communication technology (e.g., LTE, NR). The transceiver 206 may be connected to the processor 202 and may transmit and/or receive wireless signals through one or more antennas 208. The transceiver 206 may include a transmitter and/or a receiver. The transceiver 206 may be mixed with a radio frequency (RF) unit. In the present disclosure, a wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102 and 202 may implement one or more layers (e.g., functional layers such as PHY, MAC, RLC, PDCP, RRC, or SDAP). One or more processors 102 and 202 may generate one or more protocol data units (PDUs) and/or one or more service data units (SDUs) according to the descriptions, functions, procedures, proposals, methods, and/or operational flowcharts disclosed in this document. One or more processors 102 and 202 may generate messages, control information, data, or information according to the descriptions, functions, procedures proposals, methods, and/or operational flowcharts disclosed herein. One or more processors 102 and 202 generate signals (e.g., baseband signals) including PDUs, SDUs, messages, control information, data or information according to the functions, procedures, proposals and/or methods disclosed herein and provide the generated signal to one or more transceivers 106 and 206. One or more processors 102 and 202 may receive signals (e.g., baseband signals) from one or more transceivers 106 and 206 and acquire PDUs, SDUs, messages, control information, data or information according to the descriptions, functions, procedures, proposals, methods, and/or operational flowcharts disclosed herein.

The one or more processors 102 and 202 may be referred to as a controller, a microcontroller, a microprocessor, or a microcomputer. One of processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The descriptions, functions, procedures, proposals, methods, and/or operational flowcharts disclosed in this document may be implemented using firmware or software, and firmware or software may be implemented to include modules, procedures, functions, and the like. Firmware or software set to perform the descriptions, functions, procedures, proposals, methods and/or operational flowcharts disclosed in this document may be included in one or more processors 102 and 202 or may be stored in one or more memories 104 and 204 and driven by one or more processors 102 and 202. The descriptions, functions, procedures, proposals, methods, and/or operational flowcharts disclosed in this document may be implemented using firmware or software in the form of codes, instructions, and/or sets of commands.

One or more memories 104, 204 may be connected to one or more processors 102 and 202 and may store various types of data, signals, messages, information, programs, codes, instructions, and/or commands. One or more memories 104 and 204 may include ROM, RAM, EPROM, flash memory, hard drive, register, cache memory, computer readable storage medium, and/or combinations thereof. One or more memories 104 and 204 may be located inside and/or outside one or more processors 102 and 202. In addition, one or more memories 104, 204 may be connected to one or more processors 102, 202 through various technologies such as wired or wireless connection.

The one or more transceivers 106 and 206 may transmit user data, control information, wireless signals/channels, and the like mentioned in the methods and/or operational flowcharts of this document to one or more other devices. One or more transceivers 106 and 206 may receive user data, control information, wireless signals/channels, etc. mentioned in the descriptions, functions, procedures, proposals, methods and/or operational flowcharts disclosed in this document from one or more other devices. For example, one or more transceivers 106 and 206 may be connected to one or more processors 102 and 202 and may transmit and receive wireless signals. For example, one or more processors 102 and 202 may control one or more transceivers 106 and 206 to transmit user data, control information, or wireless signals to one or more other devices. In addition, one or more processors 102, 202 may control one or more transceivers 106 and 206 to receive user data, control information, or wireless signals from one or more other devices. In addition, one or more transceivers 106 and 206 may be connected to one or more antennas 108 and 208, and one or more transceivers 106 and 206 may be configured to transmit and receive user data, control information, wireless signals/channels, and the like mentioned in the descriptions, functions, procedures, proposals, methods and/or operational flowcharts disclosed in this document through one or more antennas 108 and 208. In this document, one or more antennas may be a plurality of physical antennas or a plurality of logical antennas (e.g., antenna ports). One or more transceivers 106 and 206 may convert received wireless signals/channels, etc. from RF band signals to baseband signals to process received user data, control information, wireless signal/channels, etc. using one or more processors 102 and 202. One or more transceivers 106 and 206 may convert the user data, control information, wireless signals/channels, etc. processed using one or more processors 102 and 202 from baseband signals to RF band signals. To this end, one or more of the transceivers 106 and 206 may include (analog) oscillators and/or filters.

Figure 39:
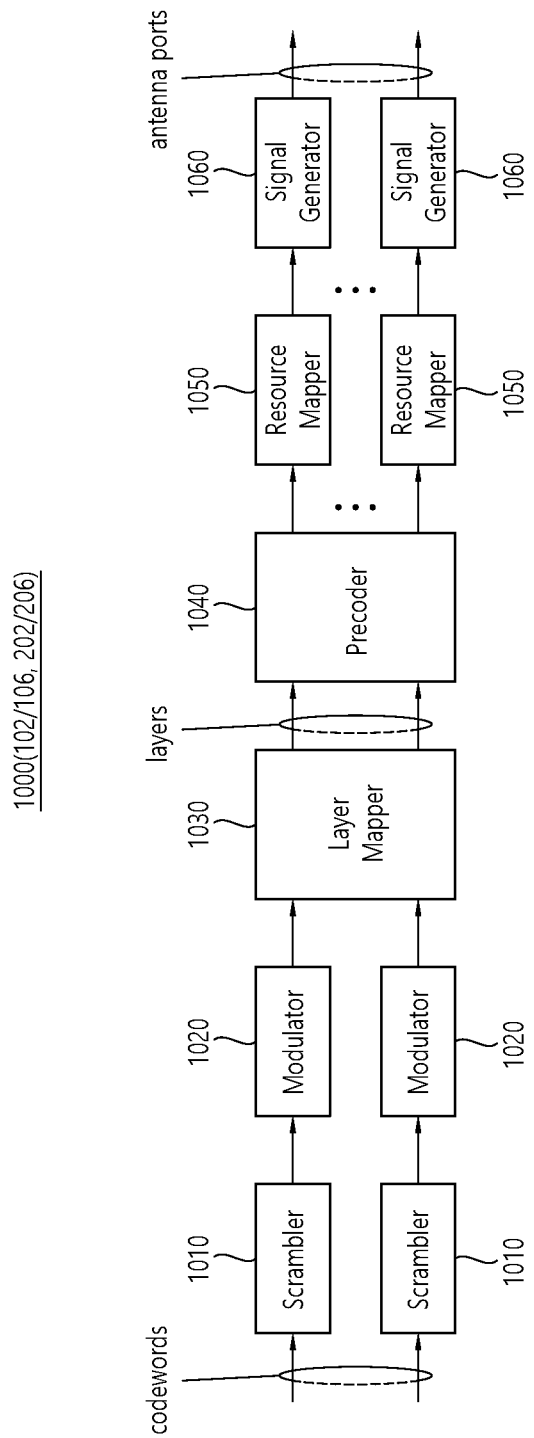
FIG. 39 exemplifies a signal processing circuit for a transmission signal.

FIG. 39 exemplifies a signal processing circuit for a transmission signal.

Referring to FIG. 39, a signal processing circuit 1000 includes a scrambler 1010, a modulator 1020, a layer mapper 1030, a precoder 1040, a resource mapper 1050, and a signal generator 1060. The operations/functions of FIG. 39 may be performed in the processors 102 and 202 and/or the transceivers 106 and 206 of FIG. 38 but are not limited thereto. The hardware elements of FIG. 39 may be implemented in the processors 102 and 202 and/or the transceivers 106 and 206 of FIG. 38. For example, blocks 1010 to 1060 may be implemented in the processors 102 and 202 of FIG. 38. In addition, blocks 1010 to 1050 may be implemented in the processors 102 and 202 of FIG. 38, and block 1060 may be implemented in the transceivers 106 and 206 of FIG. 38.

A codeword may be converted into a wireless signal through the signal processing circuit 1000 of FIG. 39. Here, the codeword is an encoded bit sequence of an information block. The information block may include a transport block (e.g., a UL-SCH transport block or a DL-SCH transport block). The wireless signal may be transmitted through various physical channels (e.g., PUSCH or PDSCH).

Specifically, the codeword may be converted into a scrambled bit sequence by the scrambler 1010. The scramble sequence used for scrambling is generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. The modulation symbols of each transport layer may be mapped to the corresponding antenna port(s) by the precoder 1040 (precoding). An output z of the precoder 1040 may be obtained by multiplying an output y of the layer mapper 1030 by an N*M precoding matrix W. Here, N is the number of antenna ports and M is the number of transmission layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols or DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an inverse fast Fourier transform (IFFT) module, a cyclic prefix (CP) inserter, a digital-to-analog converter (DAC), a frequency uplink converter, and the like.

A signal processing process for a received signal in the wireless device may be configured as the reverse of the signal processing process (1010 to 1060) of FIG. 39. For example, a wireless device (e.g., 100 or 200 in FIG. 38) may receive a wireless signal from the outside through an antenna port/transmitter. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be restored into a codeword through a resource de-mapper process, a postcoding process, a demodulation process, and a de-scramble process. The codeword may be restored to an original information block through decoding. Accordingly, a signal processing circuit (not shown) for a received signal may include a signal restorer, a resource demapper, a postcoder, a demodulator, a descrambler, and a decoder.

Figure 40:
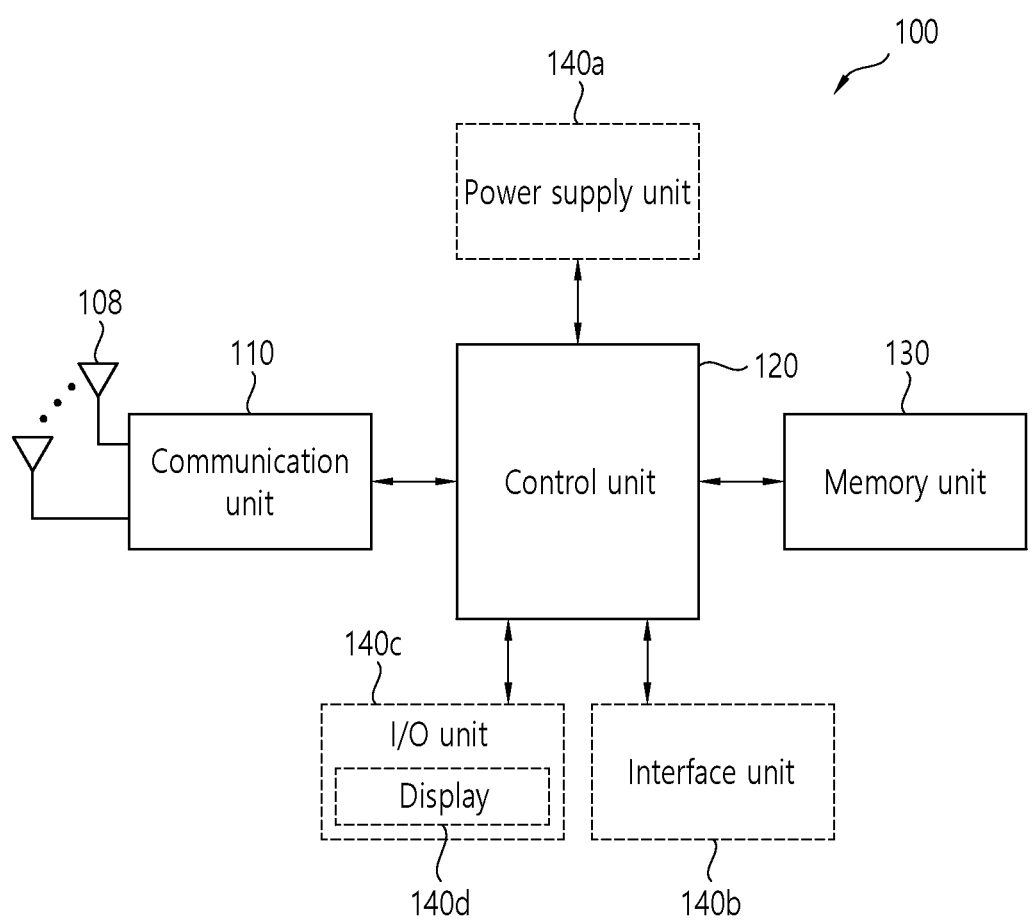
FIG. 40 illustrates a portable device applied to the present disclosure.

FIG. 40 illustrates a portable device applied to the present disclosure.

The portable device may include a smartphone, a smart pad, a wearable device (e.g., smart watch or smart glasses), a portable computer (e.g., a notebook), etc. The portable device may be referred to as a mobile station (MS), a user terminal (UT), a mobile subscriber station (MSS), a subscriber station (SS), an advanced mobile station (AMS), or a wireless terminal (WT).

Referring to FIG. 40, the portable device 100 may include an antenna unit 108, a communication unit 110, a controller 120, a memory unit 130, a power supply unit 140a, an interface unit 140b, and input/output unit 140c. The antenna unit 108 may be configured as a part of the communication unit 110. Blocks 110 to 130/140a to 140c correspond to blocks 110 to 130/140 of FIG. 35, respectively.

The communication unit 110 may transmit and receive signals (e.g., data, control signals, etc.) with other wireless devices and BSs. The controller 120 may perform various operations by controlling components of the portable device 100. The controller 120 may include an application processor (AP). The memory unit 130 may store data/parameters/programs/codes/commands required for driving the portable device 100. Also, the memory unit 130 may store input/output data/information, and the like. The power supply unit 140a supplies power to the portable device 100 and may include a wired/wireless charging circuit, a battery, and the like. The interface unit 140b may support connection between the portable device 100 and other external devices. The interface unit 140b may include various ports (e.g., audio input/output ports or video input/output ports) for connection with external devices. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c acquires information/signals (e.g., touch, text, voice, image, or video) input from the user, and the acquired information/signals may be stored in the memory unit 130. The communication unit 110 may convert information/signals stored in the memory into wireless signals and may directly transmit the converted wireless signals to other wireless devices or to a BS. In addition, after receiving a wireless signal from another wireless device or a BS, the communication unit 110 may restore the received wireless signal to the original information/signal. The restored information/signal may be stored in the memory unit 130 and then output in various forms (e.g., text, voice, image, video, or haptic) through the input/output unit 140c.

Although not shown in FIG. 40, various components such as a camera, a universal serial bus (USB) port, etc. may be additionally included in the UE. For example, the camera may be connected to the processor.

Hereinafter, a channel coding scheme will be described.

Channel coding schemes according to some embodiments of the present disclosure may generally include a low-density parity-check (LDPC) coding scheme for data and a polar coding scheme for control information.

A network/UE may perform LDPC coding on a PDSCH/PUSCH having two base graphs (BGs). Here, BG1 may be related to a mother code rate of 1/3, and BG2 may be related to a mother code rate of 1/5.

For coding of control information, coding schemes, such as repetition coding/simplex coding/Reed-Muller coding, may be supported. The polar coding scheme may be used when control information has a length longer than 11 bits. A mother code size may be 512 for a downlink, and a mother code size may be 1024 for an uplink. Coding scheme for uplink control information may be summarized as in the following table.

TABLE 12

| Uplink control information size including CRC, if present | Channel code |
|---|---|
| 1 | Repetition code |
| 2 | Simplex code |
| 3-11 | Reed-Muller code |
| >11 | Polar code |

The polar coding scheme may be used for a PBCH. This coding scheme may be the same as that for a PDCCH.

Hereinafter, an LDPC coding structure will be described.

An LDPC code is a (n, k) linear block code defined by a sparse parity-check matrix H of a null-space of (n−k)×n.

An LDPC code applicable to some embodiments of the present disclosure may be represented as follows.

$$Hx^T = 0 \quad \text{[Equation 2]}$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x_1 \\ x_2 \\ x_3 \\ x_4 \\ x_5 \end{bmatrix} = \begin{bmatrix} 0 \\ 0 \\ 0 \\ 0 \end{bmatrix}$$

FIG. 41 illustrates an example of a parity-check matrix expressed as a protograph.

Specifically, FIG. 41 shows a parity-check matrix indicating a correlation between a variable node and a check node, which is expressed as a protograph.

For example, referring to FIG. 41, variable nodes $v_1$, $v_2$, $v_3$, $v_4$, $v_6$, and $v_7$ are correlated with check node $c_1$, and check nodes $c_2$, $c_3$, and $c_4$ are correlated with variable node v8.

Figure 42:
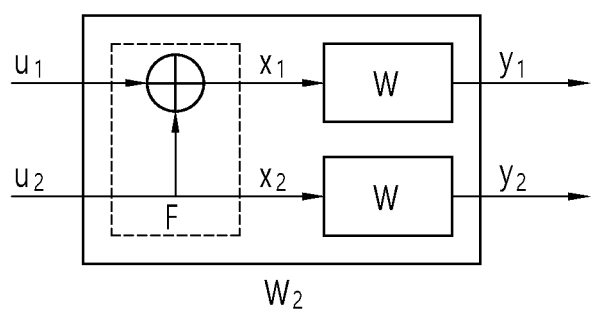
FIG. 42 illustrates an example of an encoder structure for a polar code.

FIG. 42 illustrates an example of an encoder structure for a polar code.

Specifically, (a) of FIG. 42 shows an example of a base module of the polar code, and (b) of FIG. 42 shows a base matrix.

The polar code is known as a code capable of acquiring channel capacity in a binary-input discrete memoryless channel (B-DMC). That is, when the size N of a code block increases to infinity, channel capacity can be obtained.

Figure 43:
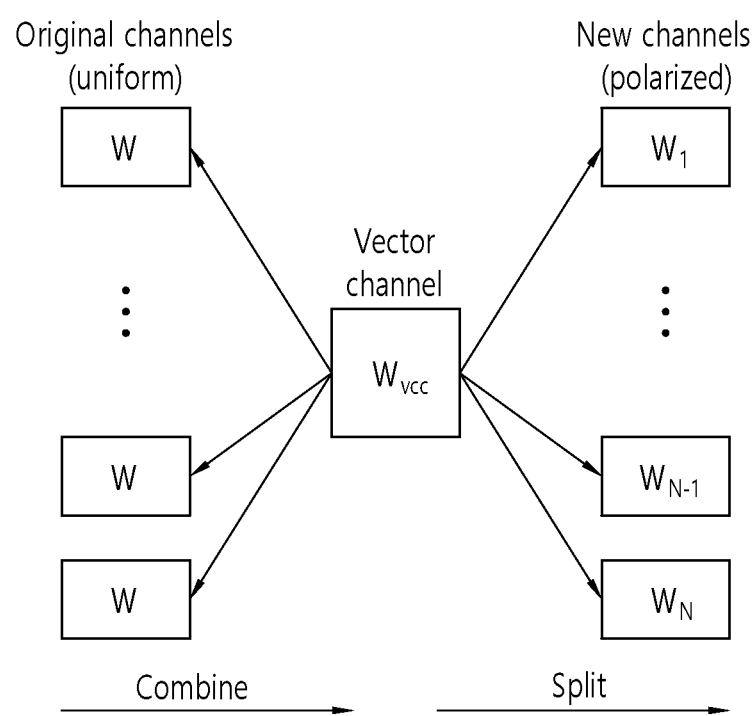
FIG. 43 schematically illustrates an example of an encoder operation of a polar code.

FIG. 43 schematically illustrates an example of an encoder operation of a polar code.

Referring to FIG. 43, the encoder of the polar code may perform channel combining and channel splitting. Specifically, the encoder of the polar code may combine existing channels into one vector channel, or may split one vector channel into a plurality of new channels. For example, the existing channels before combining into one vector channel may be uniform, and the plurality of new channels into one vector channel is split may be polarized.

<Discontinuous Reception (DRX)>

Discontinuous reception (DRX) refers to an operation mode that enables a UE to reduce battery consumption and to discontinuously receive a downlink channel. That is, the UE configured in DRX may discontinuously receive a DL signal, thereby reducing power consumption.

A DRX operation is performed within a DRX cycle indicating a time period in which an on duration is periodically repeated. The DRX cycle includes an on duration and a sleep duration (or opportunity for DRX). The on duration indicates a time period in which a UE monitors a PDCCH to receive the PDCCH.

DRX may be performed in a radio resource control (RRC)_IDLE state (or mode), RRC_INACTIVE state (or mode), or RRC_CONNECTED state (or mode). In the RRC_IDLE state and the RRC_INACTIVE state, DRX may be used to discontinuously receive a paging signal.

RRC_IDLE state: State in which a wireless connection (RRC connection) is not established between a base station and a UE RRC_INACTIVE state: State in which a wireless connection (RRC connection) is established between a base station and a UE but is deactivated RRC_CONNECTED state: State in which a radio connection (RRC connection) is established between a base station and a UE.

DRX may be basically divided into idle-mode DRX, connected DRX (C-DRX), and extended DRX.

DRX applied in the idle state may be referred to as idle-mode DRX, and DRX applied in the connected state may be referred to as connected-mode DRX (C-DRX).

Extended/enhanced DRX (eDRX) is a mechanism capable of extending the cycle of idle-mode DRX and C-DRX and may be mainly used for application of (massive) IoT. In idle-mode DRX, whether to allow eDRX may be configured based on system information (e.g., SIB1). SIB1 may include an eDRX-allowed parameter. The eDRX-allowed parameter is a parameter indicating whether idle-mode extended DRX is allowed.

<Idle-Mode DRX>

In the idle mode, a UE may use DRX to reduce power consumption. One paging occasion (PO) is a subframe in which a paging-radio network temporary identifier (P-RNTI) can be transmitted through a physical downlink control channel (PDCCH), a MTC PDCCH (MPDCCH), or a narrowband PDCCH (NPDCCH) (addressing a paging message for NB-IoT).

In a P-RNTI transmitted through an MPDCCH, PO may indicate a starting subframe of an MPDCCH repetition. In the case of a P-RNTI transmitted through an NPDCCH, when a subframe determined based on a PO is not a valid NB-IoT downlink subframe, the PO may indicate a starting subframe of an NPDCCH repetition. Therefore, a first valid NB-IoT downlink subframe after the PO is the starting subframe of the NPDCCH repetition.

One paging frame (PF) is one radio frame that may include one or a plurality of paging occasions. When DRX is used, the UE needs to monitor only one PO per DRX cycle. One paging narrow band (PNB) is one narrow band in which the UE receives a paging message. A PF, a PO and a PNB may be determined based on DRX parameters provided via system information.

Figure 44:
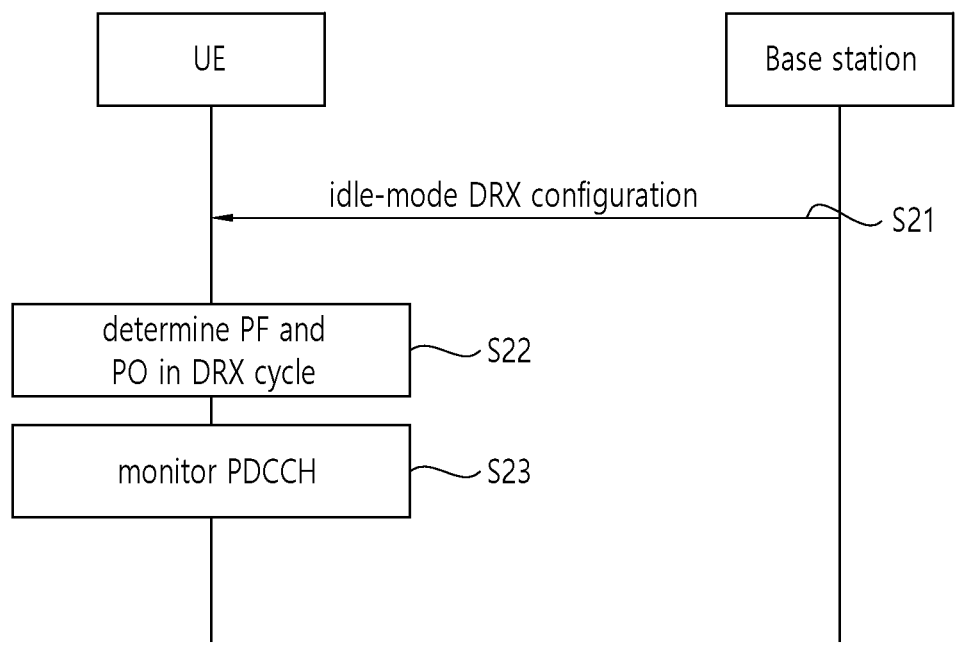
FIG. 44 is a flowchart illustrating an example of performing an idle-mode DRX operation.

FIG. 44 is a flowchart illustrating an example of performing an idle-mode DRX operation.

Referring to FIG. 44, a UE may receive idle-mode DRX configuration information from a base station through higher-layer signaling (e.g., system information) (S21).

The UE may determine a paging frame (PF) and a paging occasion (PO) to monitor a PDCCH in a paging DRX cycle based on the idle-mode DRX configuration information (S22). In this case, the DRX cycle may include an on duration and a sleep duration (or opportunity for DRX).

The UE may monitor a PDCCH in the PO of the determined PF (S23). Here, for example, the UE monitors only one subframe (PO) per paging DRX cycle. In addition, when the UE receives a PDCCH scrambled with a P-RNTI in the on duration (that is, when paging is detected), the UE may transition to a connected mode and may transmit and receive data to and from the base station.

Figure 45:
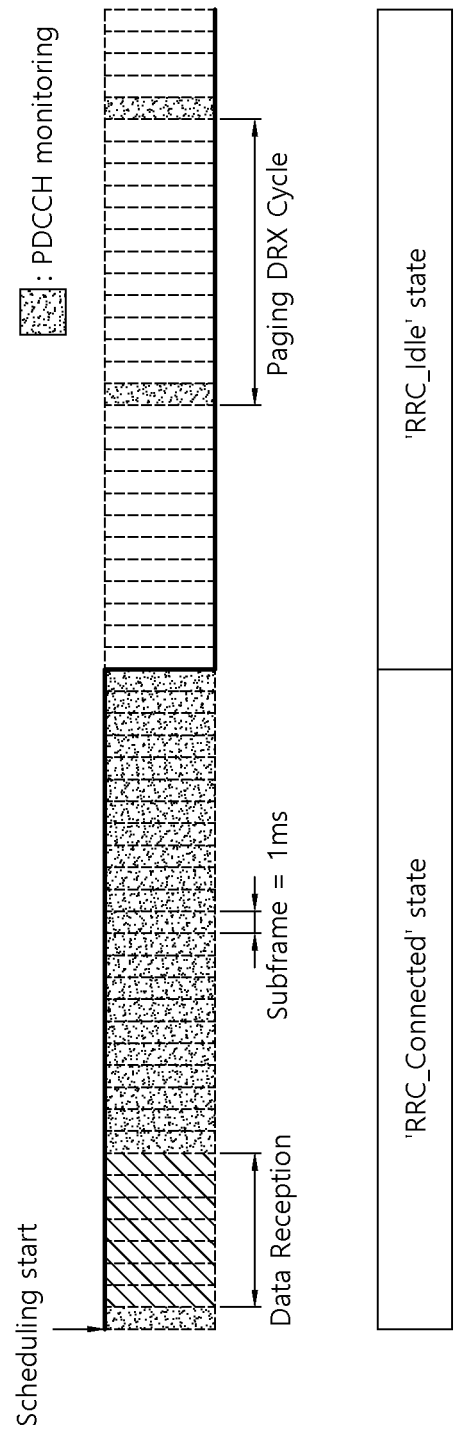
FIG. 45 schematically illustrates an example of an idle-mode DRX operation.

FIG. 45 schematically illustrates an example of an idle-mode DRX operation.

Referring to FIG. 45, when there is traffic directed to a UE in the RRC_IDLE state (hereinafter, referred to as an idle state), paging to the UE occurs. The UE may periodically wake up (that is, every (paging) DRX cycle) and may monitor a PDCCH. When there is no paging, the UE may transition to the connected state, may receive data, and may enter the sleep mode again if data does not exist.

<Connected-Mode DRX (C-DRX)>

C-DRX refers to DRX applied in the RRC connected state. The DRX cycle of C-DRX may include a short DRX cycle and/or a long DRX cycle. Here, the short DRX cycle may be optional.

When C-DRX is configured, a UE may perform PDCCH monitoring for an on duration. When a PDCCH is successfully detected during the PDCCH monitoring, the UE may operate (or run) an inactivity timer and may maintain an awake state. However, when the PDCCH is not successfully detected during the PDCCH monitoring, the UE may enter a sleep state after the on duration expires.

When C-DRX is configured, a PDCCH reception occasion (e.g., a slot having a PDCCH search space) may be discontinuously configured based on the C-DRX configuration. However, when C-DRX is not configured, a PDCCH reception occasion (e.g., a slot having a PDCCH search space) can be continuously configured in the present disclosure.

PDCCH monitoring may be limited to a time period set as a measurement gap regardless of a C-DRX configuration.

Figure 46:
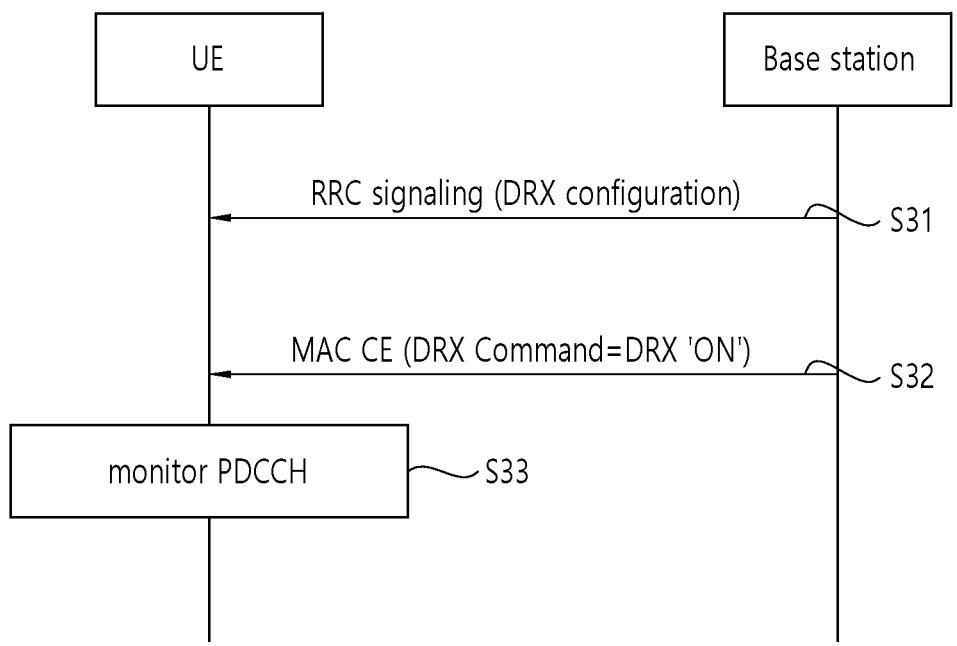
FIG. 46 is a flowchart illustrating an example of a method for performing a C-DRX operation.

FIG. 46 is a flowchart illustrating an example of a method for performing a C-DRX operation.

A UE may receive RRC signaling (e.g., MAC-MainConfig IE) including DRX configuration information from a base station (S31).

The DRX configuration information may include the following information.
 onDurationTimer: Number of PDCCH subframes that can be continuously monitored at the beginning of a DRX cycle
 drx-InactivityTimer: Number of PDCCH subframes that can be continuously monitored when a UE decodes a PDCCH having scheduling information
 drx-RetransmissionTimer: Number of PDCCH subframes to be continuously monitored when HARQ retransmission is expected
 longDRX-Cycle: Period of on-duration
 drxStartOffset: Subframe number where a DRX cycle starts
 drxShortCycleTimer: Number of short DRX cycle
 shortDRX-Cycle: DRX cycle operating as many as drxShortCycleTimer when Drx-InactivityTimer expires Further, when DRX 'ON' is set through a DRX command of a MAC command element (CE) (S32), the UE monitors a PDCCH for an on duration of the DRX cycle based on the DRX configuration (S33).

Figure 47:
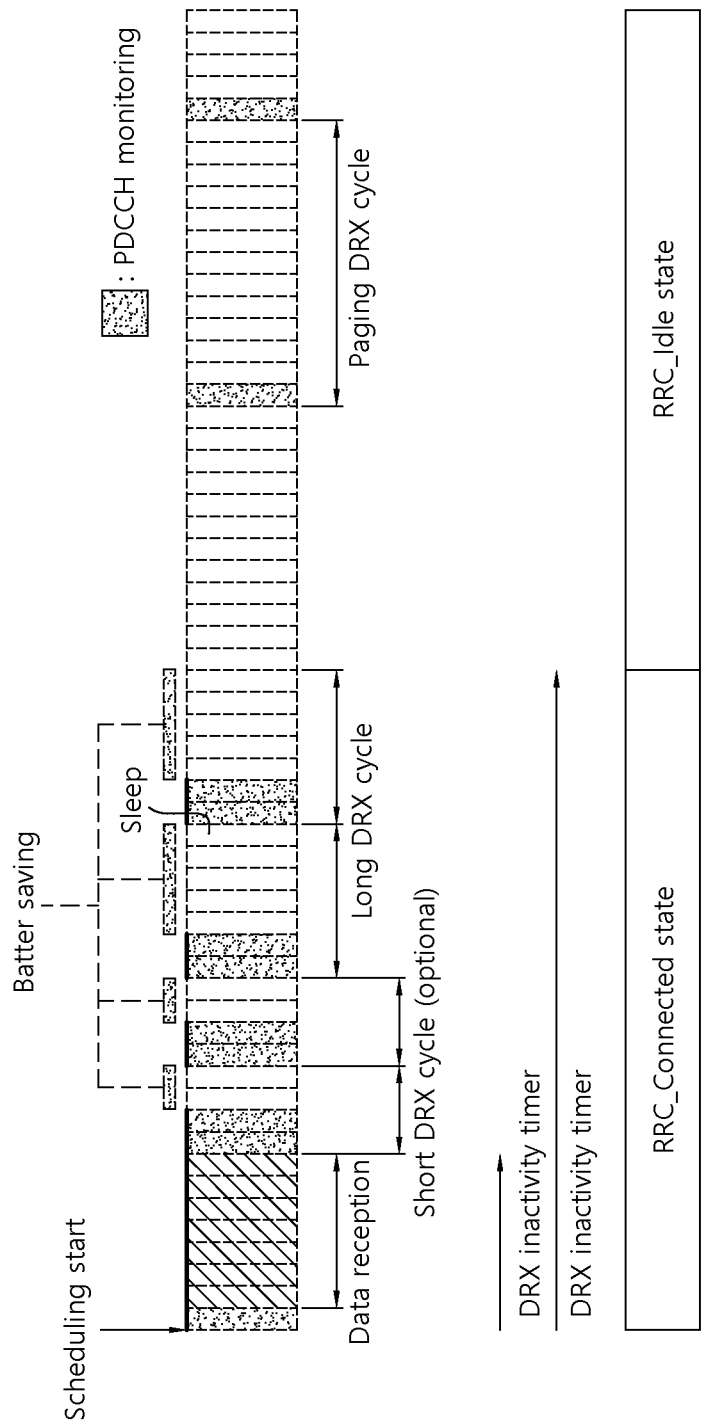
FIG. 47 schematically illustrates an example of a C-DRX operation.

FIG. 47 schematically illustrates an example of a C-DRX operation.

When a UE receives scheduling information (e.g., a DL grant) in the RRC_CONNECTED state (hereinafter, referred to as a connected state), the UE may run a DRX inactivity timer and an RRC inactivity timer.

When the DRX inactivity timer expires, a DRX mode may start. The UE wakes up in a DRX cycle and may monitor a PDCCH for a predetermined time (on a duration timer).

In this case, if short DRX is configured, when the UE starts the DRX mode, the UE first starts with a short DRX cycle, and then starts with a long DRX cycle after the short DRX cycle expires. Here, the long DRX cycle may correspond to a multiple of the short DRX cycle. In the short DRX cycle, the UE may more frequently wake up. After the RRC inactivity timer expires, the UE may transition to the idle state and may perform an idle-mode DRX operation.

<IA/RA+DRX Operation>

Figure 48:
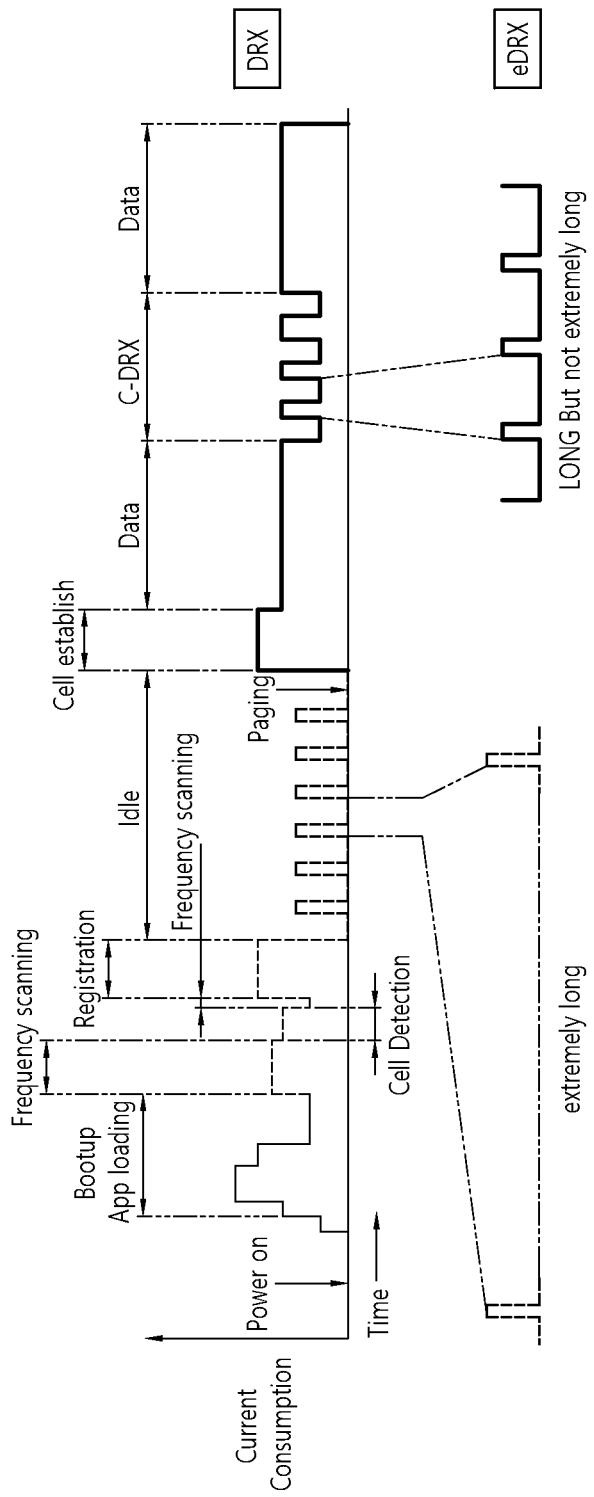
FIG. 48 schematically illustrates an example of power consumption according to the state of a UE.

FIG. 48 schematically illustrates an example of power consumption according to the state of a UE.

Referring to FIG. 48, after the UE is powered on, the UE performs a bootup procedure for loading an application, an initial access/random access procedure for downlink and uplink synchronization with a base station, and a registration procedure with a network. Here, current consumption (or power consumption) in each procedure is shown in FIG. 48.

When the transmission power of the UE is high, the current consumption of the UE may increase. Further, when there is no traffic to be received by the UE or no traffic to be transmitted to the base station, the UE transitions to the idle mode to reduce power consumption and performs an idle-mode DRX operation.

When paging (e.g., a call) occurs during the idle-mode DRX operation, the UE may transition from the idle mode to the connected mode through a cell establishment procedure and may transmit and receive data to and from the base station.

When there is no data received from the base station or transmitted to the base station for a specified time in the connected mode or at a set time, the UE may perform a connected-mode DRX (C-DRX).

When extended DRX (eDRX) is configured for the UE through higher-layer signaling (e.g., system information), the UE may perform an eDRX operation in the idle mode or the connected mode.

Figure 49:
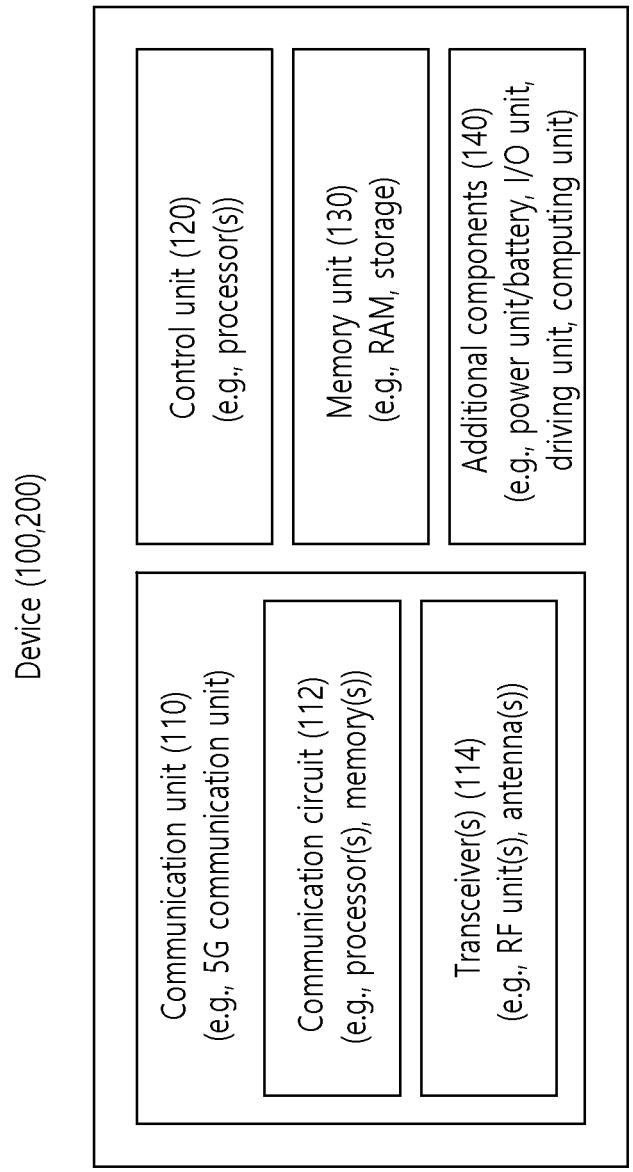
FIG. 49 shows another example of a wireless device applied to the present disclosure.

FIG. 49 shows another example of a wireless device applied to the present disclosure. Wireless devices may be implemented in various forms depending on use—examples/services.

Referring to FIG. 49, the wireless devices 100 and 200 may include various elements. For example, the wireless devices 100 and 200 may include a communication unit 110, a controller 120, a memory unit 130, and an additional element 140. The communication unit may include a communication circuit 112 and a transceiver(s) 114. For example, the communication circuit 112 may include one or more processors 102 and 202 and/or one or more memories 104 and 204. For example, the transceiver(s) 114 may include one or more transceivers 106 and 206 and/or one or more antennas 108 and 208. The controller 120 is electrically connected to the communication unit 110, the memory unit 130, and the additional element 140 and controls all operations of the wireless device. For example, the controller 120 may control electrical/mechanical operations of the wireless device based on program/code/command/information stored in the memory unit 130. In addition, the controller 120 may transmit the information stored in the memory unit 130 to the outside (e.g., another communication device) through the communication unit 110 through a wireless/wired interface or store information received through the wireless/wired interface from the outside (e.g., another communication device) through the communication unit 110 in the memory unit 130.

The additional element 140 may be variously configured according to a type of the wireless device. For example, the additional element 140 may include at least one of a power unit/battery, an I/O unit, a driving unit, and a computing unit. The wireless device may be implemented in the form of a robot (100a in FIG. 2), vehicles (100b-1 and 100b-2 in FIG. 2), an XR device (100c in FIG. 2), a portable device (100d in FIG. 2), a home appliance (100e in FIG. 2), an IoT device (100f in FIG. 2), a digital broadcasting terminal, a hologram device, a public safety device, an MTC device, a medical device, a fintech device (or financial device), a security device, a climate/environment device, an AI server/device (400 in FIG. 2), a BS (200 in FIG. 2), and a network node. The wireless device may be used as a mobile device or may be used in a fixed place depending on the use—example/service.

In FIG. 49, various elements, components, units/units, and/or modules in the wireless devices 100 and 200 may all be interconnected through a wired interface, or at least some of them may be wirelessly connected through the communication unit 110. For example, in the wireless devices 100 and 200, the controller 120 and the communication unit 110 may be connected by wire, and the controller 120 and a first unit (e.g., 130 or 140) may be connected through the communication unit 110 wirelessly. In addition, each element, component, unit/part, and/or module in the wireless devices 100 and 200 may further include one or more elements. For example, the controller 120 may be configured as a set of one or more processors. For example, the controller 120 may be configured as a set of a communication control processor, an application processor, an electronic control unit (ECU), a graphic processing processor, and a memory control processor. As another example, the memory unit 130 may include a random access memory (RAM), a dynamic RAM (DRAM), a read only memory (ROM), a flash memory, a volatile memory, a non-volatile memory, and/or a combination thereof.

The claims set forth herein may be combined in various ways. For example, the technical features of the method claims of the present disclosure may be combined to be implemented as a device, and the technical features of the device claims of the present disclosure may be combined to be implemented as a method. In addition, the technical features of the method claims of the present disclosure and the technical features of the device claims may be combined to be implemented as a device, and the technical features of the method claims of the present disclosure and the technical features of the device claims may be combined to be implemented as a method.

What is claimed is:

1. A method of adjusting a contention window size of a user equipment (UE) in a wireless communication system, the method comprising:
    transmitting code block groups (CBGs) through a physical uplink shared channel (PUSCH);
    receiving downlink control information (DCI) including a new data indicator (NDI) and a code block group transmission information (CBGTI) field; and
    adjusting the contention window size,
    wherein, based on that the NDI has not been toggled, ACK/NACK information for the CBGs is provided by the CBGTI field indicating at least one CBG to be retransmitted among the CBGs and the contention window size is adjusted based on the ACK/NACK information,
    wherein, based on that the NDI has been toggled, the contention window size is set to a minimum contention window size for a priority class,
    wherein the ACK/NACK information corresponds to the PUSCH in a reference time resource for a channel occupancy, and
    wherein the reference time resource is a duration of a first transmission burst by the UE within the channel occupancy that contains the PUSCH.

2. The method of claim 1, wherein, in the CBGTI field, NACK is assumed for the at least one CBG.

3. The method of claim 1, wherein the DCI is used for scheduling a physical uplink shared channel (PUSCH).

4. The method of claim 3, wherein the at least one CBG is retransmitted through the PUSCH.

5. A user equipment (UE), the UE comprising:
    at least one transceiver configured to transmit and receive a radio signal; and
    at least one processor connected to the at least one transceiver,
    wherein the at least one processor is configured to:
        transmit code block groups (CBGs) through a physical uplink shared channel (PUSCH),
        receive downlink control information (DCI) including a new data indicator (NDI) and a code block group transmission information (CBGTI) field, and
        adjust a contention window size,
    wherein, based on that the NDI has not been toggled, ACK/NACK information for the CBGs is provided by the CBGTI field indicating at least one CBG to be retransmitted among the CBGs and the contention window size is adjusted based on the ACK/NACK information,
    wherein, based on that the NDI has been toggled, the contention window size is set to a minimum contention window size for a priority class,
    wherein the ACK/NACK information corresponds to the PUSCH in a reference time resource for a channel occupancy, and
    wherein the reference time resource is a duration of a first transmission burst by the UE within the channel occupancy that contains the PUSCH.

6. The UE of claim 5, wherein, in the CBGTI field, NACK is assumed for the at least one CBG.

7. The UE of claim 5, wherein the DCI is used for scheduling a physical uplink shared channel (PUSCH).

8. The UE of claim 7, wherein the at least one CBG is retransmitted through the PUSCH.

9. An apparatus, the apparatus comprising:
    at least one memory storing instructions; and
    at least one processor connected to the at least one memory, wherein the at least one processor executes the instructions to perform operations comprising:
        transmitting code block groups (CBGs) through a physical uplink shared channel (PUSCH),
        receiving downlink control information (DCI) including a new data indicator (NDI) and a code block group transmission information (CBGTI) field, and
        adjusting a contention window size,
    wherein, based on that the NDI has not been toggled, ACK/NACK information for the CBGs is provided by the CBGTI field indicating at least one CBG to be retransmitted among the CBGs and the contention window size is adjusted based on the ACK/NACK information,
    wherein, based on that the NDI has been toggled, the contention window size is set to a minimum contention window size for a priority class,
    wherein the ACK/NACK information corresponds to the PUSCH in a reference time resource for a channel occupancy, and
    wherein the reference time resource is a duration of a first transmission burst by the apparatus within the channel occupancy that contains the PUSCH.

10. The apparatus of claim 9, wherein, in the CBGTI field, NACK is assumed for the at least one CBG.

11. The apparatus of claim 9, wherein the DCI is used for scheduling a physical uplink shared channel (PUSCH).

12. The apparatus of claim 11, wherein the at least one CBG is retransmitted through the PUSCH.

* * * * *